US012274655B2

(12) United States Patent
Witkos

(10) Patent No.: US 12,274,655 B2
(45) **Date of Patent: *Apr. 15, 2025**

(54) LOW-PROFILE BEDPANS

(71) Applicant: Maciej Witkos, Carlsbad, CA (US)

(72) Inventor: Maciej Witkos, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,104

(22) Filed: Dec. 7, 2023

(65) Prior Publication Data

US 2024/0173185 A1 May 30, 2024

Related U.S. Application Data

(63) Continuation of application No. 17/660,903, filed on Apr. 27, 2022, now Pat. No. 11,944,578.

(60) Provisional application No. 63/201,447, filed on Apr. 29, 2021.

(51) Int. Cl.
*A61G 9/00* (2006.01)

(52) U.S. Cl.
CPC .................................... *A61G 9/003* (2013.01)

(58) Field of Classification Search
CPC ........... A47K 13/24; A61G 9/00; A61G 9/003
See application file for complete search history.

(56) References Cited

U.S. PATENT DOCUMENTS

| | | |
|---|---|---|
| 460,288 A | 9/1891 | Smith |
| 501,852 A | 7/1893 | Tascher |
| 2,021,226 A | 11/1935 | Davis |
| 2,110,440 A | 3/1938 | Hause |

(Continued)

FOREIGN PATENT DOCUMENTS

| | | |
|---|---|---|
| CN | 306924127 | 11/2021 |
| CN | 117396169 A | 1/2024 |

(Continued)

OTHER PUBLICATIONS

Medegen H 113-10 Commode Stackable Bedpan with Handles, Medegen, Amazon.com, [Post date: Oct. 13, 2015], [Site seen: 2/2/2/ 2023], Seen at URL: https://www.amazon.com/Medegen-Medical-Products-H 113-1 0-Capacity/dp/B016OD M REI (Year: 2015).

(Continued)

*Primary Examiner* — David P Angwin
*Assistant Examiner* — Nicholas A Ros
(74) *Attorney, Agent, or Firm* — KNOBBE, MARTENS, OLSON & BEAR LLP

(57) ABSTRACT

A bedpan having a housing including a chamber, a top portion including an opening to the chamber and having a circumferential edge, a proximal surface including an apron surrounding the opening, the apron extending from a circumferential edge of the proximal surface to the circumferential edge of the opening, and an angled side wall surrounding the apron, and a bottom portion including a distal surface opposite the proximal surface, and a distal edge of the distal surface, the chamber positioned interior to the housing, the side walls of the chamber being interior to the side wall such that there is space between the walls of the chamber and the side wall, the side wall angled outward as it extends from the circumferential edge of the proximal surface towards the distal edge of the distal surface, and a first handle formed on a first portion of the housing.

20 Claims, 46 Drawing Sheets

(56) References Cited

U.S. PATENT DOCUMENTS

| | | | | | |
|---|---|---|---|---|---|
| 2,320,845 | A | | 6/1943 | Bolton | |
| 2,359,830 | A | | 10/1944 | Deckert | |
| 2,466,142 | A | | 4/1949 | Yost | |
| 2,977,603 | A | * | 4/1961 | Dykes | A61G 9/003 4/450 |
| 3,077,608 | A | | 2/1963 | Renje | |
| 3,084,348 | A | * | 4/1963 | Parker | A61G 9/003 4/456 |
| 3,453,664 | A | | 7/1969 | Gilbert | |
| 3,599,249 | A | | 8/1971 | Reed | |
| D246,382 | S | | 11/1977 | Parker | |
| D248,408 | S | | 7/1978 | Mills | |
| D249,162 | S | | 8/1978 | Mills | |
| 4,368,548 | A | | 1/1983 | Glass | |
| 5,079,788 | A | | 1/1992 | Raupp | |
| 5,224,223 | A | | 7/1993 | Royal | |
| D347,058 | S | | 5/1994 | Valentine | |
| 5,394,571 | A | | 3/1995 | Vernon | |
| 5,524,301 | A | | 6/1996 | McGuire | |
| 5,689,840 | A | | 11/1997 | Kuhlman | |
| D433,130 | S | | 10/2000 | Cude et al. | |
| D450,840 | S | | 11/2001 | Edmonds | |
| 6,398,062 | B1 | | 6/2002 | Jones | |
| 6,532,604 | B2 | | 3/2003 | Moser | |
| 6,973,680 | B2 | * | 12/2005 | Host | A61G 9/003 4/450 |
| D571,460 | S | | 6/2008 | Korjack | |
| D627,062 | S | | 11/2010 | Tanguay | |
| 8,185,978 | B2 | | 5/2012 | Mosler et al. | |
| D677,383 | S | | 3/2013 | Morand et al. | |
| 8,453,274 | B1 | | 6/2013 | Olmstead | |
| 8,800,071 | B2 | | 8/2014 | Sanchez Moreno | |
| 8,850,631 | B2 | | 10/2014 | Stekloff | |
| 8,869,318 | B2 | | 10/2014 | Tanguay | |
| 10,022,286 | B2 | * | 7/2018 | Marshall | A61G 9/003 |
| 10,137,046 | B1 | | 11/2018 | Pinus | |
| 11,141,336 | B2 | | 10/2021 | Marshall | |
| D993,404 | S | | 7/2023 | Witkos | |
| D994,877 | S | | 8/2023 | Witkos | |
| D1,017,030 | S | | 3/2024 | Webb | |
| D1,019,910 | S | | 3/2024 | Wang | |
| 11,944,578 | B2 | * | 4/2024 | Witkos | A61G 9/003 |
| 2003/0028959 | A1 | | 2/2003 | Moser | |
| 2006/0253968 | A1 | | 11/2006 | Mosler et al. | |
| 2010/0306913 | A1 | | 12/2010 | Zazzara et al. | |
| 2017/0239117 | A1 | | 8/2017 | Marshall | |
| 2019/0021928 | A1 | | 1/2019 | Lee et al. | |
| 2020/0289048 | A1 | | 9/2020 | Hall et al. | |
| 2020/0405559 | A1 | | 12/2020 | Marshall | |
| 2021/0275376 | A1 | | 9/2021 | Miles | |
| 2022/0096302 | A1 | | 3/2022 | Nelson et al. | |
| 2022/0110779 | A1 | | 4/2022 | Ricketts | |
| 2022/0151852 | A1 | | 5/2022 | Bobbert et al. | |
| 2022/0347030 | A1 | | 11/2022 | Witkos | |

FOREIGN PATENT DOCUMENTS

| | | | | | |
|---|---|---|---|---|---|
| EP | 3886783 | A1 | | 10/2021 | |
| EP | 4312933 | A1 | | 2/2024 | |
| JP | 2024516835 | A | | 4/2024 | |
| KR | 20240004593 | A | | 1/2024 | |
| WO | WO 2016046564 | A1 | | 3/2016 | |
| WO | WO2019150348 | | * | 8/2019 | A61G 9/003 |
| WO | WO 2020109784 | A1 | | 6/2020 | |
| WO | WO 2022/232394 | A1 | | 11/2022 | |

OTHER PUBLICATIONS

Medline DYNC8522H Mega-Fracture Bedpans, Graphite, Retrieved Feb. 26, 2021 from https://www.amazon.com/Medline-DYNC8522H-Mega-Fracture-Bedpans-Graphite/dp/B005L4NATI/ref=sr_1_3?dchild=1&keywords=Medline+DYNC8522H+Mega-Fracture+Bedpans%2C+Graphite&qid=1620924666&sr=8-3.

International Search Report and Written Opinion issued in application No. PCT/US2022/026733.

McKesson Stackable Bedpan, Mckesson, Vitality Medical, [Post date: unknown], [Site seen Feb. 22, 2023], Seen at URL: https://www.vitalitymedical.com/mckesson-stackable-bedpan.html?gclid=EAlalQobChMlxq2jusKn_QIViilMCh17rwzjEAsYBSABEgJnOfD_BWE (Year: 2023).

* cited by examiner

SECTION A-A

SECTION B-B

LOW-PROFILE BEDPANS

INCORPORATION BY REFERENCE TO ANY PRIORITY APPLICATIONS

This application is a continuation of U.S. application Ser. No. 17/660,903 filed on Apr. 27, 2022, which claims the benefit of U.S. Provisional Application No. 63/201,447, filed Apr. 29, 2021. Each of the above-listed disclosures is incorporated by reference herein in its entirety. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present invention relates to innovative structure of a bedpan. More particularly, the present application describes a low-profile bedpan structured with angled side surfaces for ease of lateral placement under a patient.

SUMMARY

Certain aspects of a low-profile bedpan are defined by the independent claims. The dependent claims concern optional features of some embodiments of such bedpans. Accordingly, the systems and devices described herein each have several aspects, no single one of which is solely responsible for its desirable attributes. Without limiting the scope of this disclosure, several non-limiting features will now be briefly described.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One innovation includes a bedpan comprising a housing having an interior chamber, a top portion having a proximal surface for supporting weight of a patient with an opening to the interior chamber, a bottom portion, and a side wall joined to the top portion and the bottom portion, the side wall extending between the top portion and the bottom portion, a distal edge defined at or near the junction of the side wall and the bottom portion, the distal edge extending circumferentially around the bottom portion, a proximal edge formed where the side wall joins the top portion, the proximal edge extending circumferentially around the top portion. The circumferential extent of the distal edge is greater than the circumferential extent of the distal edge such that the side walls extend outward as they extend from the proximal edge to the distal edge forming angled or sloped side walls. A first handle is formed on a first part of the side wall, and a second handle is formed on a second part of the side wall.

Any of the disclosed bedpans can have one or more additional features. In some embodiments, a first handle is formed integral to the housing. In some embodiments, a second handle is formed integral to the housing. In some embodiments, a perimeter of the housing is substantially rectangular in shape, and wherein a first handle is on a first side of the housing, and a second handle is on a second side of housing, the first side of the housing being adjacent to the second side of the housing. In some embodiments, a bottom portion includes a distal surface, and the top portion includes a proximal surface. In some embodiments, the distance from the distal surface to the proximal surface is less than or equal to 5.0 inches. In some embodiments, the distance from the distal surface to the proximal surface less than or equal to 4.0 inches. In some embodiments, the distance from the distal surface to the proximal surface is less than or equal to 3.0 inches. In some embodiments, the distance from the distal surface to the proximal surface is less than or equal to 2.75 inches. In some embodiments, the distance from the distal surface to the proximal surface is less than or equal to 2.50 inches. In some embodiments, the distance from the distal surface to the proximal surface is less than or equal to 2.25 inches.

In some embodiments, the distance from the distal surface to the proximal surface is less than or equal to 2.0 inches. In some embodiments, the first handle includes an aperture having a first longitudinal axis, wherein the second handle includes an aperture having a second longitudinal axis, wherein the first and second axis are aligned, with respect to each other, at an angle that is 90°, plus or minus 30°. In some embodiments, the first handle includes an aperture having a first longitudinal axis, wherein the second handle includes an aperture having a second longitudinal axis, wherein the first and second axis are aligned, with respect to each other, at an angle that is 90°, plus or minus 20°. In some embodiments, the first handle includes an aperture having a first longitudinal axis, wherein the second handle includes an aperture having a second longitudinal axis, wherein the first and second axis are aligned, with respect to each other, at an angle that is 90° plus or minus 10°. In some embodiments, the first handle is aligned with respect to a first axis, and wherein the second handle is aligned with respect to a second axis, and wherein the first and second axis are aligned at an angle that is 90° plus or minus 5°. In some embodiments, the top portion (e.g., a circumferential edge of the top portion or a surface of the top portion) is aligned with respect to a first plane perpendicular to a longitudinal axis of the housing, and the bottom portion (e.g., a circumferential edge or the bottom surface (distal surface of the bedpan) of the bottom portion) is aligned with respect to a second plane perpendicular to the longitudinal axis. In some embodiments, the side wall extends from the bottom portion towards the top portion at an angle that is 30° plus or minus 10° with respect to a distal surface of the bottom portion. In some embodiments, the side wall extends from the bottom portion towards the top portion at an angle that is 30° plus or minus 20° with respect to a distal surface of the bottom portion. In some embodiments, the side wall extends from the bottom portion towards the top portion at an angle that is between 10° and 90° with respect to a distal surface of the bottom portion.

In some embodiments, the opening is generally rectangular in shape. In some embodiments, the opening has a length dimension between about 5" and 11.5" and a width dimension between about 4" and 10". In some embodiments, the housing further comprises at least one support that is connected to an interior surface of the top portion and an interior surface of the bottom portion. In some embodiments, the housing further comprises two supports, each support connected to an interior surface of the top portion and an interior surface of the bottom portion. In some embodiments, the housing further comprises three supports, each support connected to an interior surface of the top portion and an interior surface of the bottom portion. In some embodiments, housing further comprises four supports, each support connected to an interior surface of the top portion and an interior surface of the bottom portion. In some embodiments, the housing further comprises more than four supports, each support connected to an interior surface of the top portion and an interior surface of the bottom portion.

In some embodiments, the first handle has a first length dimension, and the second handle has a second length dimension, wherein the first length dimension and the second length dimension are approximately the same. In some embodiments, the first handle has a first length dimension, and second handle has a second length dimension, wherein the first length dimension and the second length dimension are a different length. In some embodiments, the first handle has a first length dimension, and second handle has a second length dimension, wherein the first length dimension is longer than the second length dimension. In some embodiments, the first handle has a first length dimension that is between 3" and 8", and the second handle has a second length dimension that is between 3" and 8". In some embodiments, the housing has a length dimension and a width dimension, and wherein the length dimension is between 14" and 24" and the width dimension is between 14" and 23". In some embodiments, the housing has a length dimension and a width dimension, and wherein the length dimension is between 16" and 22" and the width dimension is between 15" and 21".

Another innovation includes a low-profile bedpan comprising a housing of less than or equal to 2.5 inches in height, the housing having an interior chamber, a top portion having an opening to the interior chamber, a bottom portion, and a side wall joined to the top portion and the bottom portion, the side wall extending between the top portion and the bottom portion, the top portion having an apron surrounding the opening, the chamber extending underneath the apron, the housing further including at least one handle formed on or attached to the side of the housing below a proximal surface of the top portion of the housing.

Another innovation includes a low-profile bedpan comprising a housing having a top portion having a proximal surface, a bottom portion having a distal surface, and a chamber interior to the top portion and the bottom portion, the top portion having an opening to the chamber, the housing including a side wall forming at least a portion of the top portion, the sidewall coupled to the distal surface and the proximal surface and at least a portion of the side wall angled to create a wedge-shaped side of the housing on at least one side of the housing, and preferably on two or more sides of the housing, the proximal surface having an apron around the opening, the chamber extending underneath the apron. In some embodiments, the bedpan includes at least one handle on the side of the housing, the handle positioned on the housing between a plane of the proximal surface and a plane of the distal surface to allow the bedpan to be slid underneath a patient without the handle obstructing the movement of positioning the bedpan against a material under the patient or against the patient.

Another innovation includes a bedpan comprising a housing including a chamber for holding urine and feces, the chamber having walls and a bottom surface, a top portion including an opening to the chamber, the opening having a circumferential edge, a proximal surface including an apron surrounding the opening, the apron extending from a circumferential edge of the proximal surface to the circumferential edge of the opening, and an angled side wall surrounding the apron; a bottom portion including a distal surface opposite the proximal surface, and a distal edge of the distal surface, the chamber positioned between the proximal surface and the distal surface, the side walls of the chamber being interior to the side wall such that there is space between the walls of the chamber and the side wall, the side wall angled outward as it extends from the circumferential edge of the proximal surface towards the distal edge of the distal surface; and a first handle formed on a first portion of the housing. Various embodiments of a bedpan can include one or more features, or other features. In some embodiments, the first handle is formed integral to the housing. In some embodiments, the bedpan further comprises a second handle on a second portion of the housing, the second handle is formed integral to the housing. In some embodiments, the first handle includes an aperture having a first longitudinal axis, wherein the second handle includes an aperture having a second longitudinal axis, wherein the first and second axis are aligned, with respect to each other, at an angle A that is 90° plus or minus 30°. In some embodiments, the first handle is on a first side of the housing and the second handle is on a second side of the housing, and the first side of the housing is adjacent to the second side of the housing. In some embodiments, the apron is sloped downward towards the distal surface as it extends from the circumferential edge of the proximal surface to the circumferential edge of the opening. In some embodiments, the height of the bedpan, as measured along a longitudinal axis, is between 2 inches and 5 inches. In some embodiments, an angle defined by the side wall and a plane aligned with the circumferential edge of the proximal surface is between 10° and 60° around the housing. In some embodiments, an angle defined by the side wall and a plane aligned with the circumferential edge of the proximal surface is between 10° and 60° on at least half of the housing. In some embodiments, the opening to the chamber is generally rectangular in shape. In some embodiments, the opening has a length dimension between about 5" and 11.5" and a width dimension between about 4" and 10". In some embodiments, the housing further comprises at least one support between an interior surface of the top portion and an interior surface of the bottom portion. In some embodiments, the housing further comprises a plurality of supports arranged around the chamber. In some embodiments, the bedpan further comprises a second handle on a second portion of the housing, the formed integral to the housing, wherein the first handle has a first length dimension that is between 3" and 8", and the second handle has a second length dimension that is between 3" and 8". In some embodiments, the housing has a length dimension and a width dimension, and wherein the length dimension is between 14" and 24" and the width dimension is between 14" and 23". In some embodiments, the bedpan further comprises a sensor assembly positioned on the top portion of the housing, the sensor configured to sense, through direct contact with a patient, a characteristic of the patient and wirelessly communicate information relating to the sensed characteristic. In some embodiments, the bedpan further comprises a sensor assembly positioned in the chamber, the sensor configured to sense a characteristic of material in the chamber and wirelessly communicate information relating to the sensed characteristic.

Another innovation includes a bedpan comprising a housing including a chamber for holding urine and feces, the chamber having walls around the chamber, a bottom surface and a top opening, the housing further including a top portion including a proximal surface having an apron surrounding the opening to the chamber, the apron extending from a circumferential edge of the proximal surface to a circumferential edge of the opening, a bottom portion including a distal surface opposite the proximal surface, the chamber positioned between the proximal surface and the distal surface, and a side wall surrounding the apron, the side wall angled outward on all sides of the housing as it extends from a circumferential edge of the proximal surface towards a distal edge of the distal surface and a first handle formed integral to the housing. In some embodiments, the bedpan further comprising a second handle formed integral to the housing. In some embodiments, the top portion and the bottom portion are coupled together with a hinge.

The bedpans can include a number of different embodiments having different aspects or features, some of which are discussed here. However, the innovation is not limited to different embodiments, or different features that are discussed here. Also, the features that are disclosed herein may be included in various embodiments of a bedpan whether or not they are explicitly described as being included in a particular embodiment, unless explicitly indicated otherwise or indicated by context of the features.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

In FIG. 5, the interior chamber of the bedpan is illustrated in a darker color than the housing of the bed.

DETAILED DESCRIPTION

Overview

Figure 1A:
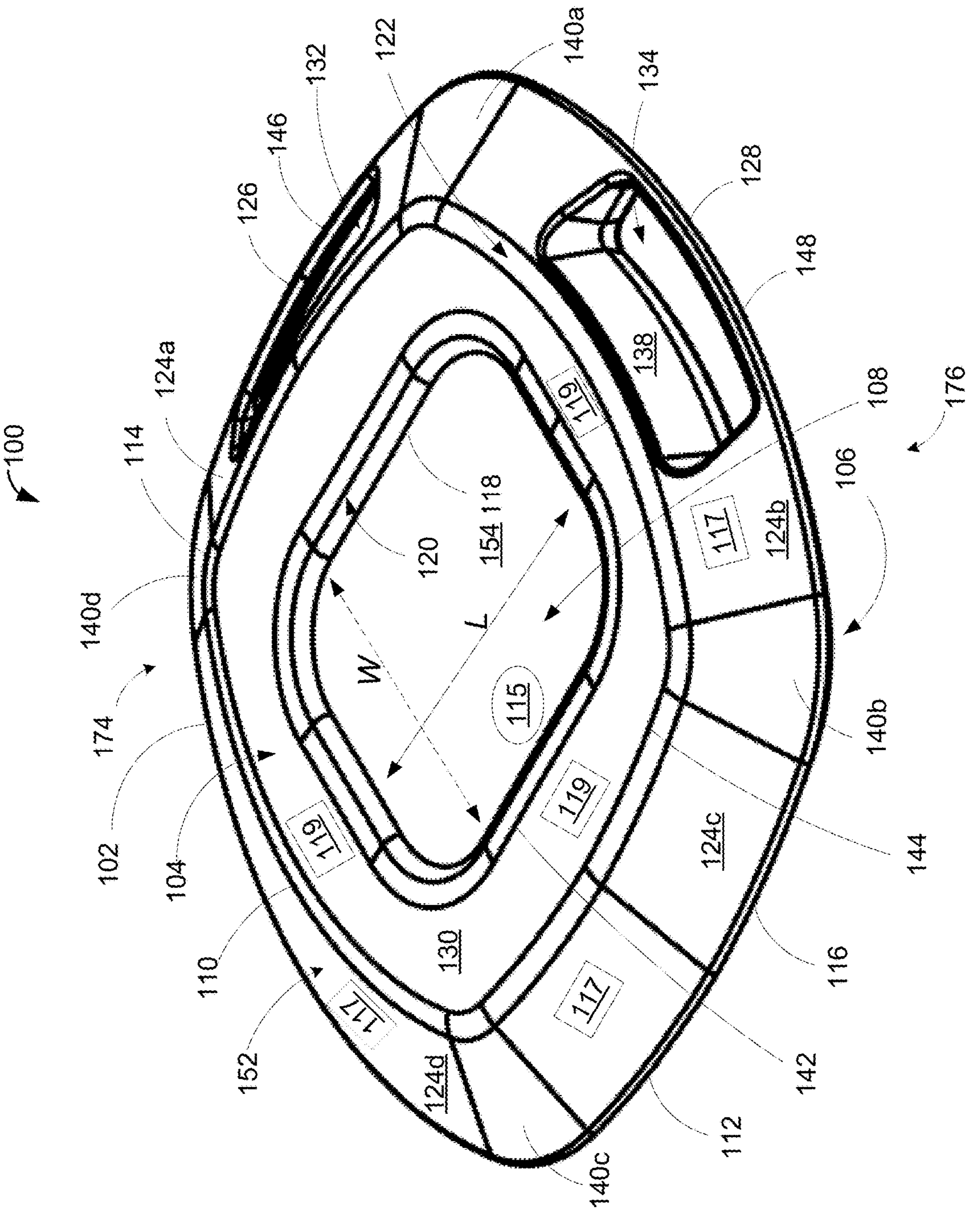
FIGS. 1A and 1B are top perspective views illustrating a first example of a bedpan illustrating various structural and functional aspects of some embodiments.

This application relates to innovations for a bedpan that includes structural features that address several clinical problems. Overall, it allows for greater patient safety and comfort, easier for staff to use with a decreased risk of biohazard exposure, and improved satisfaction for health systems. Urination and defecation are essential for human well being and all persons need to be able to execute these functions. A bedpan is one of the oldest medical devices that helps patients during urination and defecation, and they have been used in hospitals and other medical and patient care facilities for many decades. A bedpan typically includes a reservoir (or chamber) for the excretion of urine and feces by a person. Usually a person (patient) that requires a bedpan is immobile or nearly so, and lacks the ability to move fully or has sustained an injury where movement causes pain. The bedpan is usually placed under a portion of a patient by a healthcare provider such as a nurse, nurse assistant, technician, EMT or physician. At times, the bedpan is placed for use by the patient. Placing the bedpan requires moving the patient to various positions or having the patient assist by moving themselves. The average healthy person has a bowel movement about once per day. However, a patient may have a bowel movement up to three times a day (or more), or as infrequent as one bowel movement per three days. The average healthy person urinates in about 21 seconds an average of 220 ml, and defecates for an average 10 minutes, t. Thus in some cases, a with an average volume of 200-400 grams of feces per movement. Thus patient needs to have a bedpan positioned for use frequently and for longer periods of time.

Patients are not healthy by definition and may urinate/defecate outside of normal time and frequency ranges. This can be caused by their disease/injury or as a side effect of medical care/medications. For example, patients with benign prostatic hyperplasia (BPH) might require much longer to fully void their bladder, or patients who are infected with C-*Difficile* bacteria, can defecate as often as every three minutes in large copious amounts. Therefore, patients can at times be on a bedpan for an extended period (over 10 minutes).

Bedpans require that the volume of the space be sufficiently large enough to contain feces and urine. As such, bedpans have a minimum certain height if the fecal or urine is not to contaminate the cutaneous surfaces (skin) of the patient and cause injury. In addition, the bedpan should be able to withstand the weight of the patient. The average weight of patients has increased dramatically in the last 40 years. The average male now weighs 199.8 lbs (90.6 kg) and average female 170.8 lbs (77.5 kg). The larger weights of patients require more structurally sound bedpans. As a patient's weight increases, a larger contact surface area on the top of the bedpan is desired to reduce pressure, however, typical bedpans lack in area, and some even have almost no top contact surface area.

In addition, given the highly infectious nature of *Clostridium difficile* bacteria and Norwalk virus etc., bedpans are now predominantly disposable or have the option to have a bedpan liner. There are growing calls to use biodegradable disposable bedpans, currently structurally these are unable to handle large weights. Surprisingly, most bedpans are not configured to sufficiently contain feces and fluid that have been deposited therein when the bedpan is moved. For example, many bedpans have at least one outside wall having approximately a 90-degree angle, and sometimes the outside walls on all sides are at approximately a 90 degree angle, which causes a splash when the bedpan is removed from underneath the patient and otherwise moved. Because of these inadequate designs, spillage often occurs when the bedpan is pulled from underneath a patient when it becomes stuck, usually due to patient girth/weight.

There are many bedpans being used today. For example, some bedpans, which are used because of ease of placement have very small contact surface areas. Thus, these can be uncomfortable for patients and increase the probability of cutaneous injury from prolonged placement. In addition, they can only be placed from the inferior/bottom of the patient, with the patients' legs at least somewhat externally rotated. Bedpans with large surface areas are bulky and difficult to place. These are very difficult to place under a patient as they require that the patient be moved and angled sufficiently to be able to place the bedpan correctly. This can also be extremely painful for patients with lumbar/thoracic spine or hip/femur fractures. No available bedpans are structured to address all the needs of a patient and/or a medical provider. For example, there are no bedpans designed for ease of placement laterally (from the side of the patient). There are no bedpans designed to allow them to be easily placed from the bottom or side or a patient. There are no bedpans having an ultra-low profile and are configured with multi-side slopes for ease of placement and reduce effort needed by provider or patient. There are no bedpans designed to reduce splashing with sloped or covered walls from all sides. The bedpans disclosed herein are configured to address these deficiencies and have additional advantages. For example, the bedpans are structures similar to a toilet seat and are designed for patient comfort, especially when they are used for an extended period of time. Also, the disclosed embodiments provide a splash-less chamber having a greater volume than the bedpan housing opening, which reduces splashing while providing an increased chamber volume.

Embodiments of the low-profile bedpans solve at least several of these clinical problems. Overall, it allows for greater patient safety and comfort, easier for staff to use with a decreased risk of biohazard exposure, and improved satisfaction for health systems.

Embodiments of the low-profile bedpans disclosed herein can be placed underneath a patient laterally, solving the problem of bedpan placement in patients necessitating such placement, the only bedpan designed specifically for this. The sloped sides of the bedpan decrease the force necessary to push it between the patient and bed. Patients are heavier, increasing the physical work necessary for correct placement. In various embodiments, there is a slight upward slope of the bottom (or offset of the bottom surface) to prevent the lower side of the bedpan from catching on bed sheets. Embodiments can include two ergonomic handles, incorporated in the housing of the bedpan, allowing for controlled lateral or inferior/bottom placement. Other configurations of the handles are possible. In some embodiments, the bedpan includes only one handle which may make it less expensive to manufacture. In some embodiments, the bedpan includes more than two handles (e.g., three handles). In some embodiments, the bedpan has a handle on each side. In an example, the bedpan has a rectangular shape and includes an integrated handle on each of its four sides. In another example, the bedpan has a triangular shape with three sides and includes an integrated handle on one or more of its sides (e.g., one, two or three handles). Embodiments of the bedpan are designed to be similar to a toilet seat, to maintain patient comfort. This should allow for improved patient urination and defecation, as the concept of using a bedpan is uncomfortable enough. The bedpan is designed to maximize its surface area of the bedpan against a patient's skin. A large surface area decreases the pressure on the sacral, buttock area to reduce the probability of iatrogenic pressure injury. In addition, embodiments of the bedpan are designed to reduce any hard angle contact between patient and product. These design features decrease the probability of iatrogenic injury. In various embodiments, the bedpan can include one or more internal columns or supports ("supports") positioned in the interior chamber of the bedpan or around the outside of the chamber, between the top surface of the bedpan and the bottom surface of the bedpan. The supports can be coupled to the top portion and/or the bottom portion of the bedpan. The supports allow the bedpan to support a greater weight on the top portion without deforming or breaking.

LIST OF CERTAIN COMPONENTS

The following is a list of certain components that are described and enumerated in this disclosure in reference to the above-listed figures. However, any aspect of the devices illustrated in the figures, whether or not named out separately herein, can form a portion of various embodiments of the invention and may provide basis for claim limitation relating to such aspects, with or without additional description. The enumerated components include:

100 bedpan
102 housing
103 longitudinal axis
104 proximal surface
105 upper portion distal surface
106 distal surface
107 circumferential edge of distal surface
108 opening
109 plane aligned with circumferential edge of distal surface
110 proximal surface edge/circumferential edge of proximal surface
111 plane aligned with circumferential edge of proximal surface
112 distal edge
113 circumferential edge bottom portion
114 top portion
115 sensor located in chamber
116 bottom portion
117 sensor (located on a side surface of the housing)
118 circumferential edge around opening
119 sensor (e.g., located on a top surface or the apron of the housing)
120 bevel, circumferential edge around opening
121 bevel, connecting bottom portion and top portion
122 bevel, connecting side wall and proximal surface
123 edge
124 sidewall
**124*a*** first side wall
**124*b*** second side wall
**124*c*** third side wall
**124*d*** fourth side wall
126 first handle
128 second handle
130 apron
132 opening/recess first handle
134 opening/recess second handle
136 housing wall, first handle opening
138 housing wall, second handle opening
140 corner
142 apron interior edge
144 apron exterior edge
146 pull member, first handle
148 pull member, second handle
149 chamber wall
150 wall, bottom portion extending between distal surface edge and distal edge
152 wall, top portion extending between distal edge and proximal edge
153 chamber wall outer surface
154 chamber (housing interior chamber)
155 proximal surface (interior) bottom portion of housing

156 support first portion (supporting proximal surface/apron of upper portion of housing)
157 support second portion (supporting side wall of upper portion of housing)
158 chamber wall inner surface
159 upper surface (circumferential) chamber wall
160 internal support on bottom portion
161 chamber bottom surface
164 top portion underside
165 hinge mechanism
166 left side
167 extended structure of hinge
168 right side
169 slot of hinge
170 upper side/back side
172 lower side/front side
173 locking feature
174 proximal side (facing towards a portion of patient when in use)
176 distal side (facing away from patient when in use)
180 first handle longitudinal axis
182 second handle longitudinal axis
200 bedpan
300 sensor system
302 mobile device (e.g., smartphone)
304 computer
306 network
308 server(s)
310 medical practitioner's computer device or medical facilities
311-317 communication links
400 sensor system
402 communication bus
404 processor(s)
406 memory
410 sensing element
412 display
414 input device
418 communication interface
420 battery Illustrative Embodiments FIGS. 1A-12 illustrate certain features that can be included on a first example of a bedpan having angled side surfaces on all sides of the bedpan and having one or more handles formed in the housing (e.g., integrally formed in the housing), the illustrated example having two handles. While the first example illustrates that the handles are formed in the housing, it is also contemplated that in some embodiments the bedpan has one or more handle attached to the housing. For example, in a position attached to the housing that is similar to the positions of the handles formed in the housing, or attached in another position to the housing. Other embodiments having features that address one or more of the problems described above are also possible, for example, as illustrated in FIGS. 13-16 in a second example having no handles formed in the housing, and in FIGS. 17A-20G which illustrate other examples. Embodiments of the bedpans can be made as an integral unit, for example, in a molding process. In other embodiments, the bedpan can be fabricated as two or more pieces that are attached together, preferably using a process that creates a sealed chamber in the interior of the bedpan, with the only opening to the chamber being on a proximal surface 104 (that is, a top surface of the bedpan when it is in an operable orientation). Some examples of bedpans that can be fabricated as two pieces (a top portion and a bottom portion) are illustrated in FIGS. 17A-20G. In some embodiments, the top portion and the bottom portion can be formed as connected pieces that assemble in a clamshell manner, an example being illustrated in FIGS. 19A-19G. For ease of reference, the reference to "top" or "proximate" refers to a top portion or surface of the bedpan when it is oriented in a position of normal use as a bedpan (generally facing upward), and "bottom" or "distal" refers to the opposite side (lower or bottom) of the bedpan (generally facing downward). The various embodiments of bedpans include a proximal side 174 indicating the structure or surface faces towards a portion of patient when in use. That is, generally oriented "up" when in use. The various embodiments of bedpans also include a distal side 176 indicating the structure or surface faces away from a portion of patient when in use. That is, generally oriented "down" when in use.

Referring again to FIGS. 1A and 1B, the bedpan 100 includes a housing 102 having a top portion 114 and a bottom portion 116 joined at a distal edge 112. In the various embodiments described herein, the top portion 114 generally refers to a portion of the bedpan that is positioned closest to the patient and/or in contact with the patient when the bedpan is being used, and the bottom portion 116 of a bedpan refers to a portion of the bedpan that is facing away from the patient and/or in contact with a bed, or another surface that supports the bedpan, when the bedpan is being used. The housing 102 is a low-profile housing having a low height (e.g., from the proximal surface 104 to a distal surface 104. In some examples, the height is 2". In some examples, the height is 2" plus or minus ¾". In various embodiments, the height can be from ¾" to about 5", but lower heights in the 2" to 3" range are typically preferred. The height of a bedpan used may depend in part on the patient it is being used for to make it easier to place underneath a patient and how much material the bedpan needs to hold.

The bottom portion 116 can include a distal surface 106 and a wall 150 extending from the distal surface 106 to the distal edge 112. The distal edge 112 can have a bevel 123 on at least a portion of the distal edge 112 which can eliminate a sharp edge on the bedpan. The bevel 123 can include a distal portion of the wall 152 and a proximal portion of the wall 150. The top portion 114 includes a wall 152 extending from the distal edge 112 to a proximal surface 104. The proximal edge 110 can have a bevel 122 on at least a proximal portion of the wall 152 and a portion of the proximal surface 104, which can eliminate a sharp edge on the bedpan 100. The wall 152 is angled inward from the distal edge 112 to the proximal edge 110, the slope of the wall 152 facilitating positioning the bedpan underneath a patient in an operable position. In the illustrated embodiment, the wall 152 is angled inward on all sides of the bedpan, which allows the bedpan 102 to be placed under a patient in any orientation (i.e., direction). In some embodiments, the bedpan 102 can be configured to have a wall 152 angled inward on less than all sides of the bedpan, although this may somewhat limit the direction that the bedpan can be placed under the patient.

The housing 102 can include an opening 108 through the proximal surface 104 which provides a passageway to a chamber 154 (FIG. 5) interior to the housing 120. The opening 108 in this example is generally rectangular having a length L and a width W. In some embodiments, the opening 108 has a length of 8.5", plus or minus 2". In some embodiments, the opening 108 has a width of 7.13", plus or minus 2". In other embodiments, the opening can be differently shaped (e.g., square, circular, oval, etc.). A circumferential edge 118 surrounds the opening 108. The housing 102 can include a bevel between the circumferential edge 118 and the proximal surface 104 to eliminate a sharp edge around the opening 108. An apron 130 surrounds the opening 108, and is between the opening 108 and the proximal edge 110. The apron 130 is generally planar and provides a contact surface for the patient to rest their weight on. The apron 130 includes an interior edge 142 around the opening 108, and an exterior edge 144 that is coupled to the top portion of the wall 152. The width of the apron 130 (between the opening 108 and the wall 152) can be, for example, between ½" and 4", and is preferably between 1" to 3". The chamber 154 extends underneath at least a portion of the apron 130 such that the apron 130 provides splash protection for fluids and solid material in the chamber 154.

The illustrated housing 102 is rectangular-shaped and has four lateral sides, a first side 124*a*, a second side 124*b*, a third side 124*c* on an opposite side of the first side 124*a*, and a fourth side 124*d* on an opposite side of the second side 124*b*. In other embodiments, the housing can have other shapes. For example, the housing 102 can include three sides, four sides, or five sides. In some embodiments, the housing 102 can have more than five sides. In the illustrated embodiment, the housing has four corners 140*a-d* positioned respectively between the sides 124*a-d*.

The housing 102 also includes a least one handle. In the illustrated example, the housing 102 includes a first handle 126 on the first side 124*a*. The first handle 126 includes an opening, or a recess 132 in the housing 102. In this example, the opening 132 extends through the housing 102. The first handle 126 also includes a wall 136 facing the opening 132, and includes a pull member 146 that is configured for a user to engage with fingers to pull, or push, the bedpan under a patient or to remove the bedpan from underneath a patient. The housing 102 also includes a second handle 128 on the second side 124*b*, which is adjacent to the first side 124*a*. The second handle 128 includes a wall 138 facing an opening 132. The second handle 128 also includes a pull member 148 that is configured for a user to engage with fingers to pull, or push, the bedpan under a patient or to remove the bedpan from underneath a patient.

Figure 21:
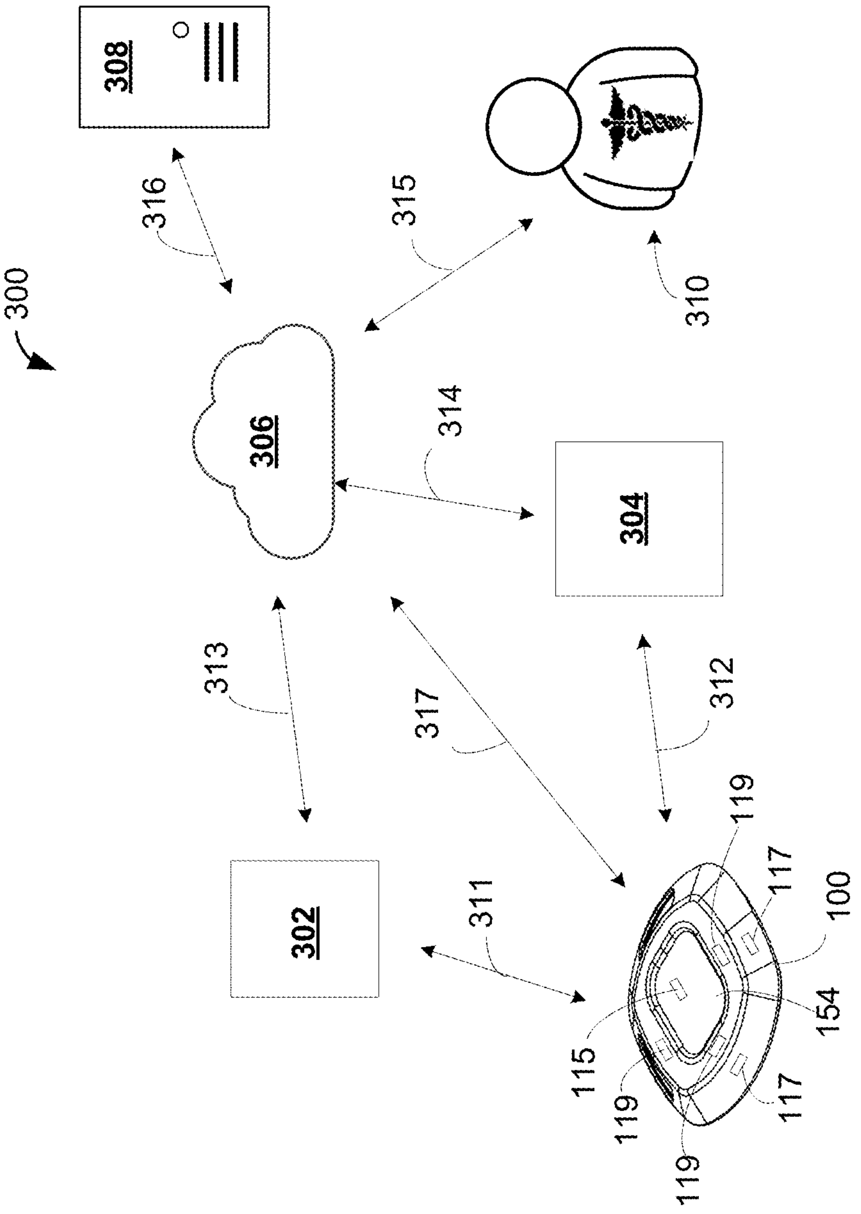
FIG. 21 illustrates an embodiment of a system for communicating sensor information from a bedpan to a smartphone, a computer, and/or through a network to a server and/or a medical practitioner.
Figure 22:
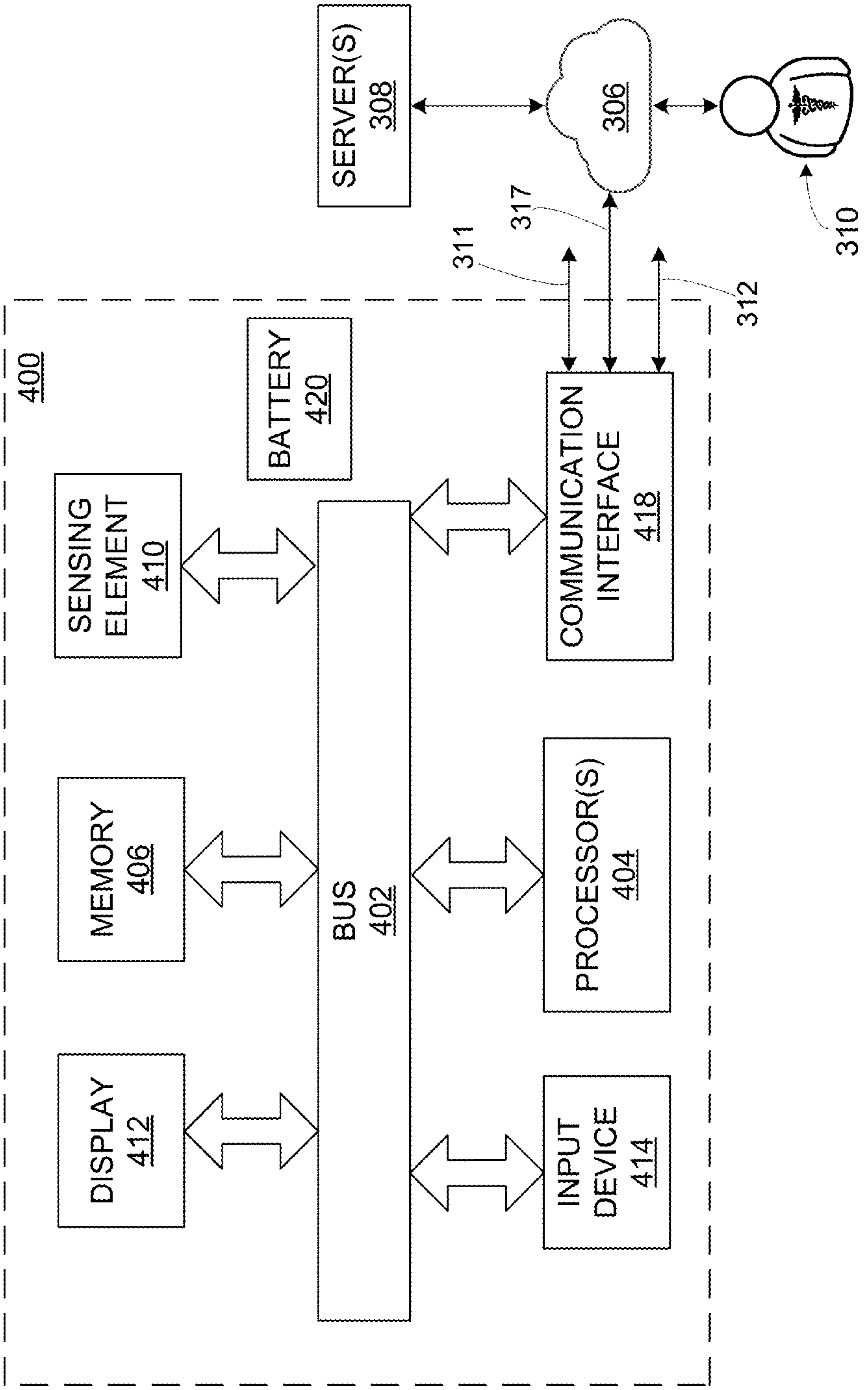
FIG. 22 illustrates an embodiment of a sensor system for sensing and communicating information to a smartphone, a computer, and/or through a network to a server and/or a medical practitioner.

Another advantage of the disclosed bedpan is that, when in use, the exterior surface is in contact with the patient for a period of time that allows information to be collected by sensors incorporated in the bedpan. In some embodiments, the bedpan can include one or more sensors that are arranged on the bedpan to provide information related to a patient and/or information related to body fluid of fecal matter from a patient. In some embodiments, the one or more sensors can be coupled to or incorporated in the structure of the bedpan. An example of an embodiment of a system for communicating sensor information from a bedpan to a smartphone, a computer, and/or through a network to a server and/or a medical practitioner is illustrated in FIG. 21 and described below. An example of an embodiment of a sensor system for sensing and communicating information to a smartphone, a computer, and/or through a network to a server and/or a medical practitioner is illustrated in FIG. 22 and described below.

Figure 1B:
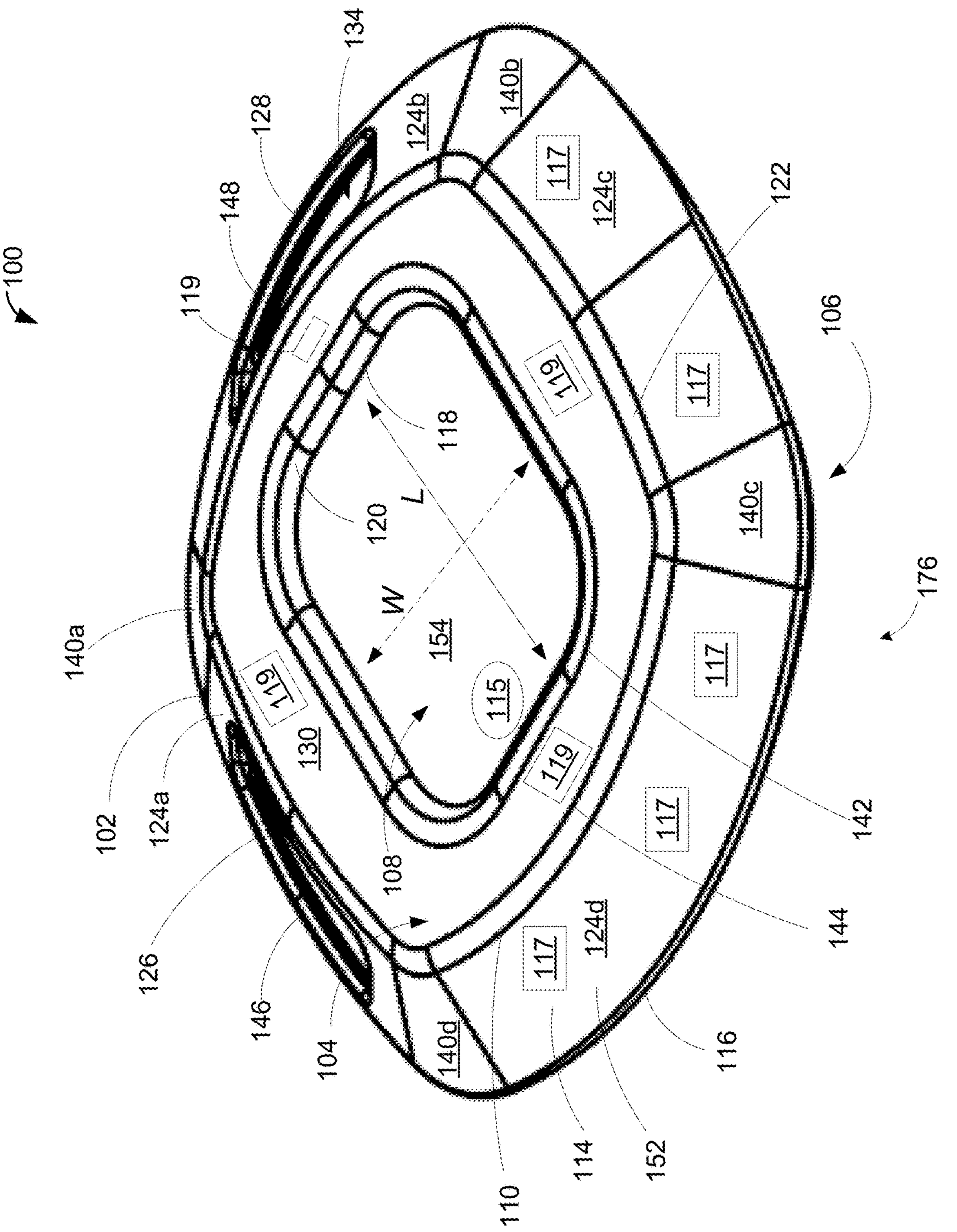

Because of the unique structure of the low-profile bedpan 100, when the bedpan 100 is in use a significant portion of the proximal surface 104 may be in direct contact with a patient's skin. One or more of a sensor, or a sensor assembly (both referred to herein as a "sensor" for ease of reference) can be located on the top portion 114 of the bedpan 100, for example, on a side wall 124 or the apron 130, and can, when in use, contact the patient's skin and provide information on one or more vital signs of a patient. FIG. 1B illustrates several example locations for placement of such a sensor 119 on the proximal surface 104 of the bedpan 100, for example, on one or more portions of the apron 130 around the opening 108. FIG. 1B also illustrates an example of a sensor 117 on the proximal surface 104 of the bedpan 100, in this example arranged on an angled wall 152 of a side wall 124 of the housing 102. In various embodiments, such sensors can be included on any of the embodiments of a bedpan disclosed herein in FIGS. 1A-22. In some embodiments, a sensor 117, 119 can provide information on the patient's vital signs including, for example but not limited to, $O_2$ perfusion, temperature, heart rate, and/or respiratory rate. Such sensors to monitor these vital signs are readily available but have not previously been incorporated into bedpans, at least in part because of the disadvantageous structure of previous bedpans. In some embodiments, a sensor can provide the sensed patient information via a wireless communication protocol to a computer or mobile device including a smartphone. For example, Bluetooth or another suitable wireless communication protocol. In some embodiments, the communication can be encrypted to meet applicable HIPPA requirements.

Given that during regular use, skin contact with the bedpan can be for several minutes (or longer), sensors with cutaneous contact can also provide information regarding the dermatological integrity of the patient's skin. This could be done by utilizing perfusion sensors in combination with sweat analysis and photogenic depth readings of the skin. This information can be used for wound management and/or to base clinical decisions about optimal therapy (e.g., use of steroids or anticoagulants in someone whose skin integrity is minimal and such therapy can cause severe side effects). The sweat analysis can also be utilized to assess some of the electrolyte measurements such as potassium, sodium or chloride. This can also be analyzed for acidosis to measure the patient's body pH. Also, the concentration of sweat and electrolyte concentration can be utilized to measure if the patient is dehydrated, especially important with demented and senile patients.

In some embodiments, one or more sensors 115 can be included in the chamber 154 (illustrated in FIG. 1B) and located such that they contact and sense information relating to urine and/or fecal matter. In some embodiments, a sensor 115 is located on the bottom surface of the chamber 154 (e.g., as illustrate in FIGS. 1A, 1B, and 17A). In some embodiments, a sensor 115 is located on the inside wall of the chamber 154 (e.g., as illustrate in FIG. 18A). One of skill in the art will appreciate any of the embodiments disclosed herein, and other embodiments, can incorporate one or more of the sensors 115, 117, and 119 (note: the sensors are not illustrated in all of the figures, but any of the embodiments can include such sensors). In an example, a sensor 115 can sense the amount of fluid in the bedpan 100. In another example, a sensor 115 can sense the amount of fecal matter in the chamber 154. The bottom surface 161 of the chamber 154 has direct contact with the urine and feces, and can host one or more sensors utilized in identifying excrement abnormalities. Urine analysis could be done automatically through a sensor 115 imbedded in the chamber 154. In some embodiments, the sensor 115 senses pH, for example, through color change of a material (e.g., litmus paper) or through the use of a pH probe/sensor. In some embodiments, a sensor 115 positioned in the chamber 154 is configured to measure specific gravity, identifying the presence of ketones/glucose or nitrites/bacteria, etc. In some embodiments, a sensor 115 located in the chamber 154 is configured to sense characteristics of fecal matter to collect information to determine a density of hard fecal matter. In some embodiments, a sensor 115 located in the chamber 154 is configured to sense characteristics of fecal matter to collect information to determine weight measurements of fecal matter in the chamber 154, the size (small clumps or large clumps) of fecal matter in the chamber 154 to identify if a patient is constipated. In some embodiments, a sensor 115 located in the chamber 154 can sense the presence of blood and other metabolic byproducts (for example, bilirubin). In some embodiments, a sensor 115 positioned in the chamber 154 is configured to sense information related to a parasite in the urine or fecal matter in the chamber 154. In some embodiments, a sensor 115 positioned in the chamber 154 is configured to sense information related to an infections. For example, COVID19*, C. Diff, Shigella, Salmonella, H. Pylori*, and the like.

Figure 2:
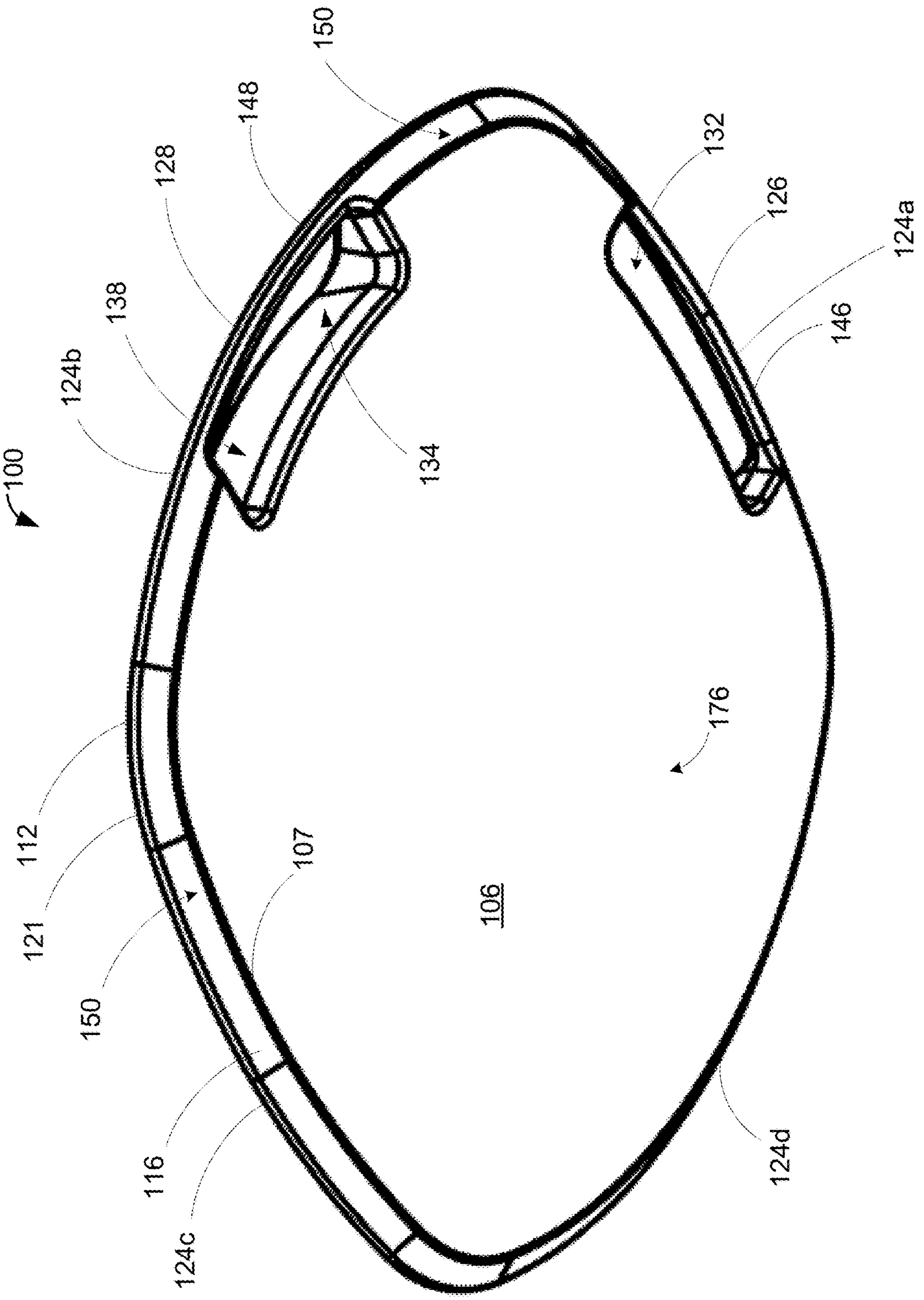
FIG. 2 is a bottom perspective view illustrating the first example of the bedpan, illustrating various structural and functional aspects of some embodiments.

FIG. 2 is a bottom perspective view illustrating the first example of the bedpan, illustrating various structural and functional aspects of some embodiments. The distal surface 106 includes a distal edge 107. The wall 150 extends from the distal edge 107 of the distal surface 107 to the distal edge 112 of the housing 102, which is the largest circumferential extent of the housing 102.

Figure 3:
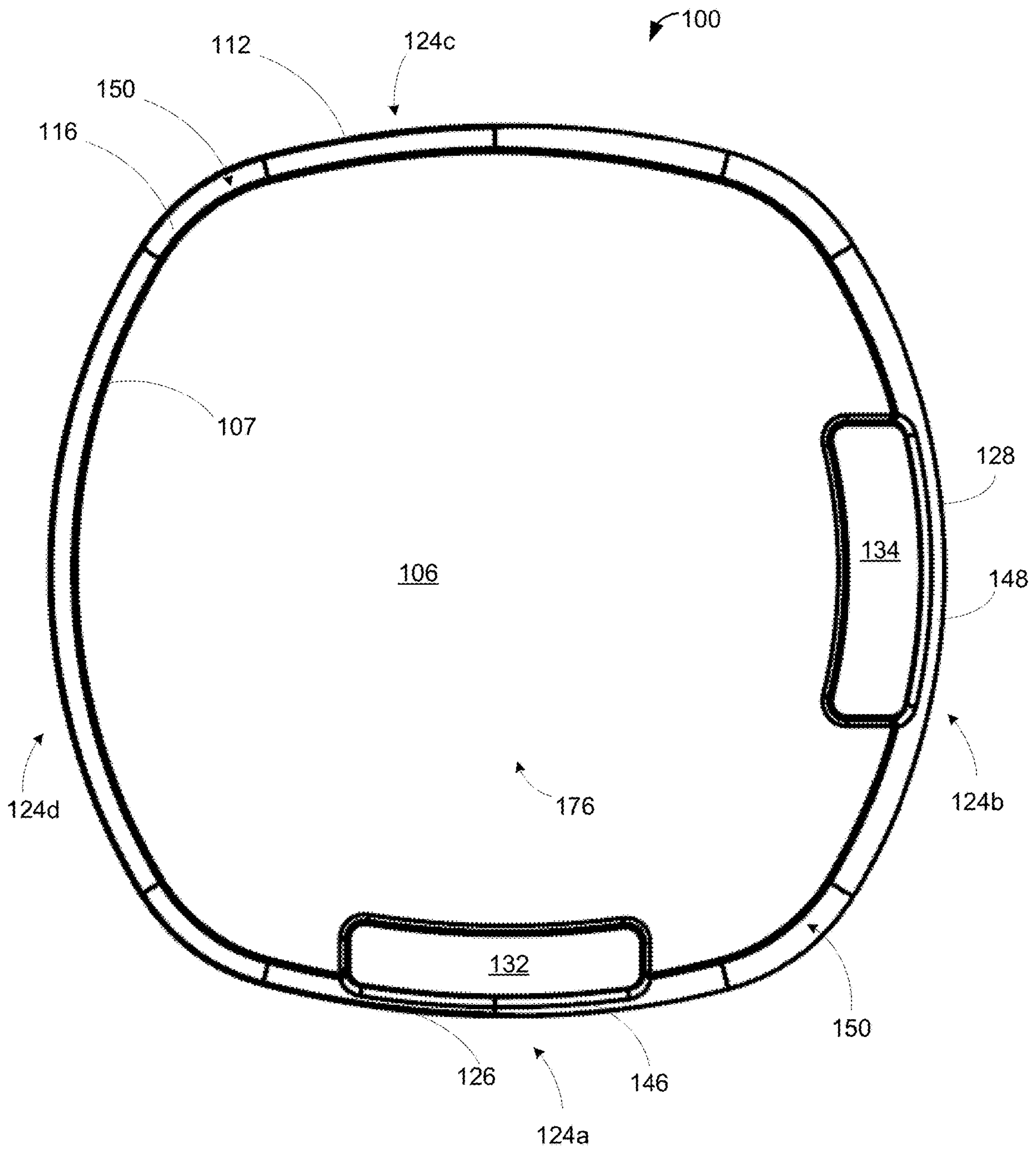
FIG. 3 is a bottom plan view illustrating the first example of the bedpan, and illustrating various structural and functional aspects of some embodiments.

FIG. 3 is a bottom plan view illustrating the first example of the bedpan, and illustrating various structural and functional aspects of some embodiments.

Figure 4:
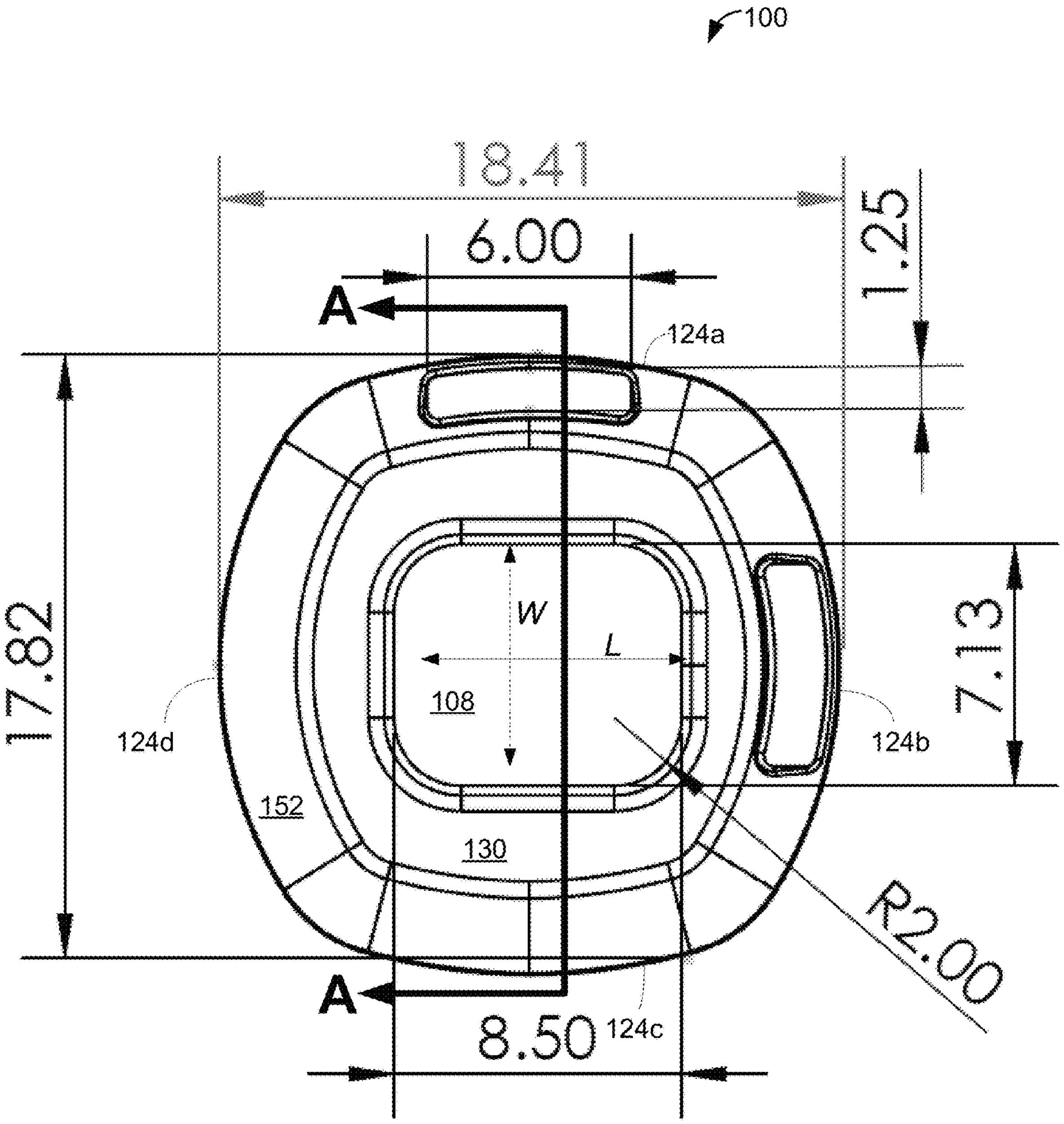
FIG. 4 is a top plan view illustrating the first example of the bedpan, and illustrating various structural and functional aspects of some embodiments, and illustrating dimensions (in inches) of one particular embodiment.

FIG. 4 is a top plan view illustrating the first example of the bedpan, and illustrating various structural and functional aspects of some embodiments, and illustrating dimensions (in inches) of one particular embodiment. For example, in some examples the length of the bedpan 200 is 18.41" and has a width of 17.82". In some embodiments, the bedpan can have a length between 12" and 23", and a width between 12" and 23". The opening 132 of the handles 126, 128 can be about 6" long and about 1.25" wide in some embodiments. In other embodiments, the opening can be between 3.5" and 12" in length. In some embodiments, a handle extends along nearly all, or all, of a side of the bedpan 102.

Figure 5:
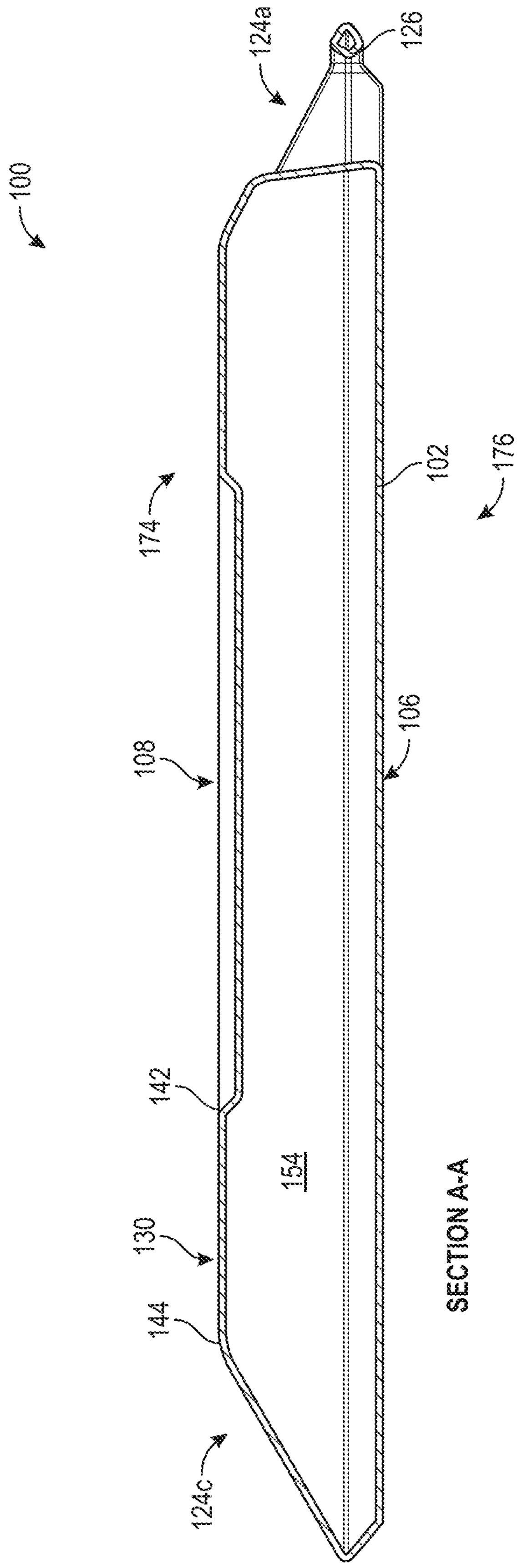
FIG. 5 is a side elevation sectional view illustrating the first example of the bedpan along line A-A shown in FIG. 4.

FIG. 5 is a side elevation sectional view illustrating the first example of the bedpan along line A-A shown in FIG. 4. In FIG. 5, the interior chamber 154 of the bedpan is illustrated in a darker color than the housing 102 of the bedpan 100. The chamber 154 can extend throughout nearly all of the housing to maximize the volume of the chamber 154. The apron 130 surrounds the opening 108. In some embodiments, the apron 130 can have a different width around the opening 108. For example, the distance of the apron 130 between the apron interior edge 142 and the apron exterior edge 144 can vary, and may vary depending on the use of the particular bedpan. The chamber 154 extends underneath the apron 130 such that the apron 130 helps to prevent spills when the bedpan is moved.

Figure 6A:
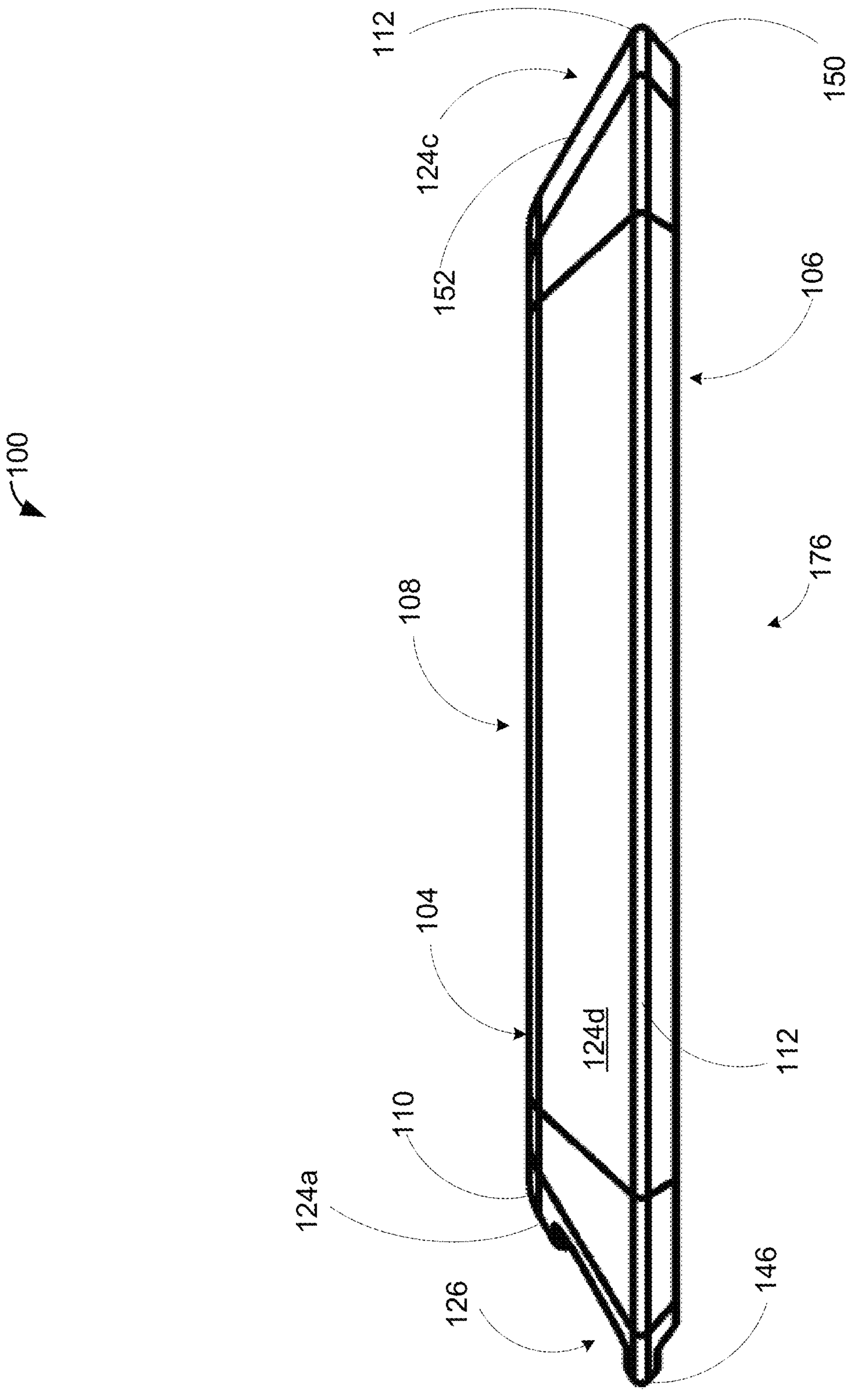
FIGS. 6A, 6B, and 6C are side elevation views illustrating the first example of the bedpan, and showing examples of dimensional aspects of the bedpan, according to some embodiments.
Figure 6B:
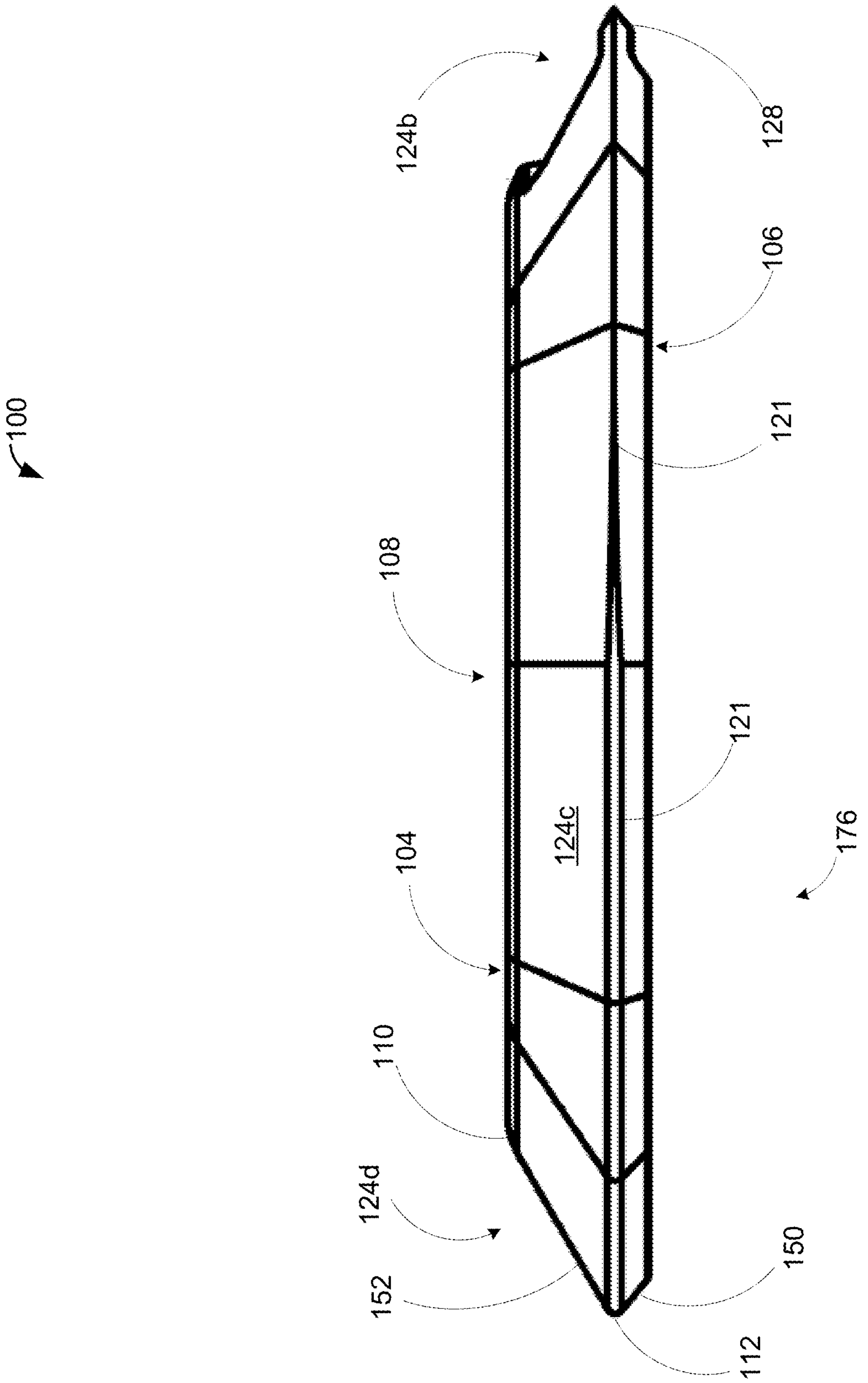
Figure 6C:
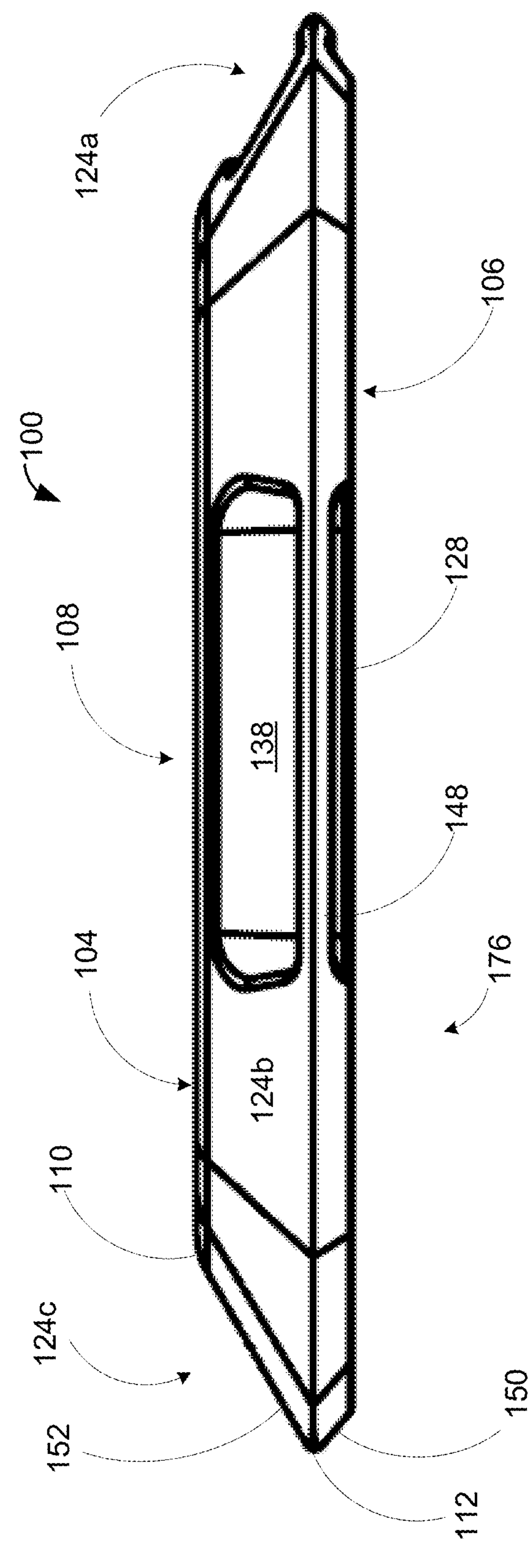

FIGS. 6A, 6B, and 6C are side elevation views illustrating the first example of the bedpan, and showing examples of dimensional aspects of the bedpan, according to some embodiments.

Figure 7:
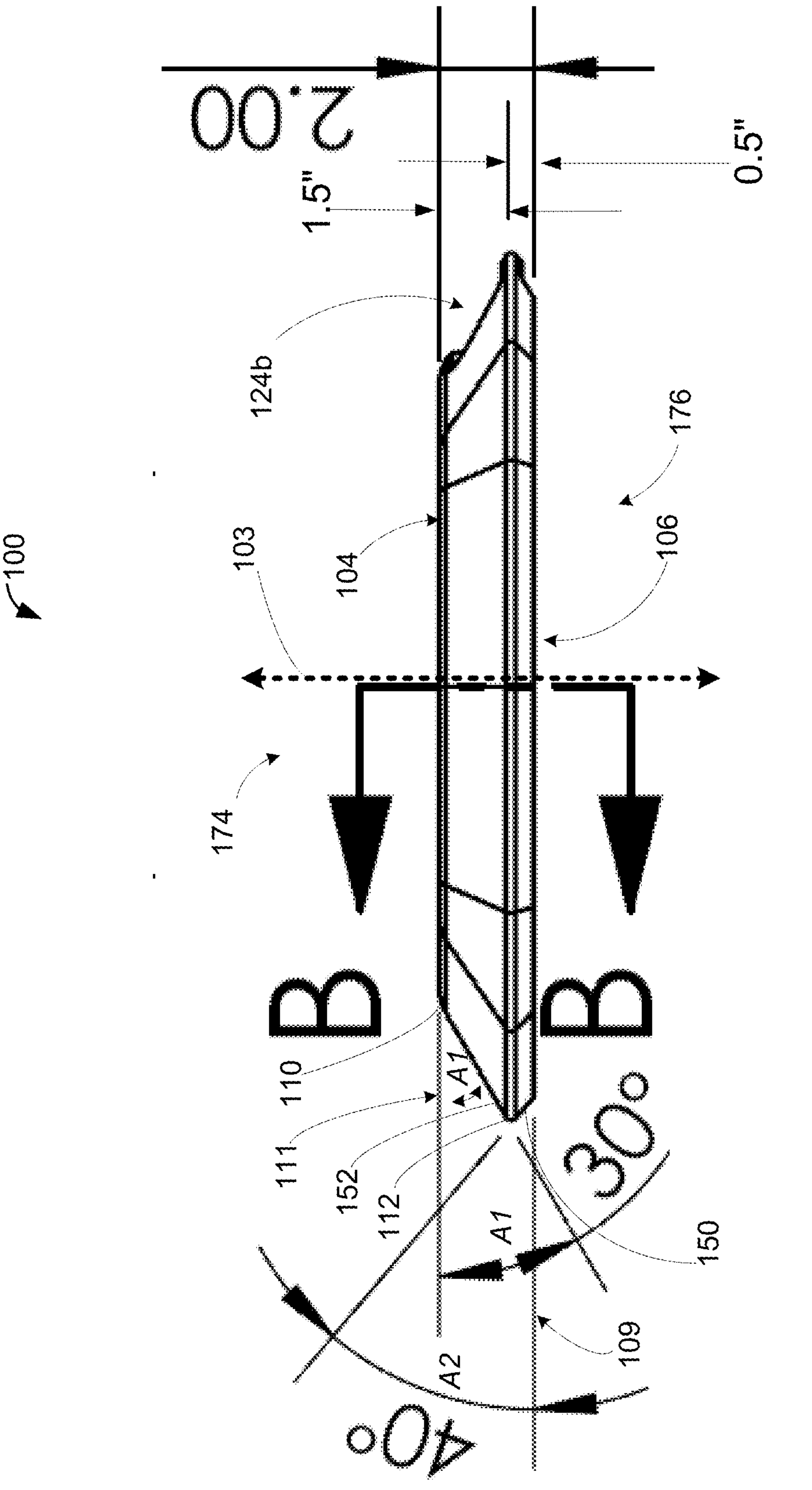
FIG. 7 is another side elevation view illustrating the first example of the bedpan, and showing examples of dimensional aspects of the bedpan, according to some embodiments.

FIG. 7 is another side elevation view illustrating the first example of the bedpan 100, and showing examples of dimensional aspects of the bedpan, according to some embodiments. The profile of the bedpan is low, in this example the height of the bedpan being about two inches. As the height is decreased the interior chamber volume is decreased, so it should not be too low in height unless it is being used for a patient that will not be urinating or defecating larger volumes. With this in mind, in some examples the overall height of the bedpan can be at or between 0.5 inches and 3 inches. In some embodiments, the height of the bedpan is more advantageously configured to be at or between 1.5 inches and 2.5 inches. Also, in this example the bottom portion has a height of 0.5 inches and the top portion has a height of 1.5 inches. In other embodiments, the height of the bottom portion can be, for example, at or between 0.2 inches and 1 inch, and the height of the top portion can be, for example, at or between 1 inch and 2 inches. For case of reference in all the embodiments, reference can be made to a longitudinal axis 103 of the bedpan, the longitudinal axis 110 being perpendicular (or nearly so) to a plane 109 aligned with circumferential edge of the distal surface 106 and perpendicular (or nearly so) to a plane 111 aligned with a circumferential edge 110 of the proximal surface 104. In preferred embodiments, plane 111 is aligned parallel to plane 109, although in some embodiments they may be approximately aligned in parallel. Generally the bedpan is in a position for use with the longitudinal axis 103 is aligned vertically, as shown in the orientation relative to FIG. 7.

In this example, the wall 150 of the bottom portion extends from the distal surface at an angle A2 of 40 degrees. In various embodiments, the angle A2 can be at or between about 10 degrees and 90 degrees. For example, the angle A2 can be 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 4°,7 48°, 49°, 50°, 51°, 52°, 53°, 54°, 5°,5 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, or 90°, plus or minus 0.5°. This extension of the wall 150 facilitates the configuration of a smaller distal surface 106 and raises the top portion of the housing above the distal surface 106, which allows the bedpan to be slid into place easier (e.g., without catching on a sheet or other covering or material underneath a patient that the bedpans is placed on top of. The wall 152 of the top portion of the housing is joined to the wall 150 along the distal edge 112 and extends to the proximal edge 110 of the housing, as also illustrated in, for example, FIGS. 1A and 1B. The wall 152 extends from the distal edge to the proximal edge at an angle A1 of 30 degrees, relative to the plane of the proximal surface 104. In various embodiments, the angle A1 can advantageously be at or between about 10 degrees and 50 degrees. In some embodiments, the angle A1 is greater than 50 degrees. A smaller angle A1 (e.g., a lower slope of the side wall 152 in the illustrated orientation) provides the advantage of easier placement of the bedpan under a patient, as it allows the bedpan to be slid under a patient easier, if necessary due to the patient's inability to lift themselves up when the bedpan is positioned for use. In some embodiments, a smaller angle A1 may result in a smaller volume of the chamber 154. In various embodiments, an angle A1 of the wall 152 can be 1°, 2°, 3°, 4°, 5°, 6°, 7°, 8°, 9°, 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 4°,7 48°, 49°, 50°, 51°, 52°, 53°, 54°, 5°,5 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, or 85°, plus or minus 0.5°. In some embodiments, all of the wall 152 extending from a bottom portion of the housing 102 to a top portion of the housing 102 can be structured to have the above-described slope. In some embodiments, some of the wall 152 can be structured to have the above-described slope. For example, about 25% to about all or nearly 100% of the wall 152.

Figure 8A:
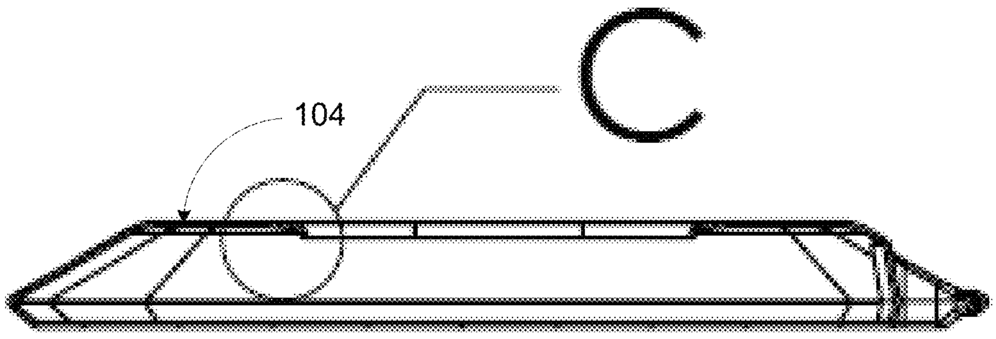
FIG. 8A is another side elevation sectional view illustrating the first example of the bedpan along line B-B of FIG. 6, indicating a Portion C of an edge (e.g., a bevel) of a proximal surface of the bedpan housing that surrounds an opening in the proximal surface, according to some embodiments.

FIG. 8A is another side elevation sectional view illustrating the first example of the bedpan along line B-B of FIG. 6, indicating a Portion C of an edge of a proximal surface of the bedpan housing that surrounds an opening in the proximal surface, according to some embodiments.

Figure 8B:
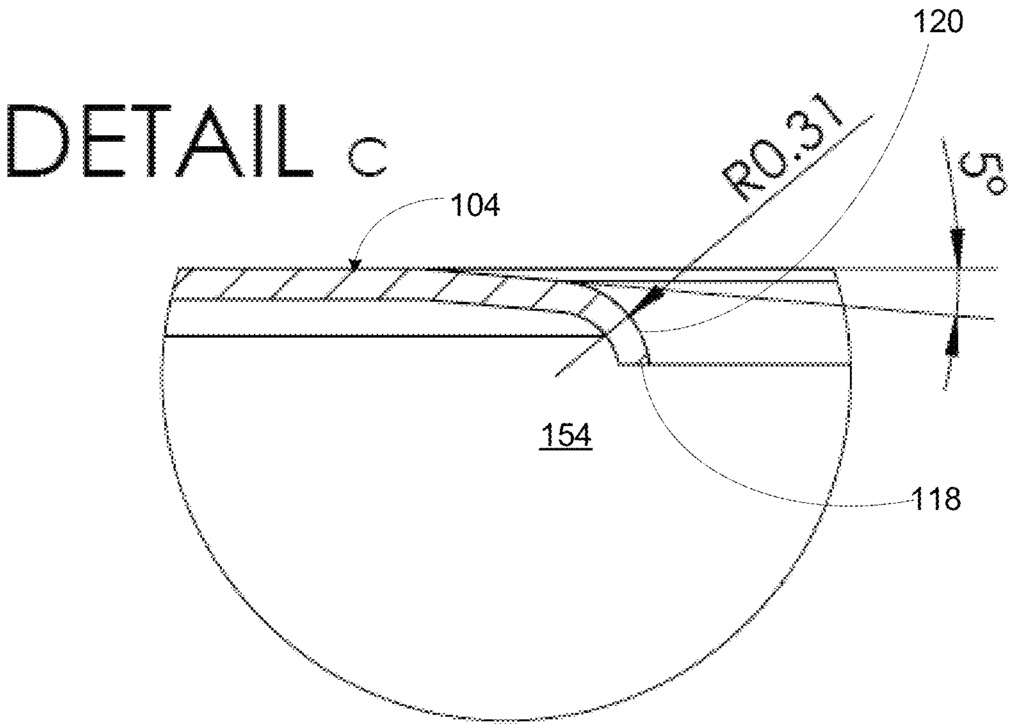
FIG. 8B is a detailed view of Portion C, illustrating an example of the edge of the proximal surface of the housing that surrounds the opening in the proximal surface, according to some embodiments.

FIG. 8B is a detailed view of Portion C, illustrating an example of the edge of the proximal surface of the housing that surrounds the opening in the proximal surface, according to some embodiments.

Figure 9:
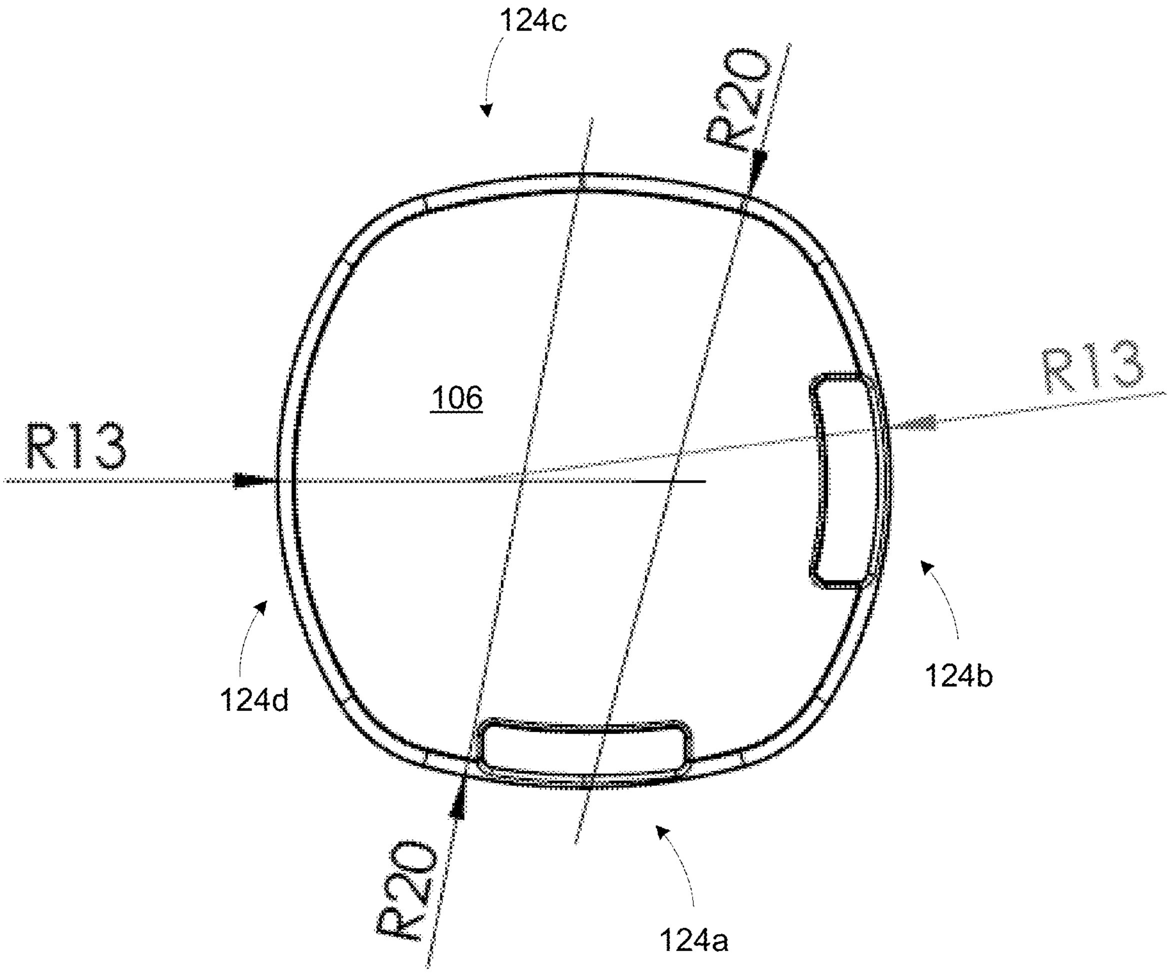
FIG. 9 is a bottom plan view illustrating the first example of the bedpan, illustrating certain dimensions of the housing.

FIG. 9 is a bottom plan view illustrating the first example of the bedpan, illustrating certain dimensions of the housing.

Figure 10:
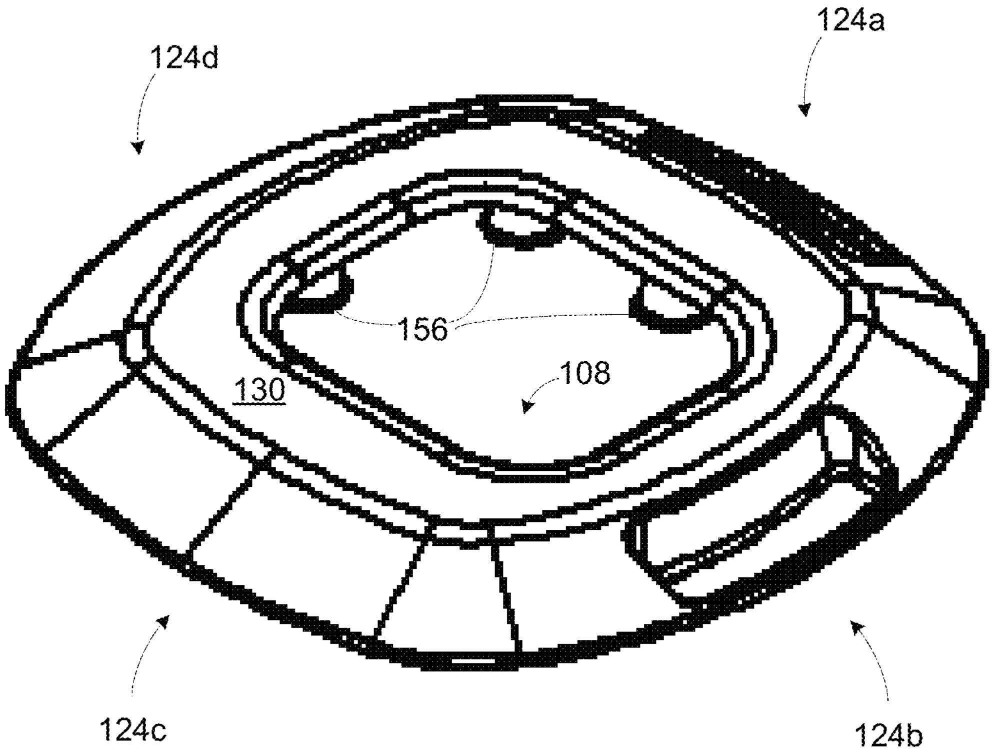
FIG. 10 is a top perspective view of an example of a bedpan illustrating an example of supports positioned in the chamber of the housing, each support coupled to a top interior surface and a bottom interior surface.

FIG. 10 is a top perspective view of an example of a bedpan illustrating an example of supports positioned in the chamber of the housing, each support 156 is coupled to a top interior surface (e.g., of the top portion) and a bottom interior surface (e.g., of the bottom portion). The supports 156 allow the bedpan to support a greater amount of weight on the top of the bedpan, for example, on the apron 130, without the bedpan breaking or permanent deformation occurring.

Figure 11:
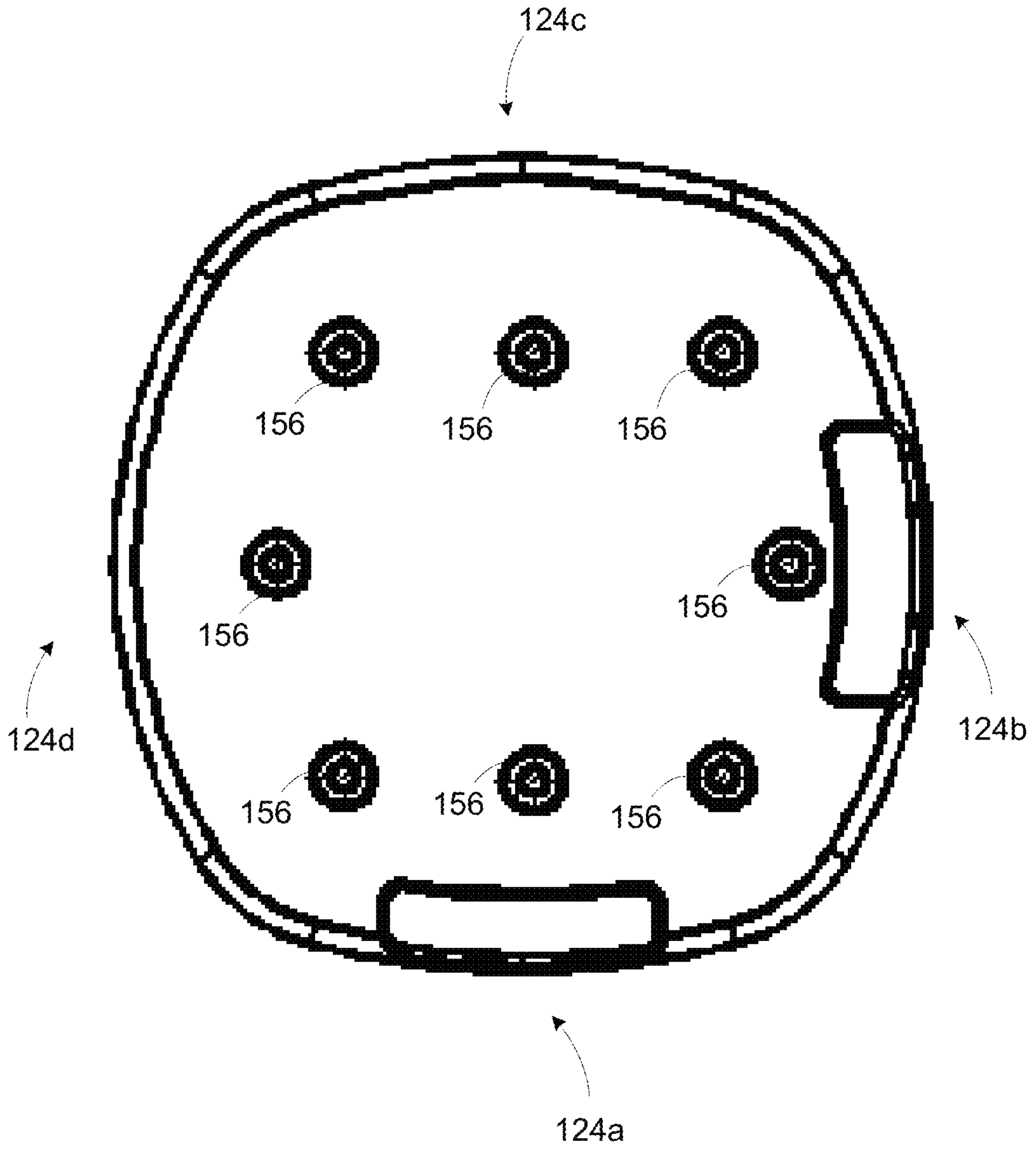
FIG. 11 is a bottom plan view cut-away view illustrating an arrangement of supports 156 that are positioned in the chamber of a bedpan, according to some embodiments.

FIG. 11 is a bottom plan view cut-away view illustrating an arrangement of supports 156 that are positioned in the chamber of a bedpan, according to some embodiments. This embodiment includes nine supports 156 positioned around the opening. In most embodiments, the bedpans disclosed herein include at least one support. In some embodiments, the bedpans include a plurality of supports.

Figure 12:
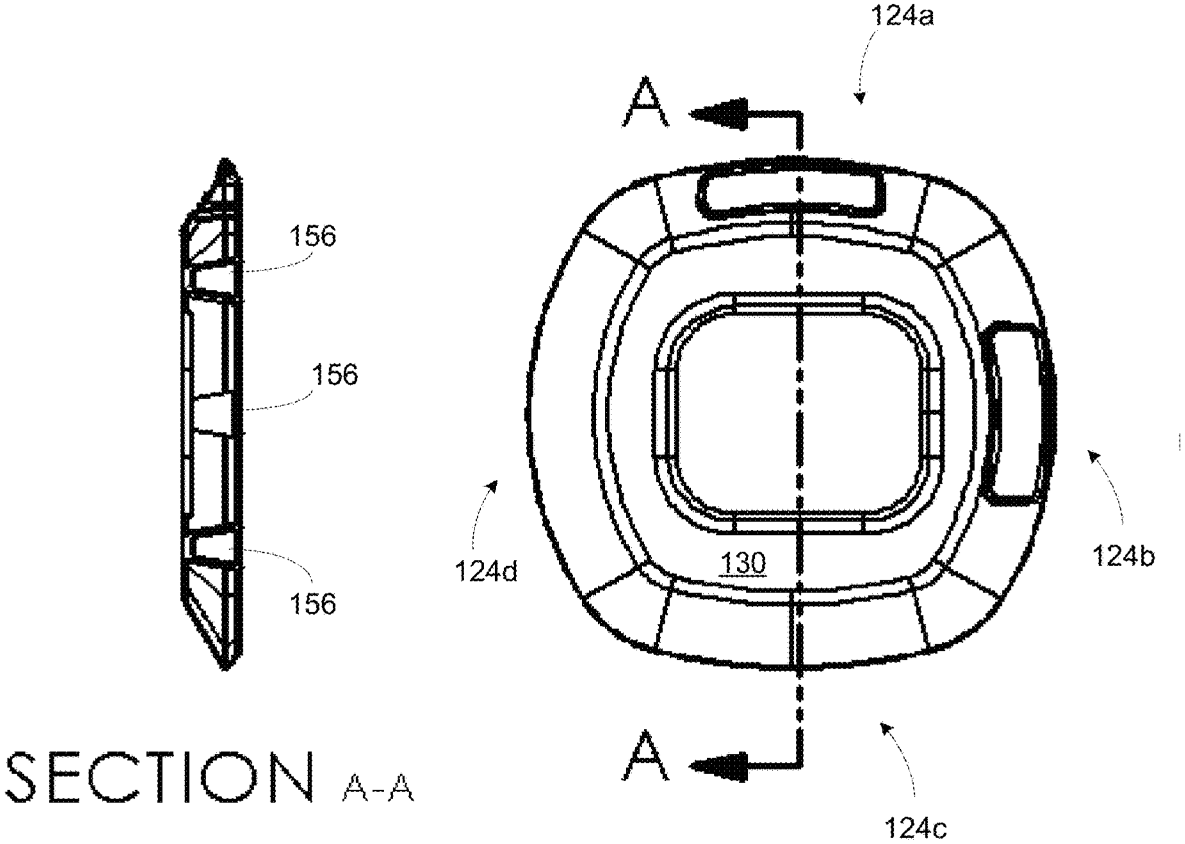
FIG. 12 shows a cross-sectional view, along line A-A, of a bedpan (left-side) and a top plan view of the same bedpan showing line A-A.

FIG. 12 shows a cross-sectional view, along line A-A, of a bedpan (left-side) and a top plan view of the same bedpan showing line A-A.

Figure 13:
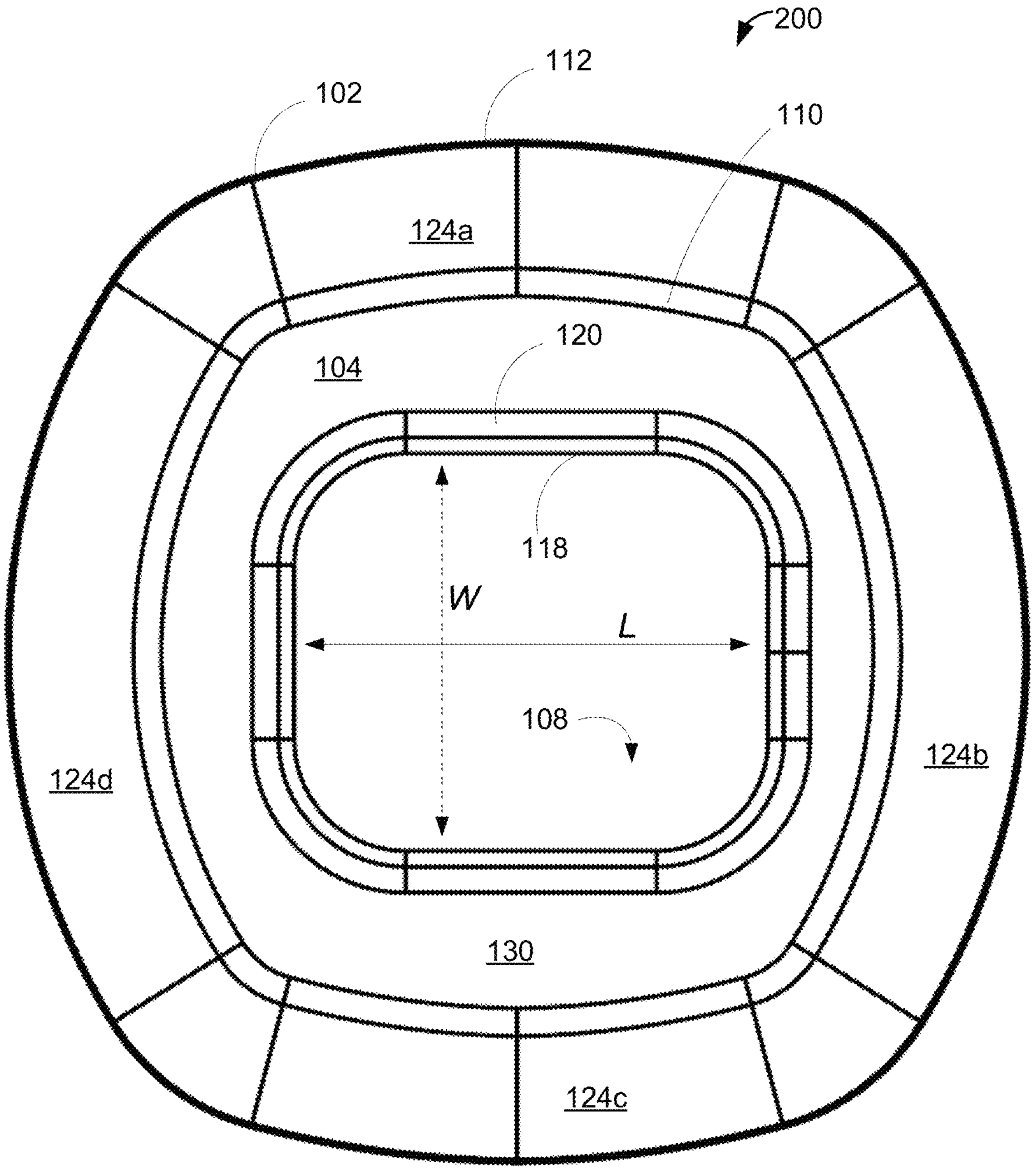
FIG. 13 is a top plan view illustrating a second example of the bedpan that does not include handles formed in the housing, according to some embodiments.

FIG. 13 is a top plan view illustrating a second example of the bedpan 200 that does not include handles formed in the housing, according to some embodiments. Other features of the bedpan 200 can be the same as the features of the bedpan 100 illustrated in FIG. 1A-12.

Figure 14:
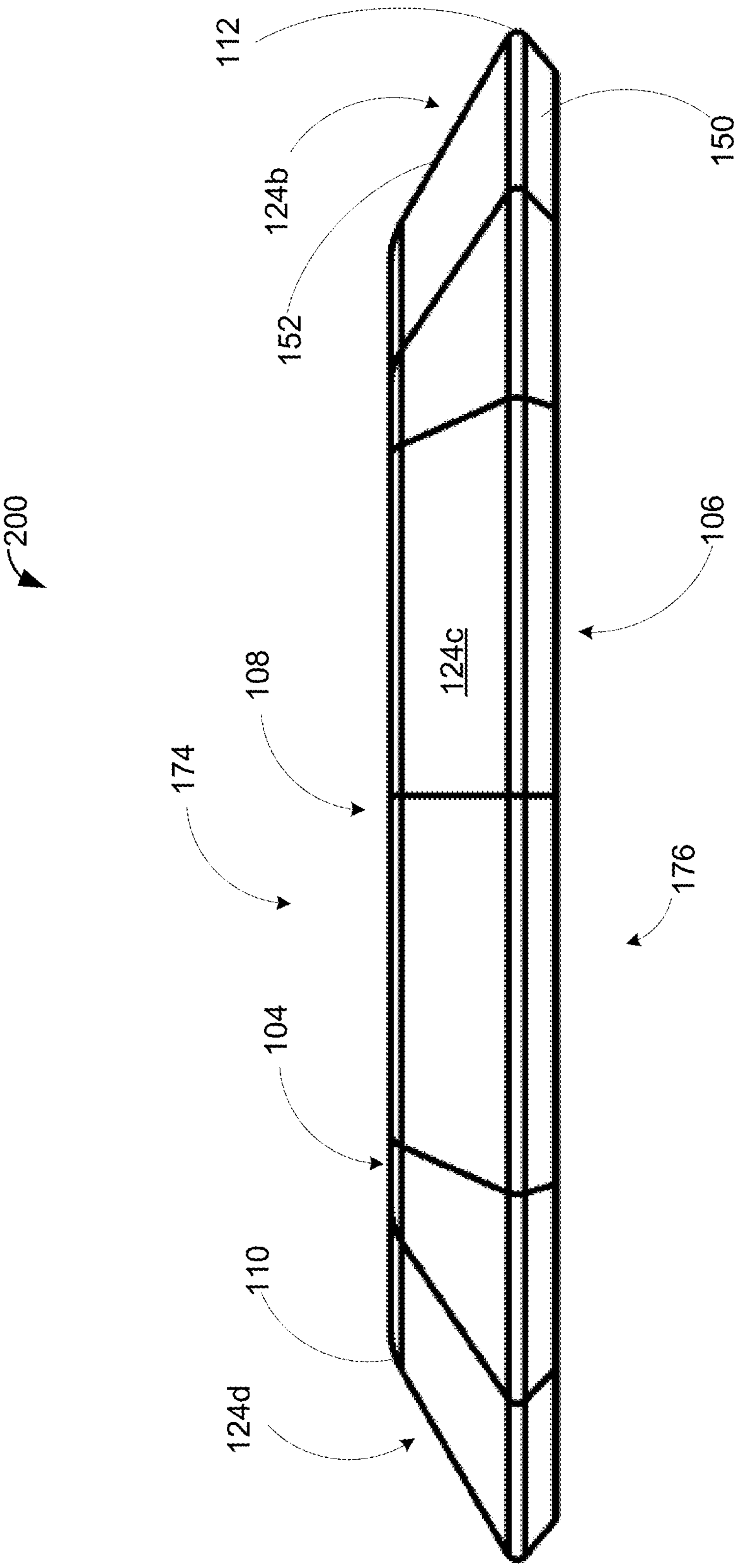
FIG. 14 is a side elevation view of a first side of the second example of the bedpan illustrated in FIG. 13.

FIG. 14 is a side elevation view of a first side of the second example of the bedpan 200 illustrated in FIG. 13.

Figure 15:
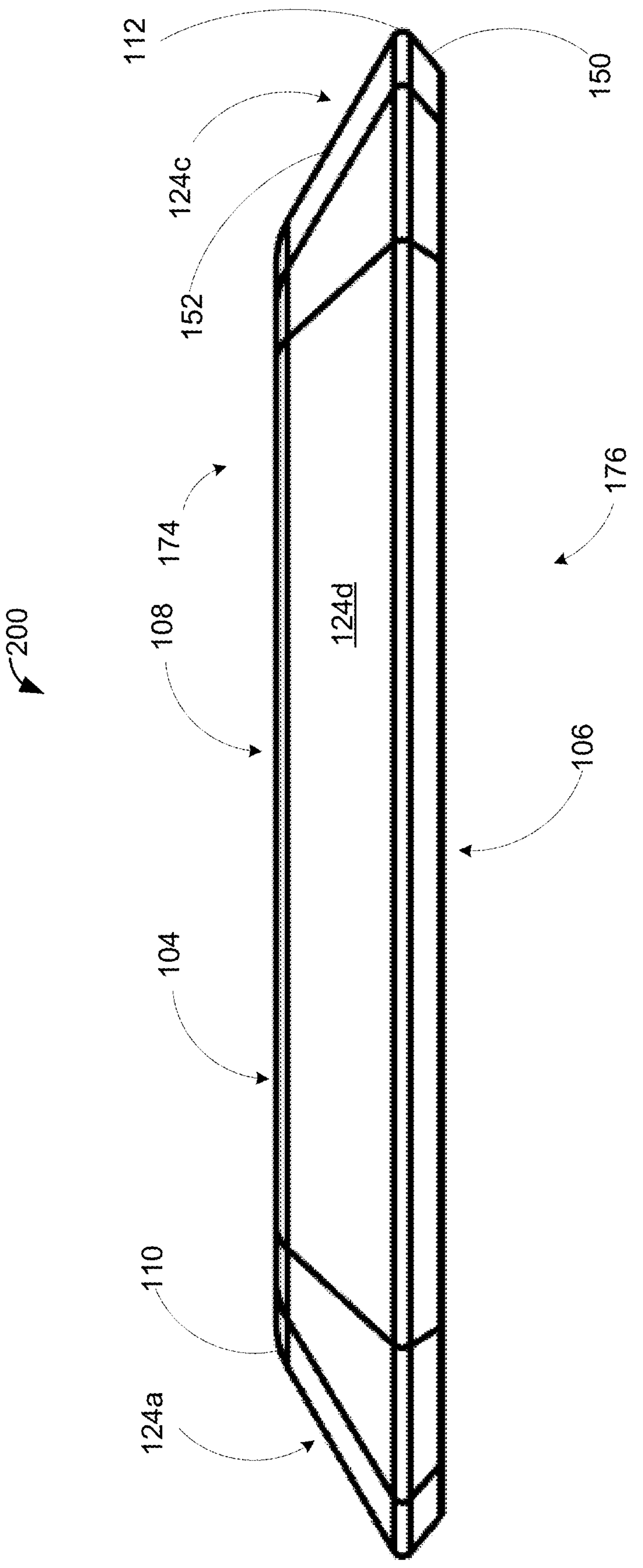
FIG. 15 is a side elevation view of a second side of the second example of the bedpan illustrated in FIG. 13.

FIG. 15 is a side elevation view of a second side of the second example of the bedpan illustrated in FIG. 13.

Figure 16:
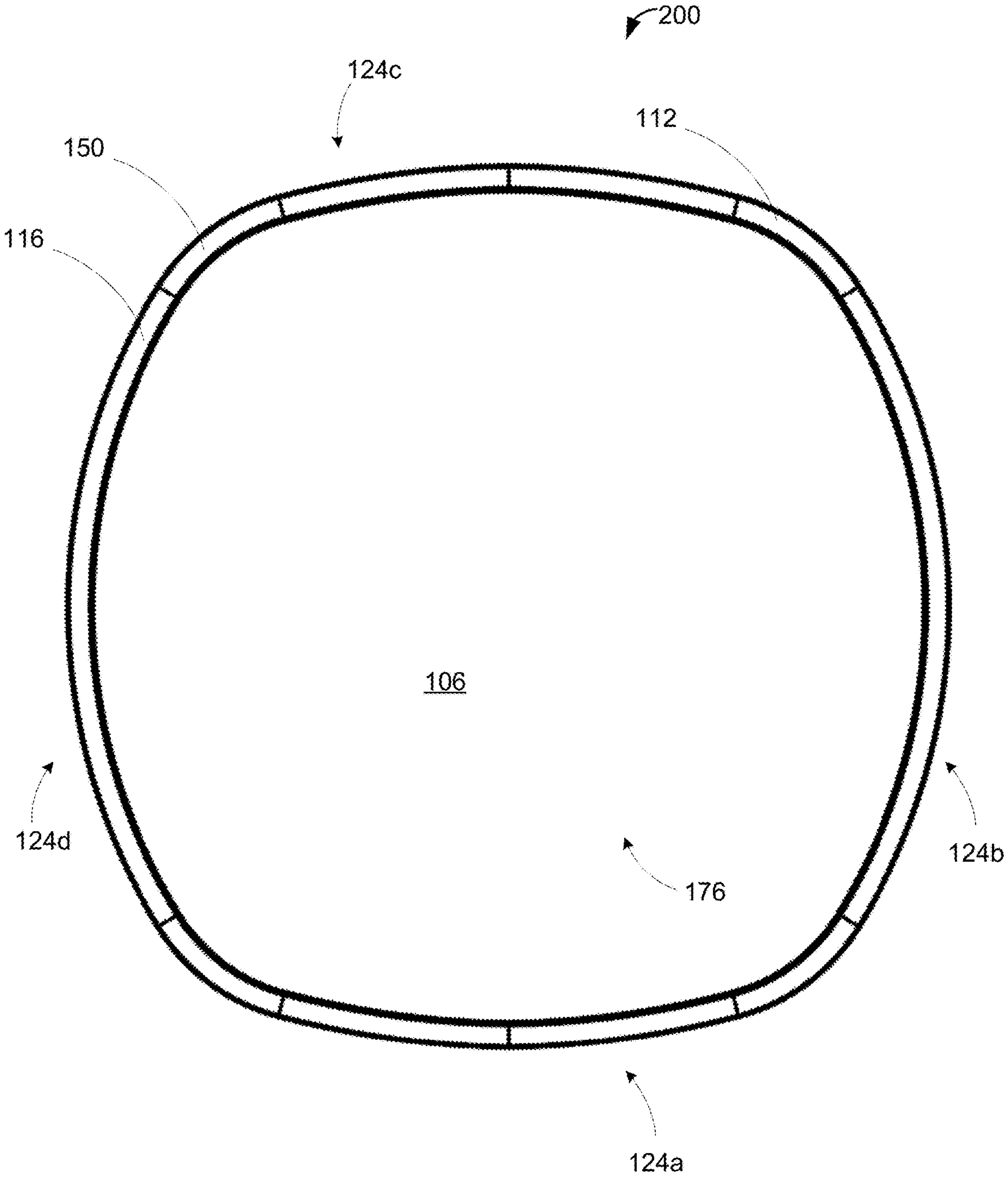
FIG. 16 is a bottom plan view illustrating the second example of the bedpan illustrated in FIG. 13, according to some embodiments.

FIG. 16 is a bottom plan view illustrating the second example of the bedpan illustrated in FIG. 13, according to some embodiments.

Figure 17A:
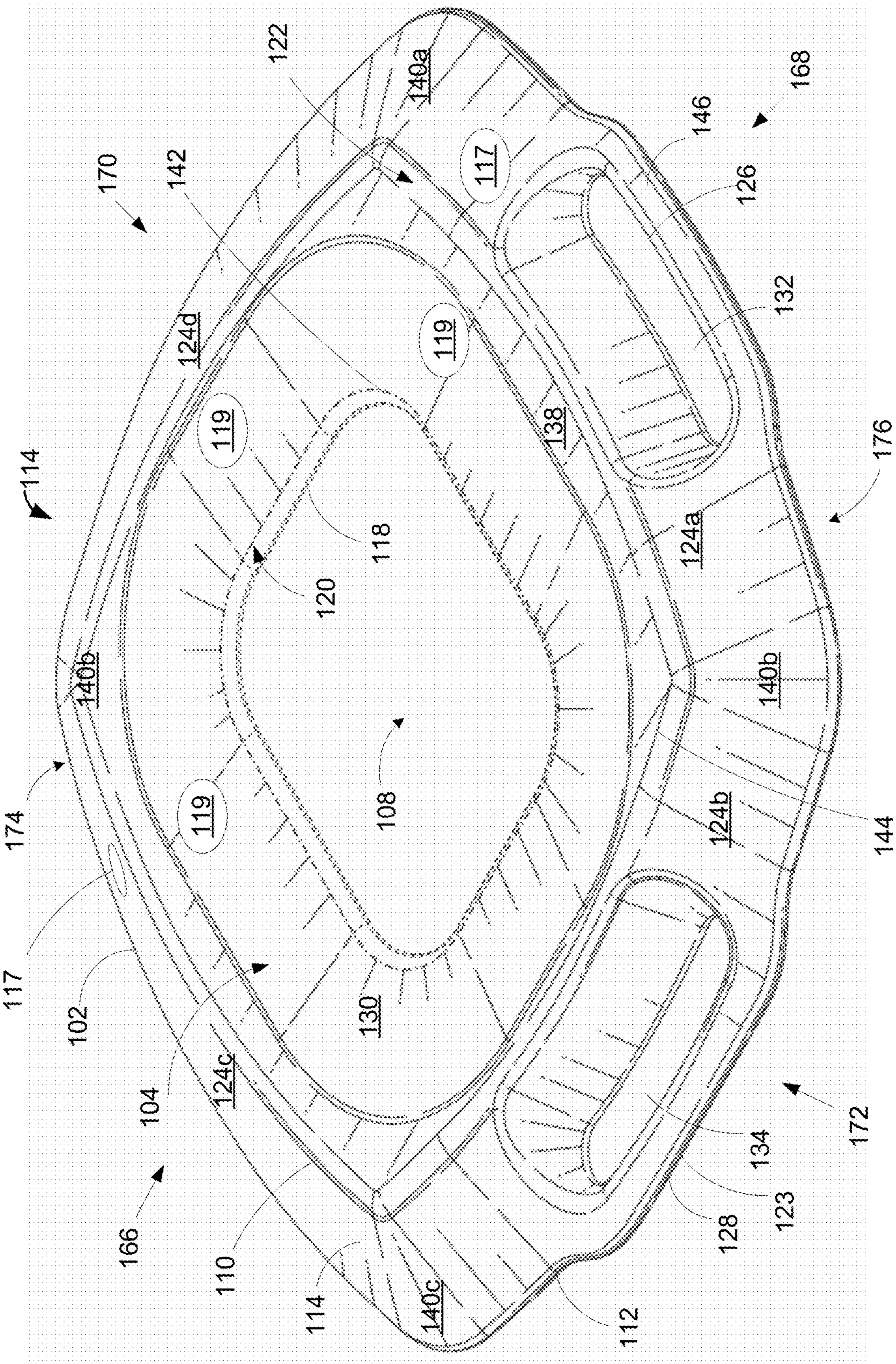
FIG. 17A is a perspective view illustrating an example embodiment of the top portion of the bedpan.

FIG. 17A is a perspective view illustrating another example of an embodiment of a top portion 114 of a bedpan. This embodiment of a top portion 114 of a bedpan can include many of the same features as previously described, and as indicated in the list of certain components above. As also illustrated in other embodiments, this embodiment includes sidewalls 124*a-d* that are angled (or sloped) inwards as they extend from a distal edge 112 around the bottom of the top portion 114 to a proximal surface edge 110 and the apron 130 on the top surface of the top portion 114. Just also as illustrated in FIGS. 1A and 1B, this embodiment contains a first handle 126 and a second handle 128 formed within the bedpan housing 102. In some embodiments, the bedpan may include a single handle. An apron 130 surrounds an opening 108, which leads to the internal chamber of the bedpan, in the top of the housing 102. The opening has a circumferential edge 118 around the opening 108. In this embodiment, the circumferential edge 118 contains a bevel 120. The apron 130 extends from an exterior edge 144 to an interior edge 142. Preferably, at least a portion of the apron 130 slopes downward as it extends from an exterior edge 144 to an interior edge 142 to facilitate the flow of urine into the opening 108. This example embodiment of a top portion 114 may be paired to a bottom portion of varying designs to create an operable bedpan. For example, the bottom portion 116 illustrated in FIGS. 18A-18G. In some embodiments, the top portion 114 can include the hinge mechanism 165 illustrated in FIGS. 23-29 to attach to a bottom portion of a bedpan. In some embodiments, the top portion 114 can include one or more of sensors 117 or 119 to sense a characteristic of a patient, for example, as described in reference to FIGS. 1A, 1B, 21 and 22.

Figure 17B:
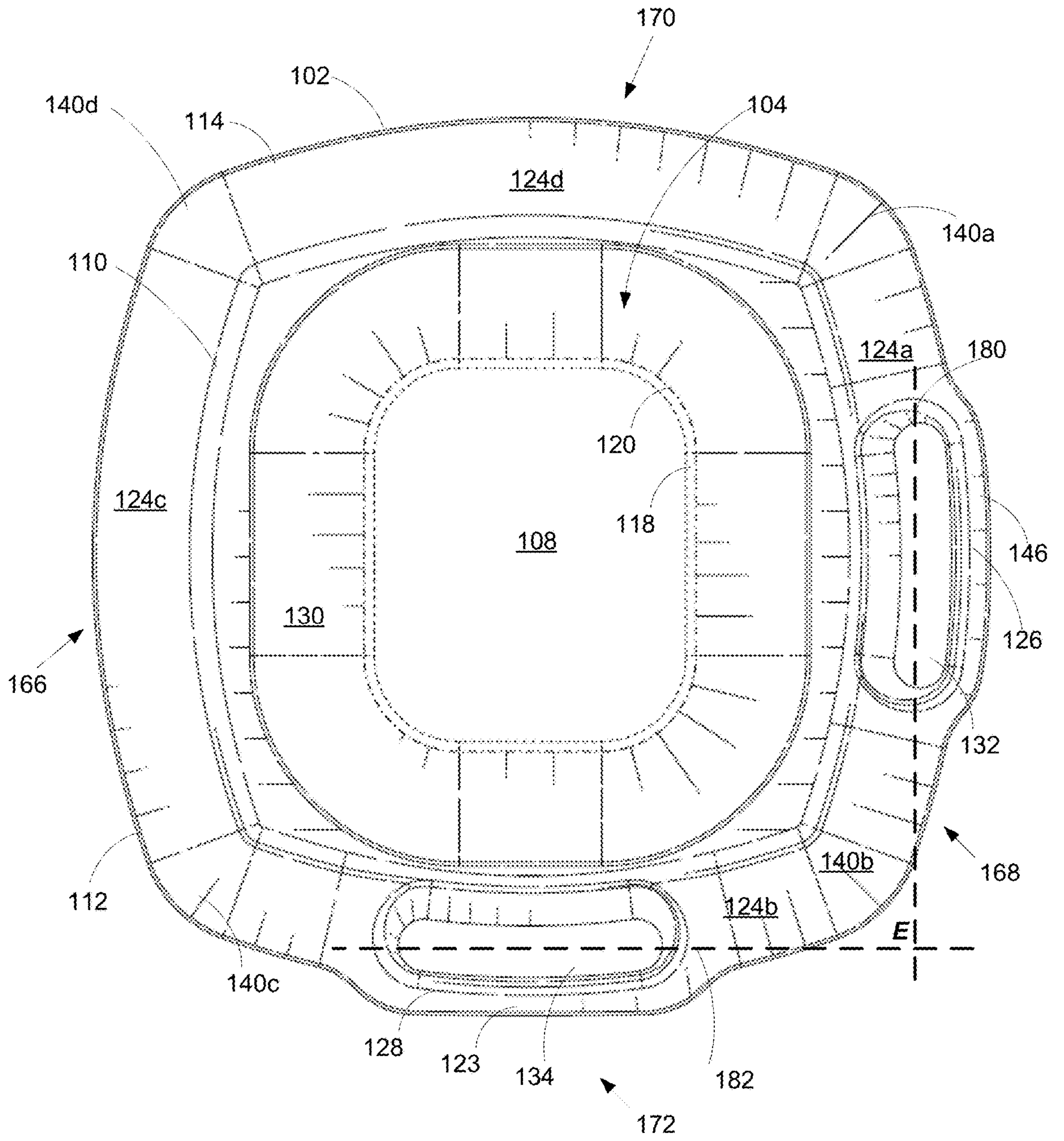
FIG. 17B is a top view of the top portion embodiment illustrated in FIG. 17A.
Figure 17C:
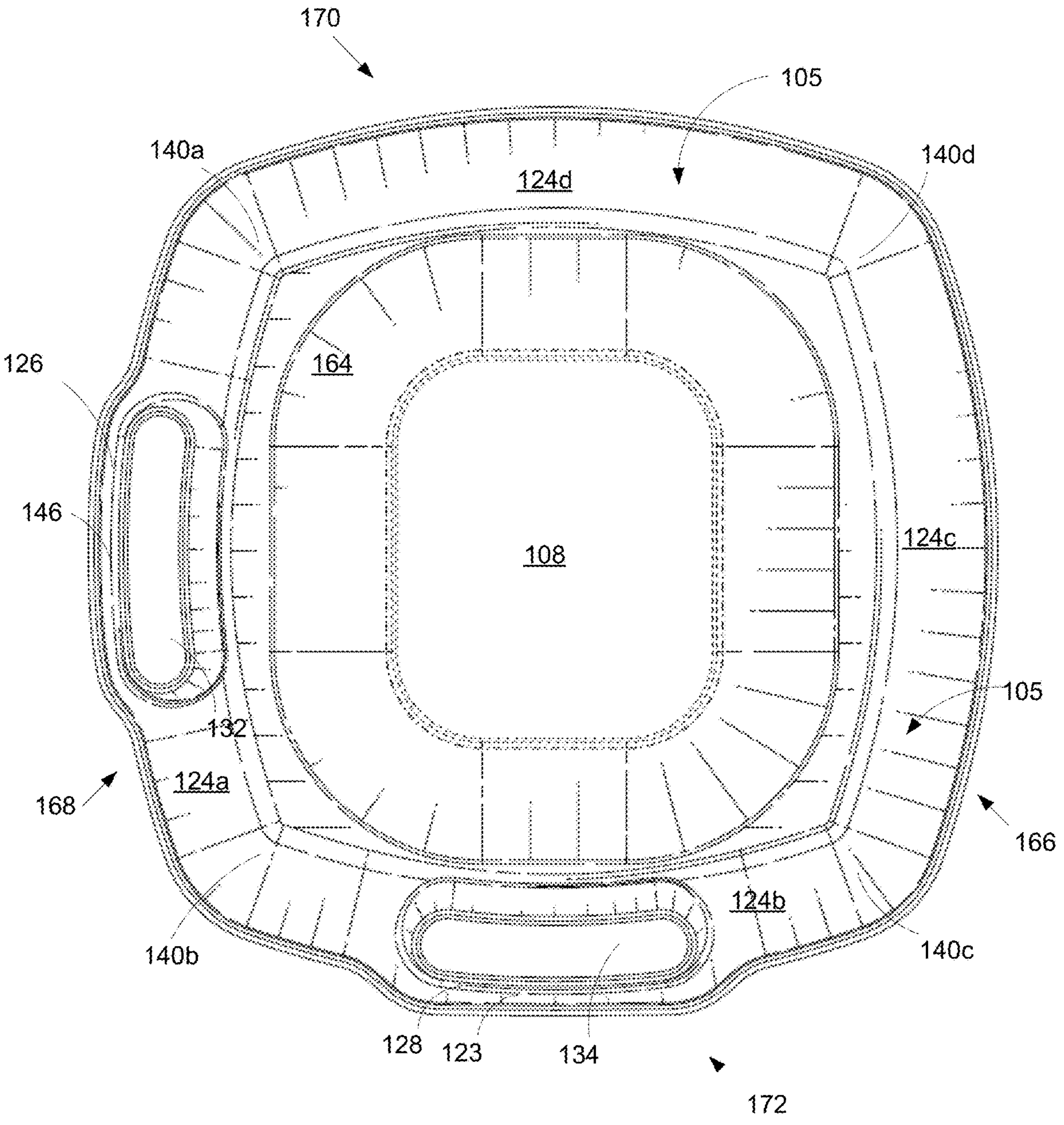
FIG. 17C is a bottom view of the top portion embodiment illustrated in FIG. 17A.

FIG. 17B and FIG. 17C are a top plan view and a bottom plan view, respectively, of the top portion 114 illustrated in FIG. 17A. When paired with a bottom portion (e.g., the bottom portion illustrated in FIGS. 18A-18G), the top portion distal surface 105 and underside 164 (FIG. 17C) are positioned inside the bedpan and not visible. As illustrated in the figures, in some embodiments the bedpan can have two handles located on different sides of the bedpan to facilitate placing the bedpan in a position for use (e.g., under a patient) and removing the bedpan (e.g., from underneath a patient). As illustrated in this embodiment, and as applicable to any of the other embodiments with two handles, the first handle 126 can have a first handle longitudinal axis 180 and the second handle 182 can have a second handle longitudinal axis 182. An angle E can be formed by the intersection of the first handle longitudinal axis 180 and the second handle longitudinal axis 182, as illustrated in FIG. 17B. In some embodiments, angle E can be 90°. In some embodiments, angle E can be 90° plus or minus 30°.

Figure 17D:
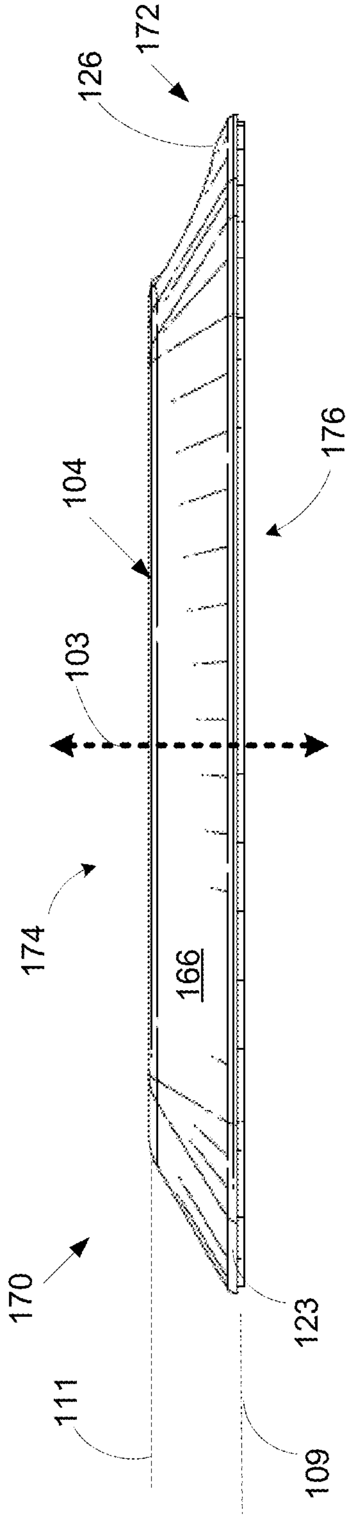
FIG. 17D is a left side view of the top portion embodiment illustrated in FIG. 17A.
Figure 17E:
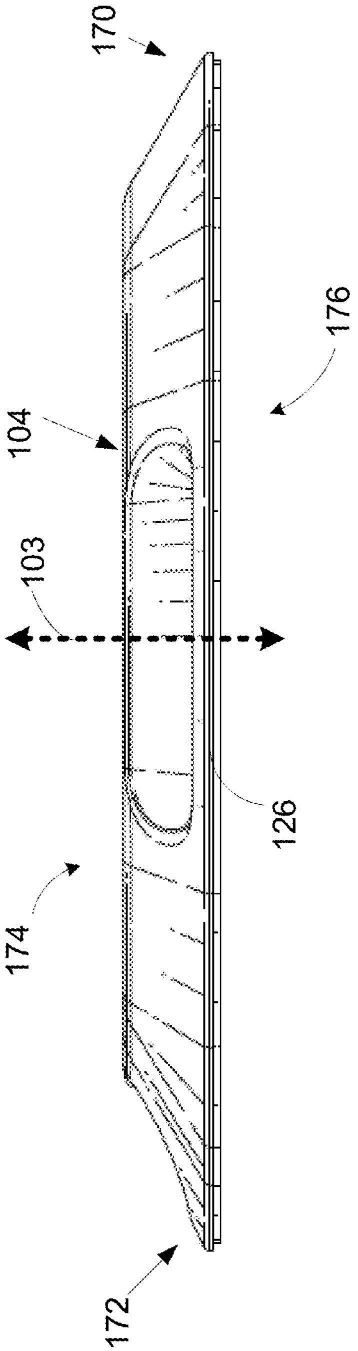
FIG. 17E is a right side view of the top portion embodiment illustrated in FIG. 17A.

FIG. 17D and FIG. 17E are a left side view and a right side view, respectively, of the top portion embodiment illustrated in FIG. 17A.

Figure 17F:
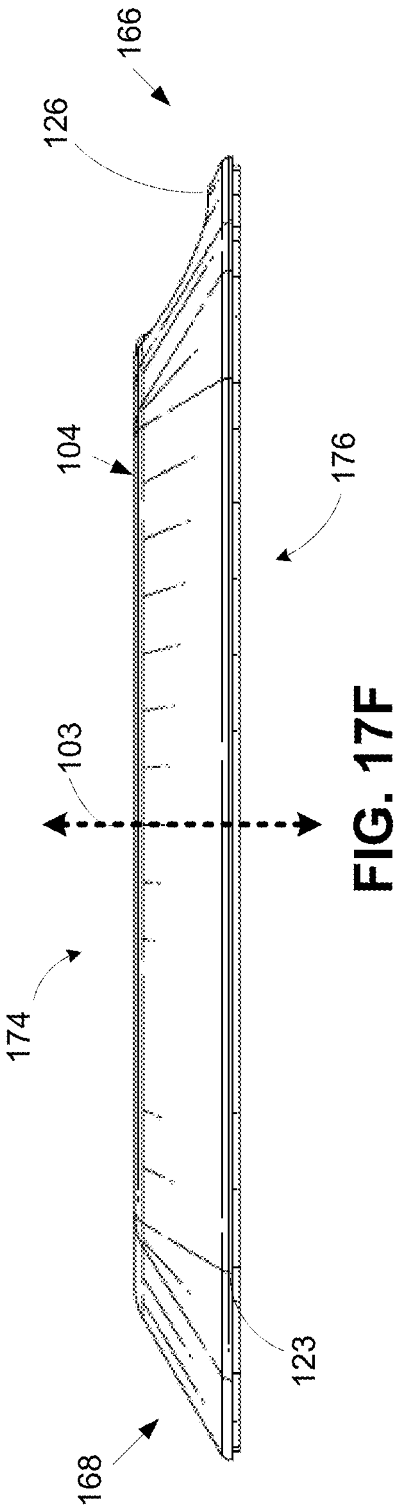
FIG. 17F is a back view of the top portion embodiment illustrated in FIG. 17A.
Figure 17G:
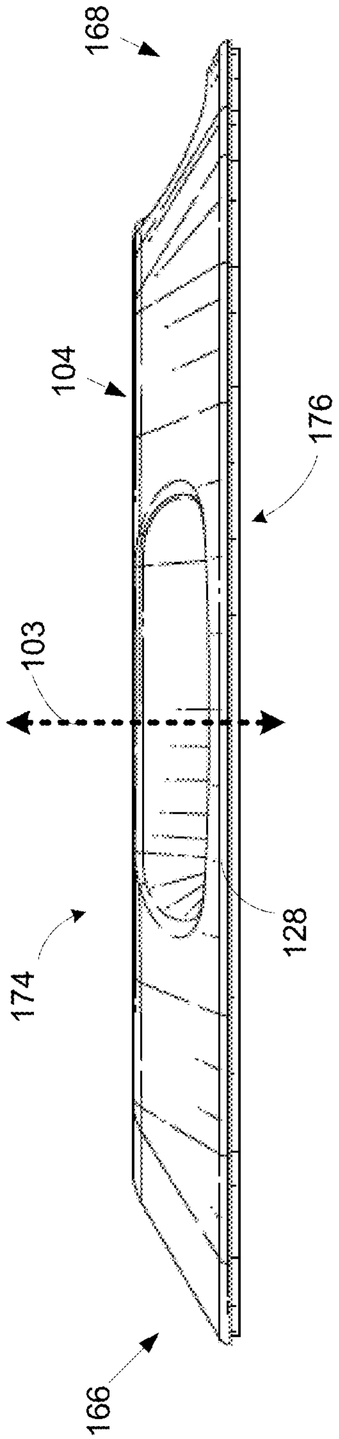
FIG. 17G is a front view of the top portion embodiment illustrated in FIG. 17A.

FIG. 17F and FIG. 17G are a back view and a front view, respectively, of the top portion 114 embodiment illustrated in FIG. 17A. Edge 123 connects the top portion 114 of the bedpan to the bottom portion. When closed together, the entire edge 123 comes into contact with the bottom portion.

Figure 18A:
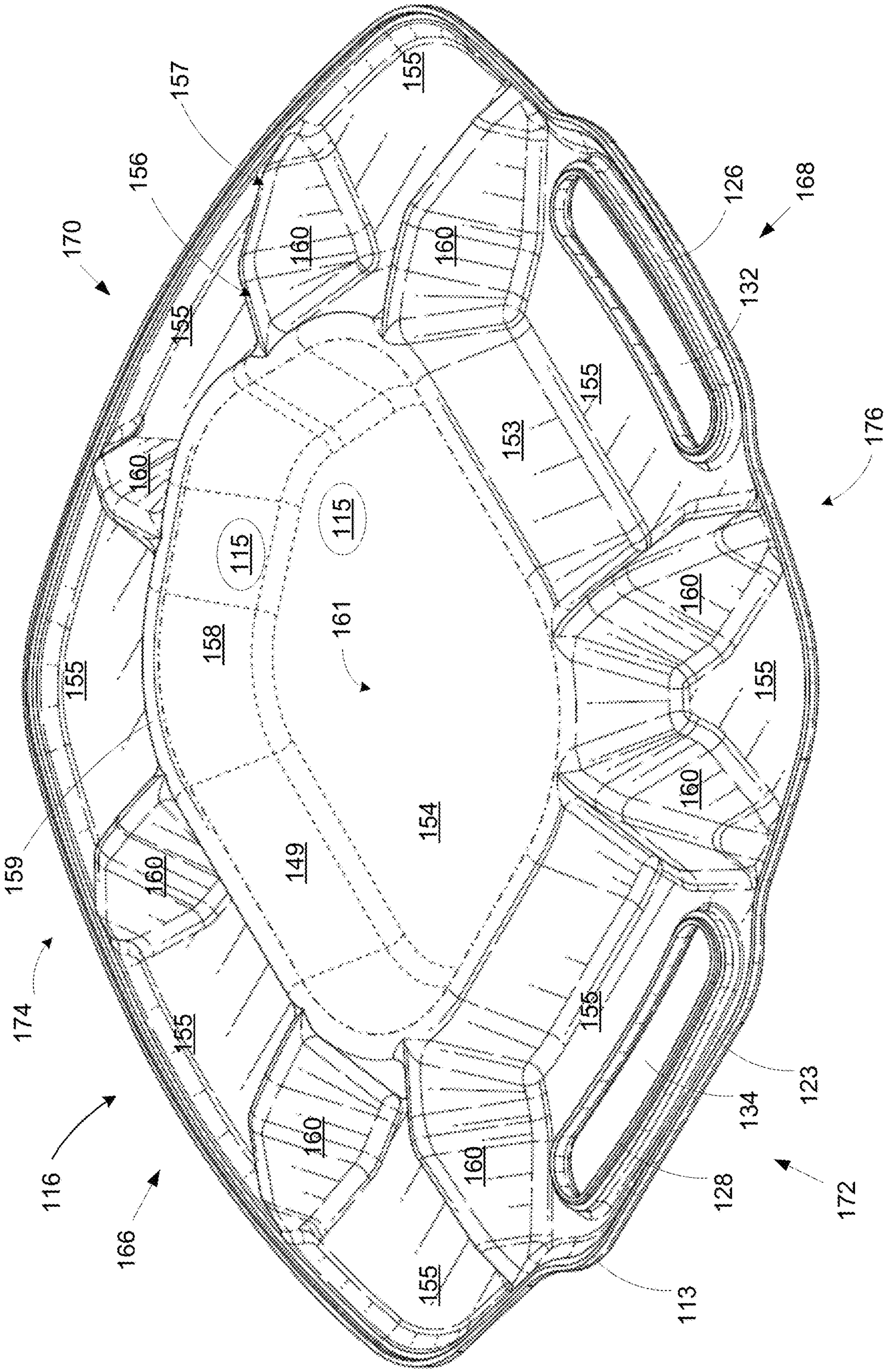
FIG. 18A is a perspective view illustrating an example embodiment of the bottom portion of the bedpan.
Figure 18B:
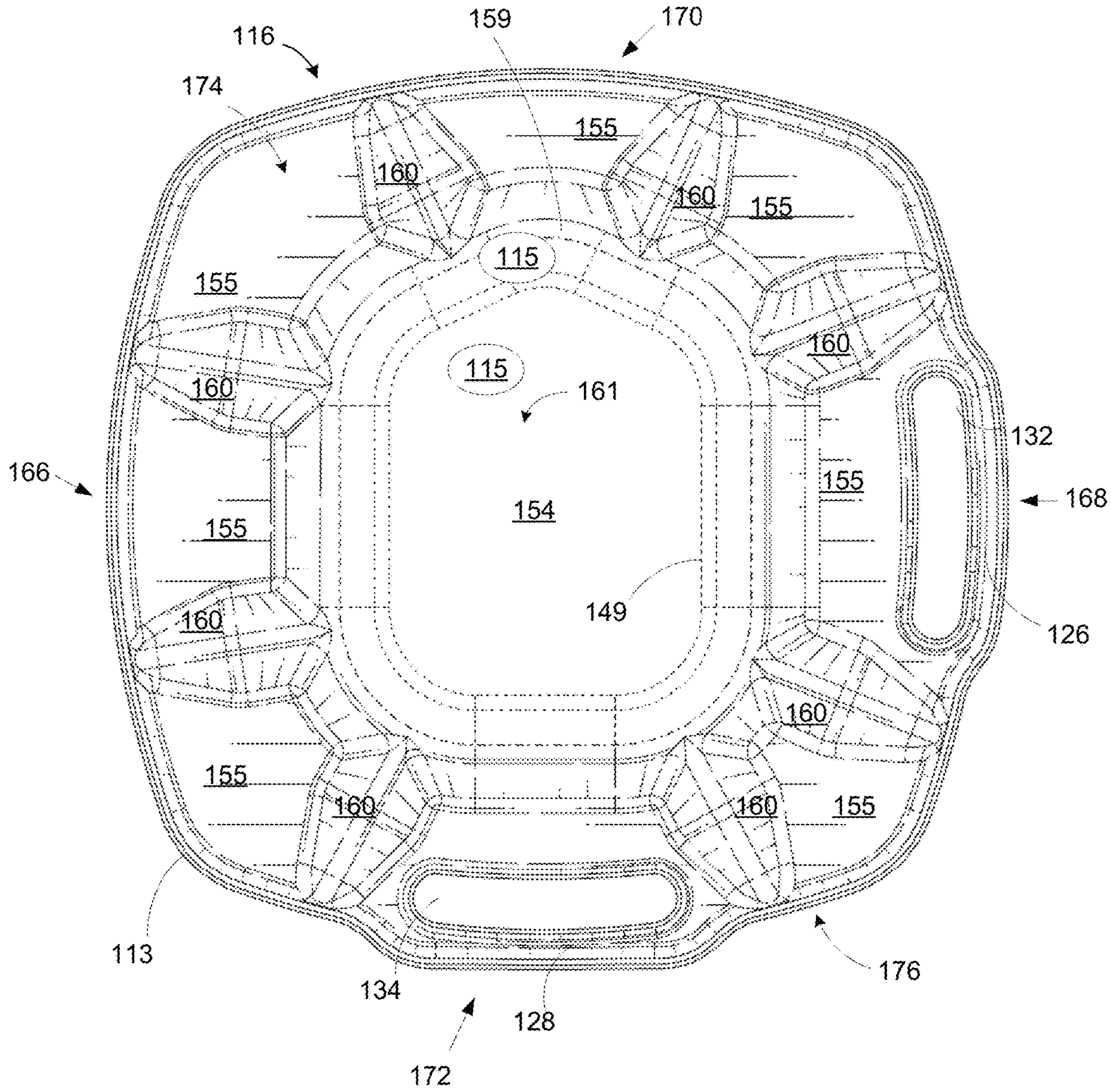
FIG. 18B is a top view of the bottom portion embodiment illustrated in FIG. 18A.
Figure 18C:
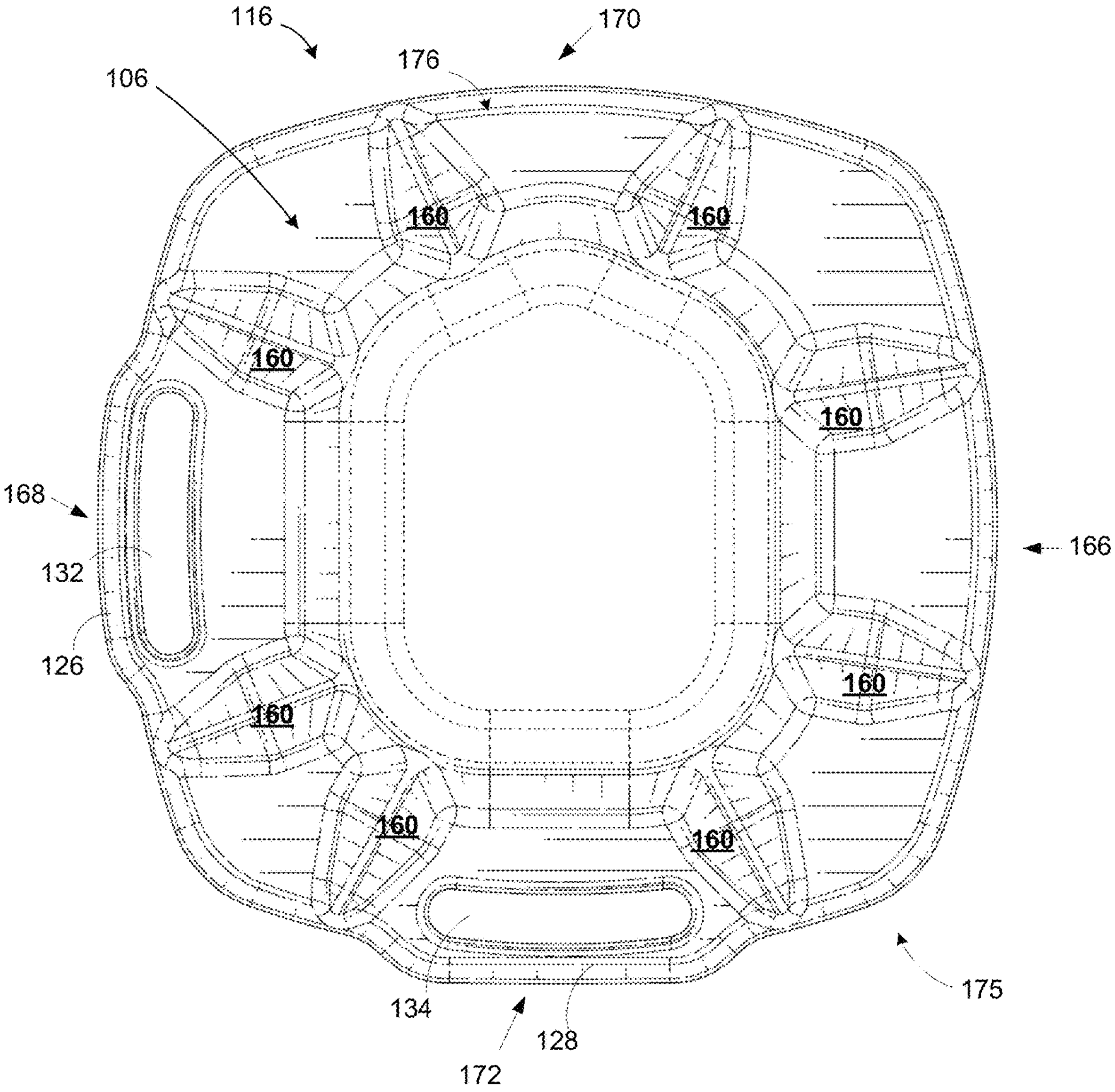
FIG. 18C is a bottom view of the bottom portion embodiment illustrated in FIG. 18A.
Figure 18D:
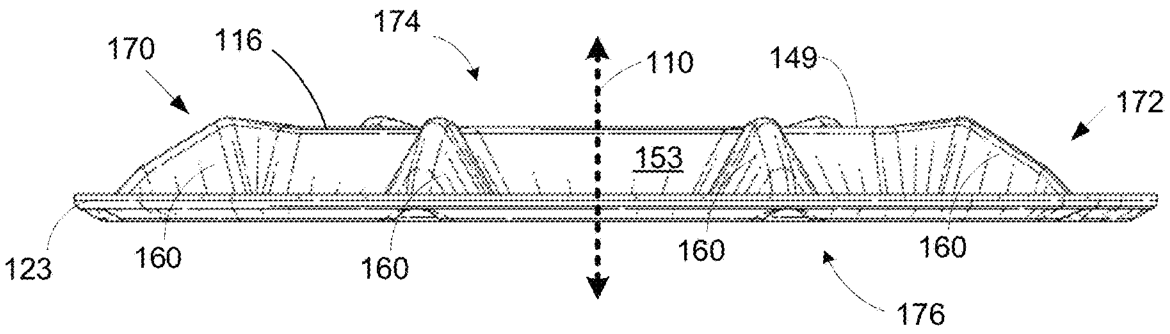
FIG. 18D is a left side view of the bottom portion embodiment illustrated in FIG. 18A.
Figure 18E:
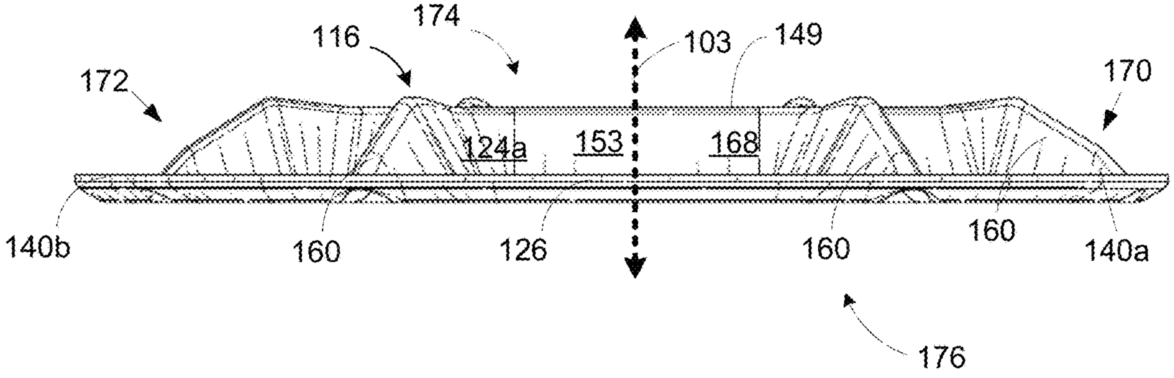
FIG. 18E is a right side view of the bottom portion embodiment illustrated in FIG. 18A.
Figure 18F:
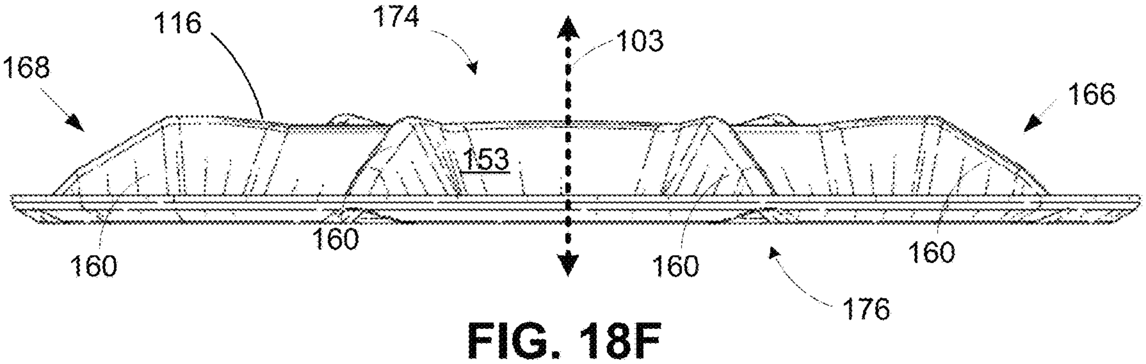
FIG. 18F is a back view of the bottom portion embodiment illustrated in FIG. 18A.
Figure 18G:
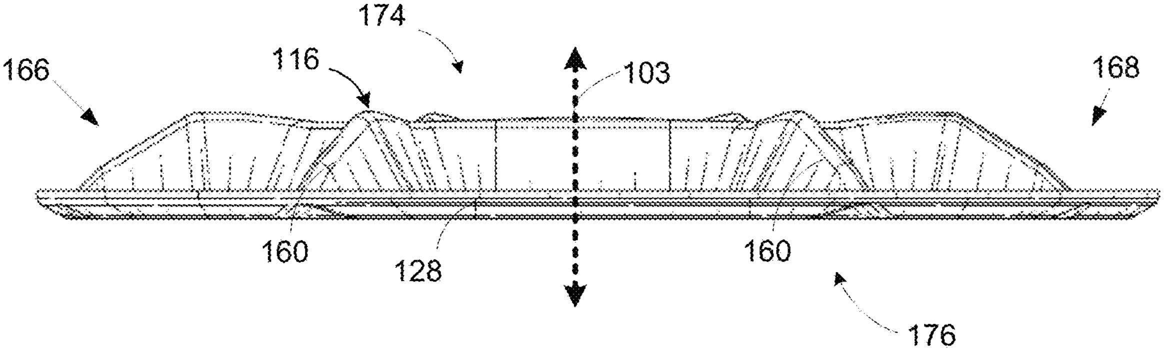
FIG. 18G is a front view of the bottom portion embodiment illustrated in FIG. 18A.

FIG. 18A is a perspective view illustrating an example embodiment of the bottom portion 116 of an embodiment of the bedpan 100. FIG. 18B and FIG. 18C are a top view and a bottom view, respectively, of the bottom portion embodiment illustrated in FIG. 18A. FIG. 18D and FIG. 18E are a left side view and a right side view, respectively, of the bottom portion embodiment illustrated in FIG. 18A. FIG. 18F and FIG. 18G are a back view and a front view, respectively, of the bottom portion embodiment illustrated in FIG. 18A. This embodiment of a bottom portion 116 of a bedpan can include many of the same features as previously described, and as indicated in the list of certain components above.

This embodiment also illustrates internal supports 160 positioned around the bottom to support the top portion (illustrated in FIG. 17A) of the bedpan. The supports 160 are attached to, or extend from, the bottom portion of the housing proximal surface 155. Internal supports 160 create a support system in the cavity of the bottom portion 116 to support an overlying top portion. In this embodiment, there are cavities above the bottom portion of the housing proximal surface 155 and between the supports 160 which make the bedpan lightweight and easy to position under a patient, while the multiple supports 160 provide support to comfortably hold the weight of the patient on the large proximal surface of the bedpan without collapsing the bedpan. Each internal support 160 can include a support first portion 156 that supports the proximal surface or apron of the top portion 114 of the housing 102 (e.g., as illustrated in FIG. 17A). Each internal support 160 can also include a support second portion 157 that supports the side wall of the top portion 114 of the housing 102 (e.g., as illustrated in FIG. 17A). The bottom portion 116 includes chamber 154 having a bottom surface 161. In this embodiment, the bottom portion 116 has a chamber wall 149 that surrounds the sides of the chamber 154. In this embodiment, the chamber wall 149 has an interior surface 158 which faces into the chamber 154 and an exterior surface 153 which faces away from the chamber 154. In various embodiments, the bedpan is configured to have a cavity (open space) between the exterior surface 153 of the chamber wall 149 and the distal surface 105 of the top portion 114 when the top portion 114 is coupled to the bottom portion 116, which reduces weight of the bedpan and the amount of material needed to make the bedpan. The chamber wall 149 also supports the top portion of the bedpan (e.g., the apron) when the top portion 114 and bottom portion 116 are coupled together. The internal features of the bottom portion 116 may vary across embodiments. In this embodiment, the first handle 126 and the second handle 128 are positioned on adjacent sides of the bedpan, which can make it easier to grasp the bedpan, with one or two hands, to position the bedpan underneath a patient, and to remove the bedpan from underneath a patient, and the location of the handles corresponds with the top portion (that is, the top portion and the bottom portion each include a portion of the handles). Also as illustrated in FIG. 18A, the bottom portion 116 can include one or a plurality of sensors 115 in the chamber 154, or on the chamber wall 149, to sense a characteristic of material (e.g., blood, urine, feces) in the chamber 154.

Figure 19A:
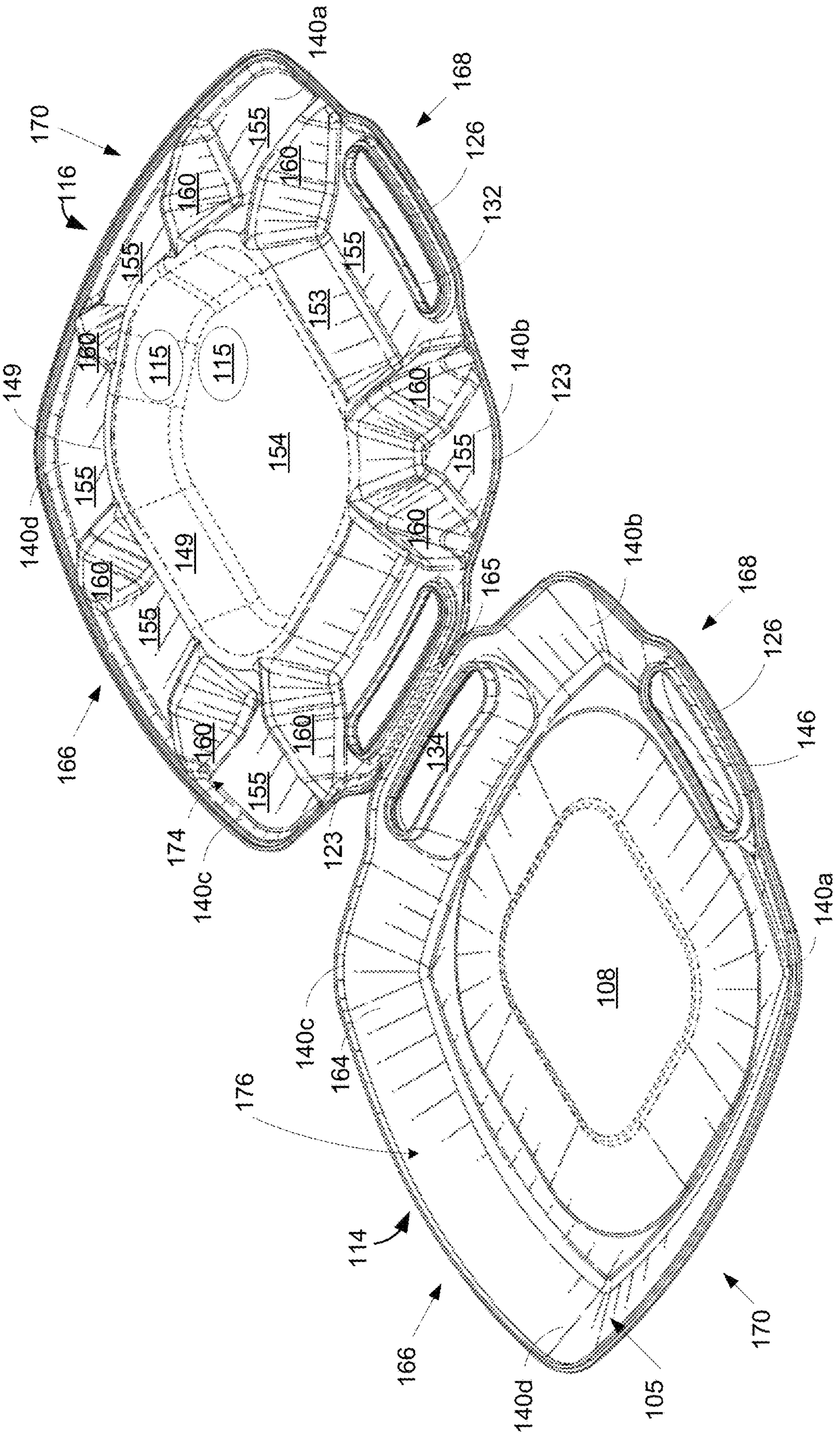
FIG. 19A is a perspective view illustrating an example embodiment of the top portion and the bottom portion of the bedpan connected together and open.
Figure 19B:
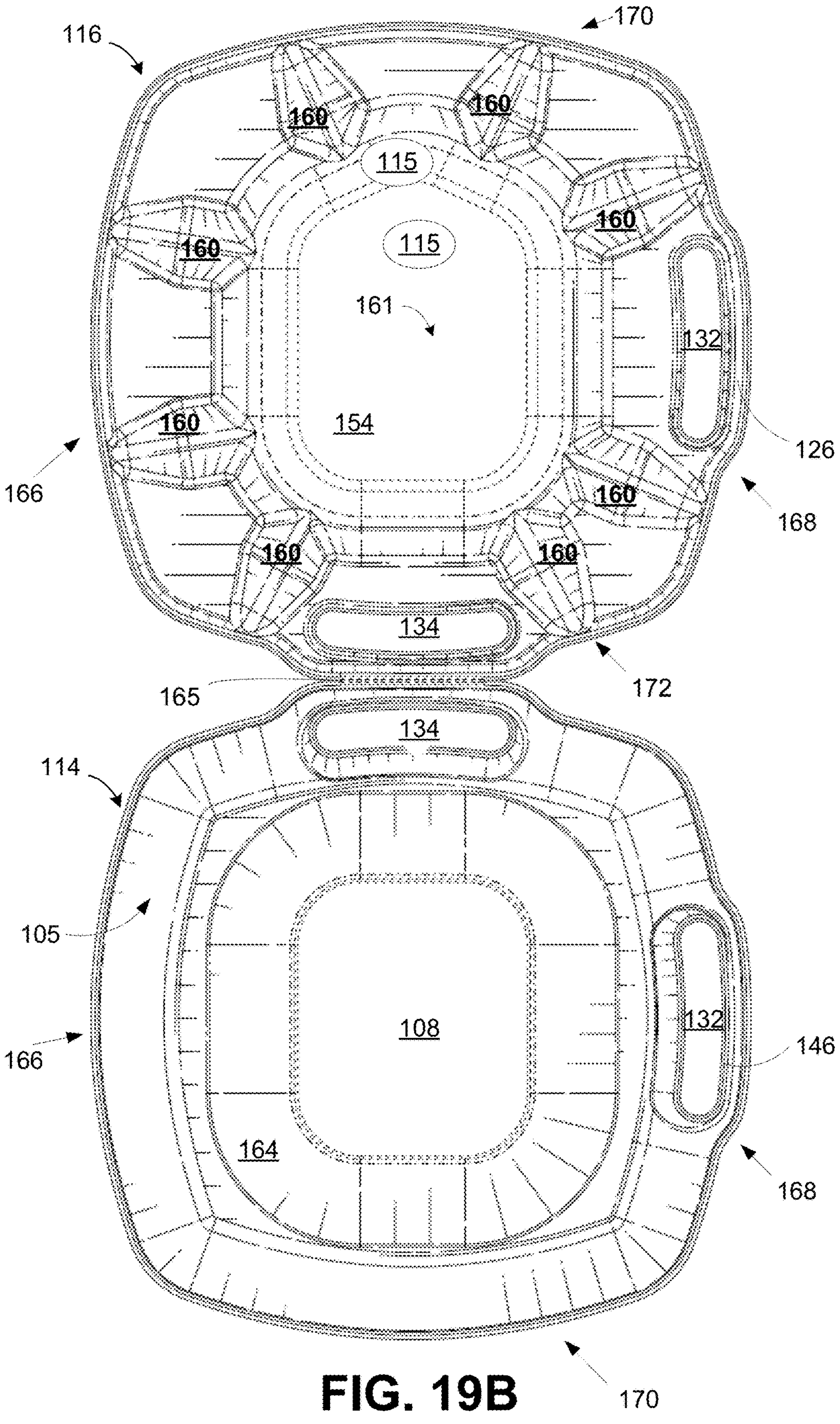
FIG. 19B is a top view of the embodiment illustrated in FIG. 19A of the top portion and the bottom portion of the bedpan connected together.
Figure 19C:
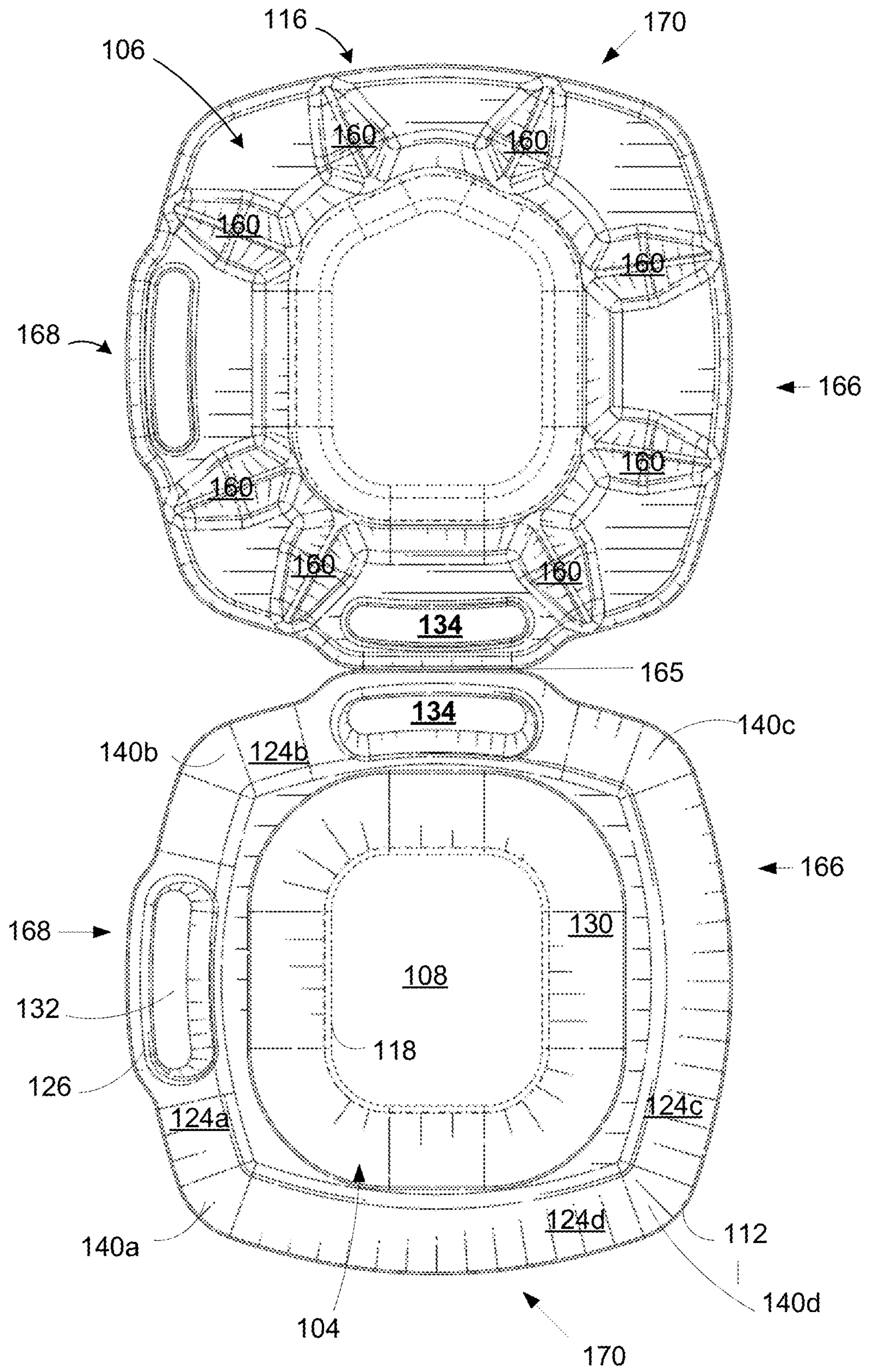
FIG. 19C is a bottom view of the embodiment illustrated in FIG. 19A of the top portion and the bottom portion of the bedpan connected together.
Figure 19D:
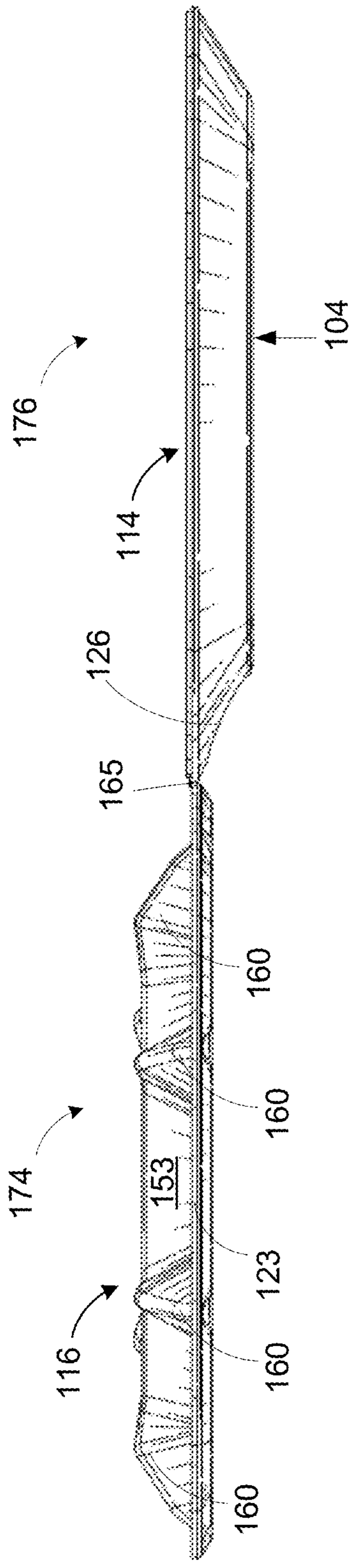
FIG. 19D is a left side view of the embodiment illustrated in FIG. 19A of the top portion and the bottom portion of the bedpan connected together.
Figure 19E:
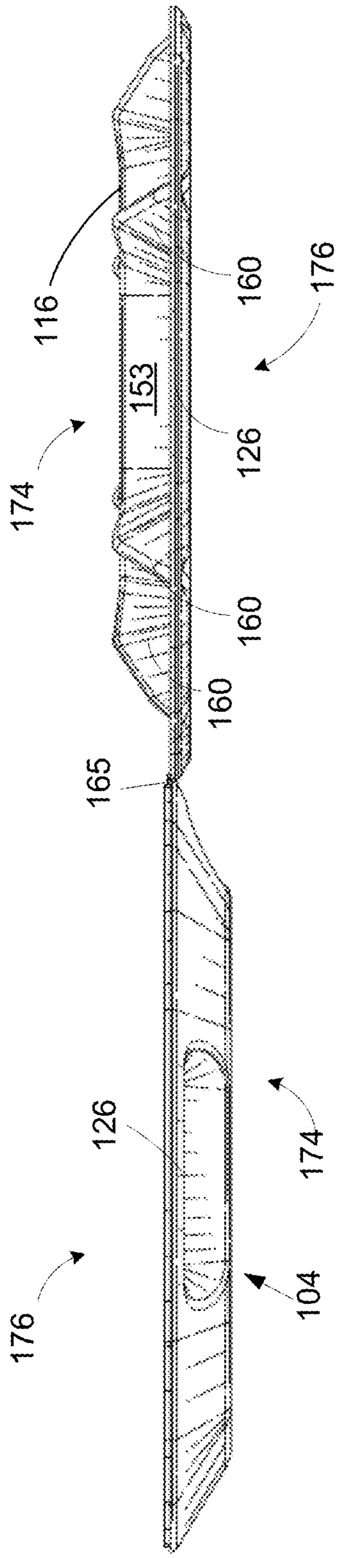
FIG. 19E is a right side view of the embodiment illustrated in FIG. 19A of the top portion and the bottom portion of the bedpan connected together.
Figure 19F:
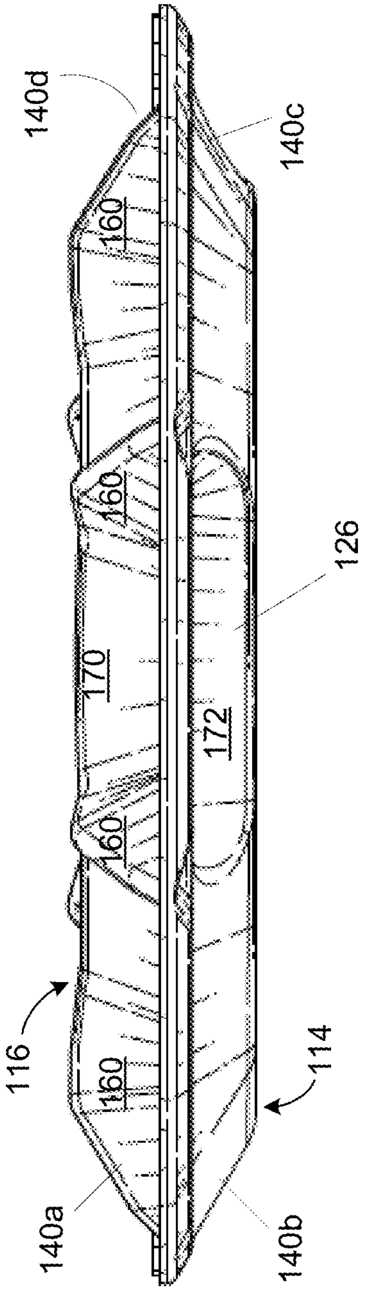
FIG. 19F is a back view of the embodiment illustrated in FIG. 19A of the top portion and the bottom portion of the bedpan connected together.
Figure 19G:
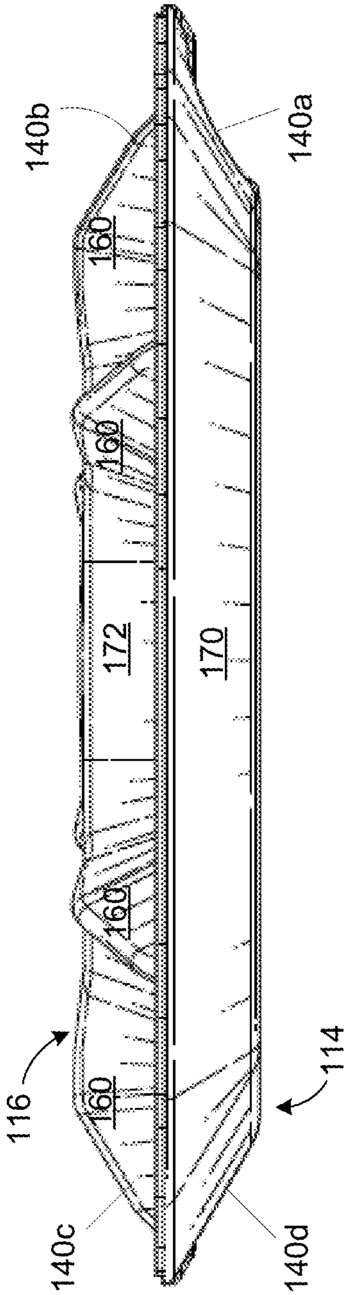
FIG. 19G is a front view of the embodiment illustrated in FIG. 19A of the top portion and the bottom portion of the bedpan connected together.

FIG. 19A is a perspective view illustrating an example embodiment of the top portion 114 and a bottom portion 116 of a bedpan coupled together in an open configuration. FIG. 19B is a top view of the embodiment illustrated in FIG. 19A of the top portion and the bottom portion of the bedpan connected together. FIG. 19C is a bottom view of the embodiment illustrated in FIG. 19A of the top portion and the bottom portion of the bedpan connected together. FIG. 19D and FIG. 19E are a left side view and a right side view, respectively, of the embodiment illustrated in FIG. 19A of the top portion and the bottom portion of the bedpan connected together. FIG. 19F and FIG. 19G are a back view and a front view, respectively, of the embodiment illustrated in FIG. 19A of the top portion and the bottom portion of the bedpan connected together. This embodiment of a of a bedpan can include many of the same features as previously described, and as indicated in the list of certain components above. The embodiment in FIGS. 19A-G can be advantageous as it allows bedpans to be stacked together with the top portions 114 are nested together and bottom portions 116 are nested together, which minimizes the volume of a plurality of bedpans for shipping and storage. The top portion 114 and the bottom portion 116 can be coupled together with a hinge mechanism 165, on the edge of a handle, connecting the bottom portion and top portion 123. In some embodiments (including in FIG. 19A) the hinge is a living hinge and the top portion 114 and bottom portion 116 are manufactured coupled together. In other embodiments, the top portion 114 and the bottom portion 116 may not be connected together at all or may be connected through some alternative mechanism. In other embodiments, the top portion 114 and the bottom portion 116 may have the capability of being connected together or detachable. The top portion underside 164 can be hinged to lay directly on the internal supports 160 in the bottom portion 116. When hinged together, the top portion 114 and bottom portion 116 create a housing internal chamber 154. The top portion 114 contains opening 108 that, when the bedpan is closed configured to use, is positioned over the chamber 154.

Figure 20A:
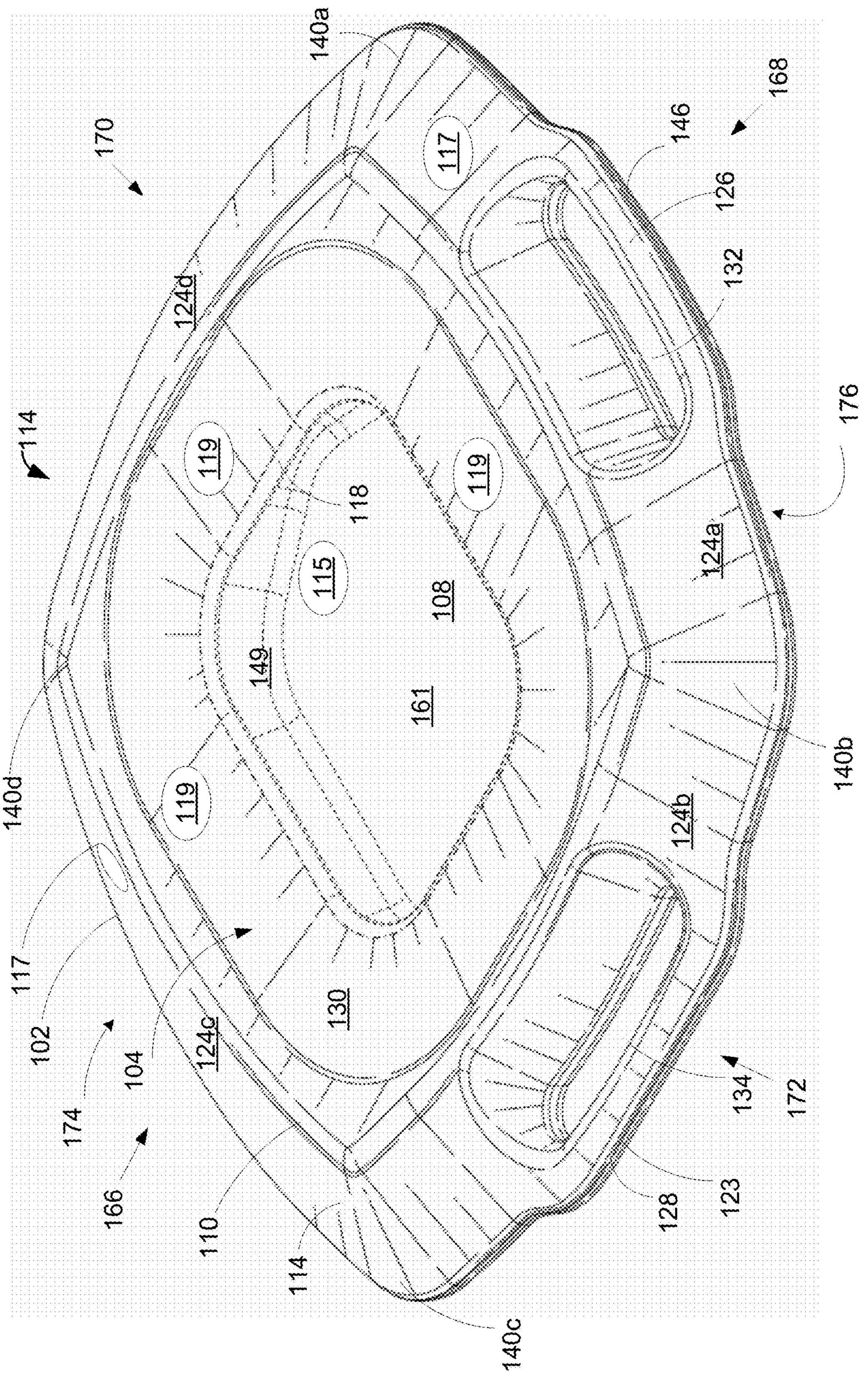
FIG. 20A is a perspective view illustrating an example embodiment of the top portion and the bottom portion of the bedpan closed together.
Figure 20B:
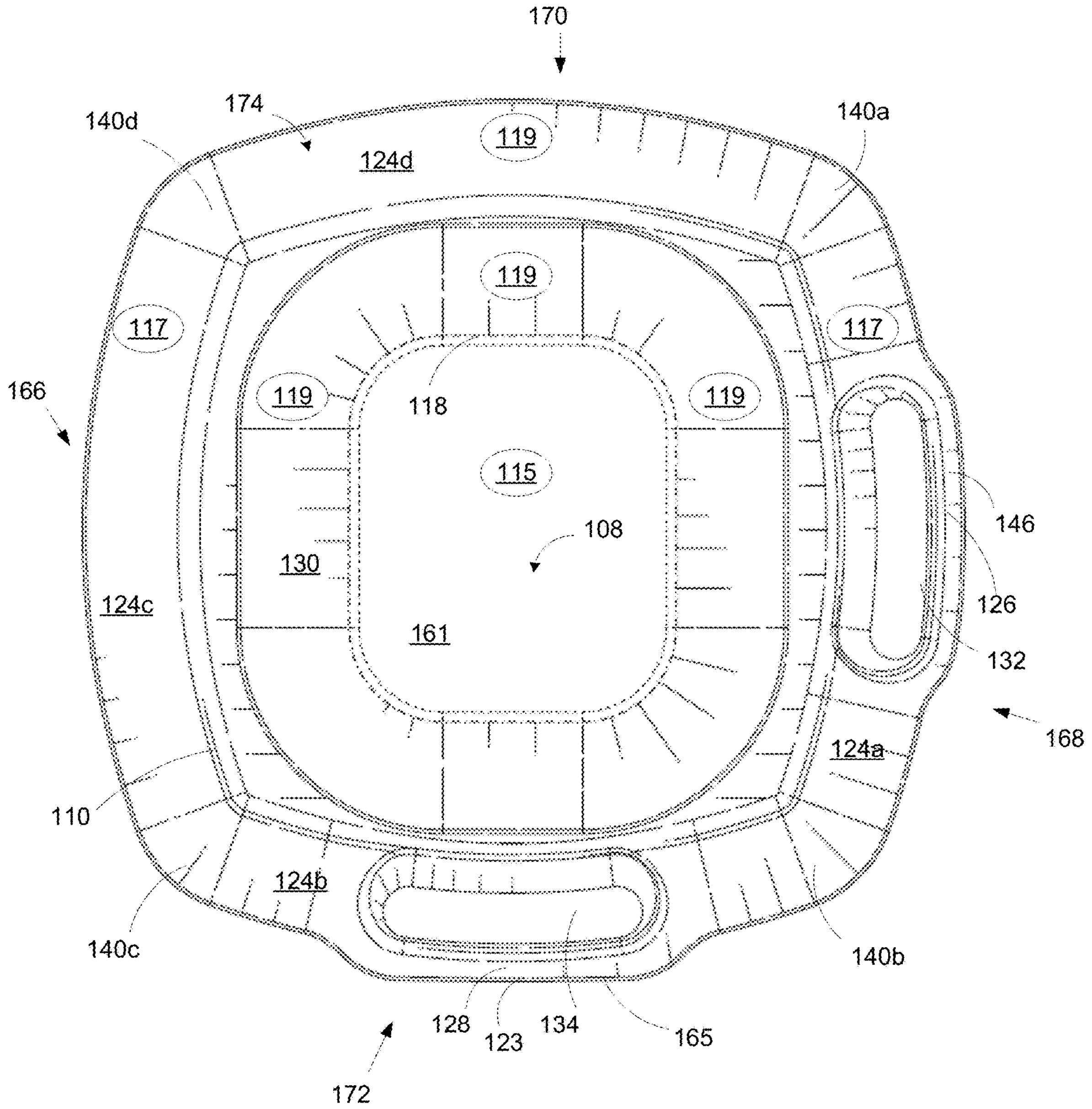
FIG. 20B is a top view of the embodiment illustrated in FIG. 20A of the top portion and the bottom portion of the bedpan closed together.
Figure 20C:
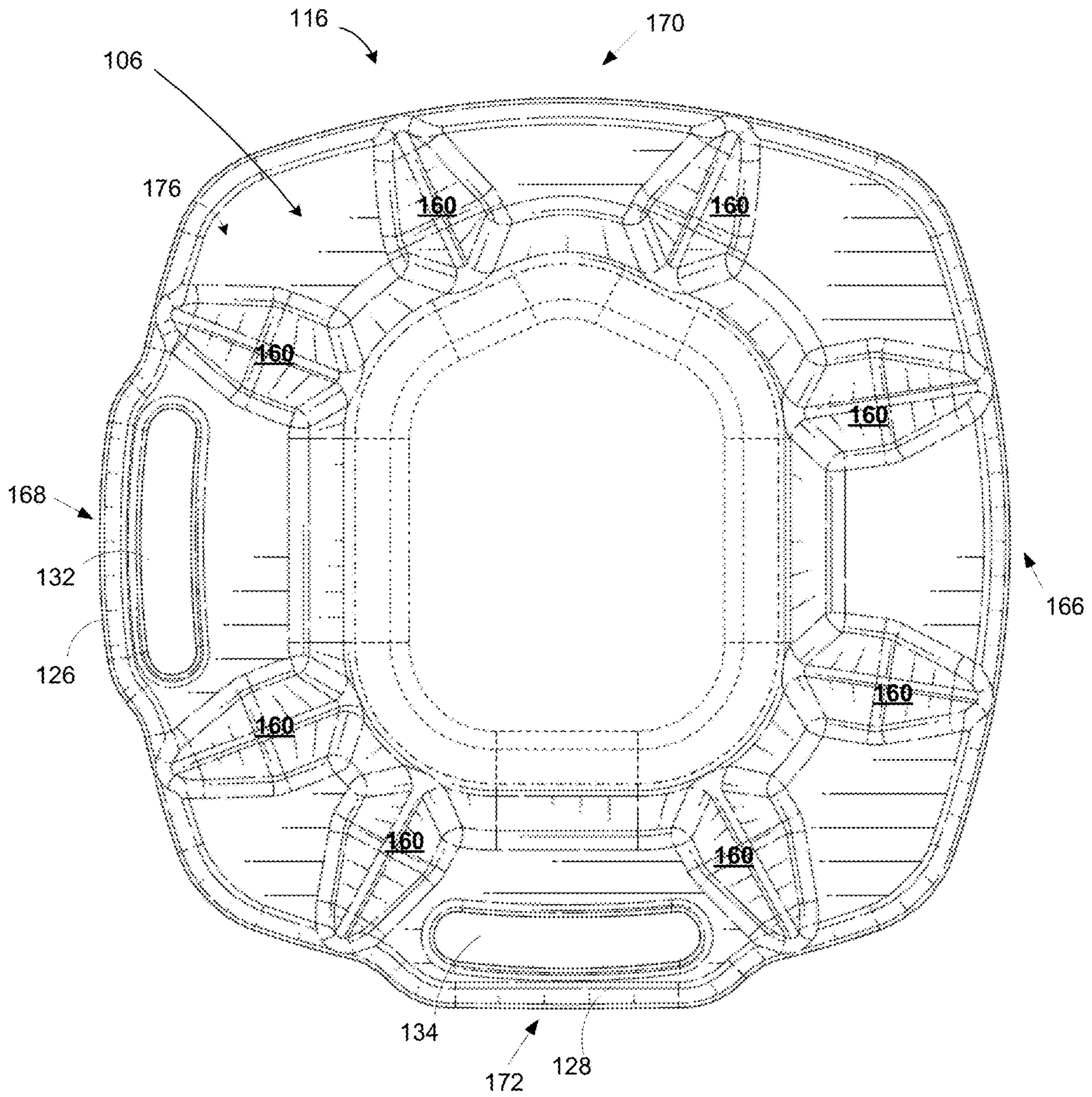
FIG. 20C is a bottom view of the embodiment illustrated in FIG. 20A of the top portion and the bottom portion of the bedpan closed together.
Figure 20D:
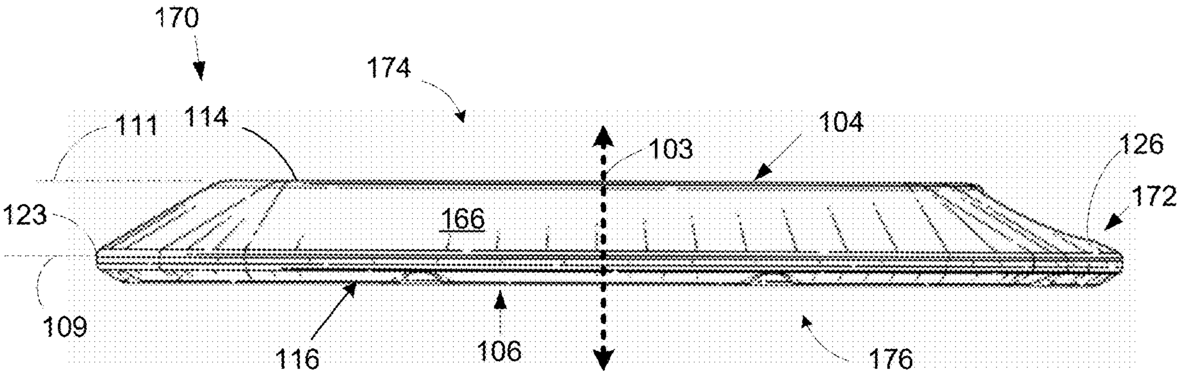
FIG. 20D is a left side view of the embodiment illustrated in FIG. 20A of the top portion and the bottom portion of the bedpan closed together.
Figure 20E:
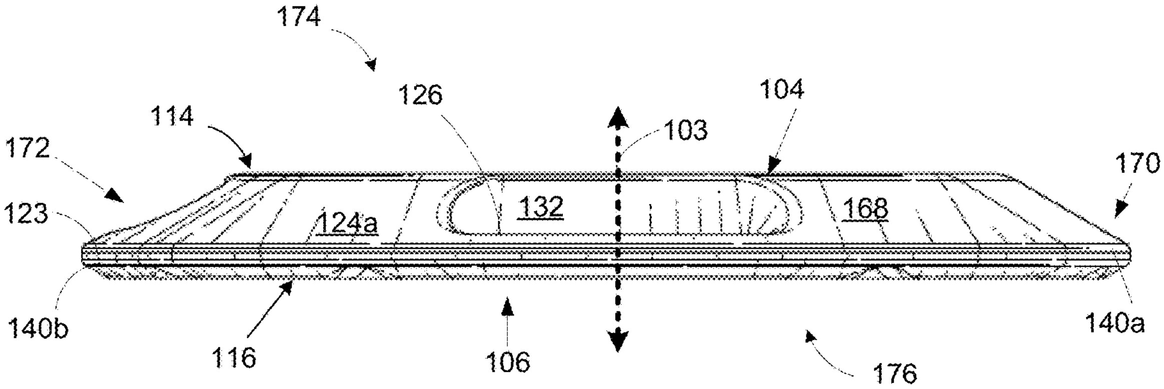
FIG. 20E is a right side view of the embodiment illustrated in FIG. 20A of the top portion and the bottom portion of the bedpan closed together.
Figure 20F:
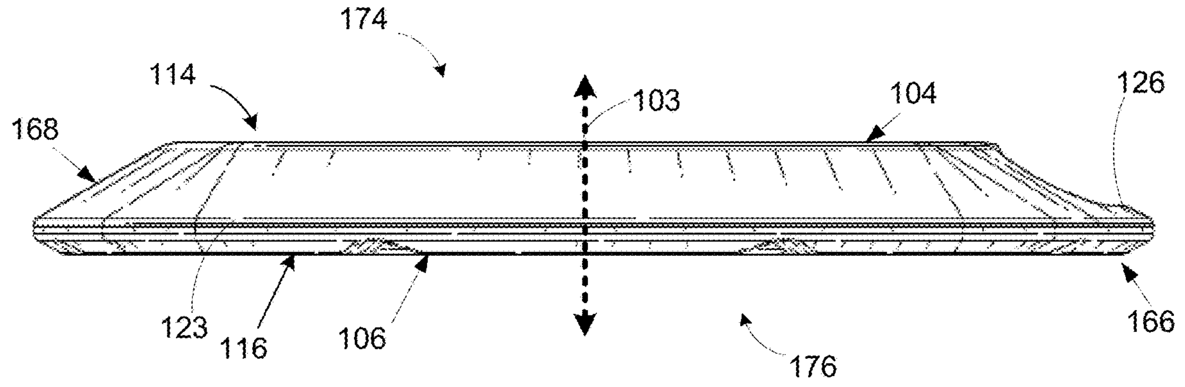
FIG. 20F is a back view of the embodiment illustrated in FIG. 20A of the top portion and the bottom portion of the bedpan closed together.
Figure 20G:
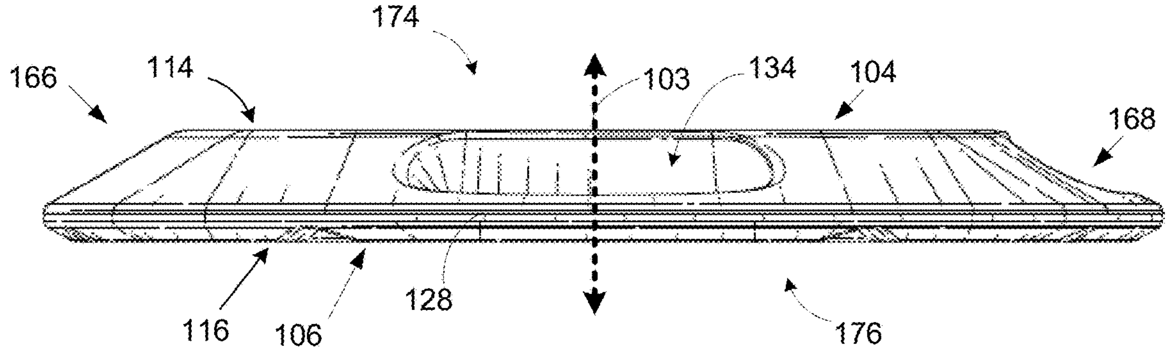
FIG. 20G is a front view of the embodiment illustrated in FIG. 20A of the top portion and the bottom portion of the bedpan closed together.

FIG. 20A is a perspective view illustrating an example embodiment of the top portion and the bottom portion of a bedpan, for examples as illustrated in FIGS. 19A-G. This embodiment of a bedpan can include many of the same features as previously described, and as indicated in the list of certain components above. In this embodiment, the top portion 114 and the bottom portion 116 are coupled together such that it is ready to use. In embodiments as illustrated in FIGS. 19A-G, the top portion 114 can swing around the hinge mechanism 165 and couple to the bottom portion 116 to create a bedpan that is ready to use. The chamber wall 149 is advantageously part of the bottom portion 116 to ensure the integrity of the chamber 154 and can be partially seen in the illustration through the opening 108. FIG. 20B and FIG. 20C are a top and bottom view, respectively, of the embodiment illustrated in FIG. 20A of the top portion and the bottom portion of the bedpan when closed together. FIG. 20D and FIG. 20E are a left side view and a right side view, respectively, of the embodiment illustrated in FIG. 20A of the top portion and the bottom portion of the bedpan when closed together. FIG. 20F and FIG. 20G are a back view and a front view, respectively, of the embodiment illustrated in FIG. 20A of the top portion 114 and the bottom portion 116 of the bedpan 100 illustrated in a closed together configuration (or position) such that the bedpan 100 is ready-for-use.

FIG. 21 illustrates an embodiment of a system 300 for communicating sensor information from a bedpan to a smartphone, a computer, and/or through a network to a server and/or a medical practitioner. In this example, the system 300 includes a bedpan 100, a computer/mobile platform ("mobile platform") 302, a computer system 304, a network 306, a server system 308, and one or more advisors/medical practitioners or facilities 310 (both referred to as practitioners 310 for ease of reference). Practitioners 310 can also receive information relating to sensors incorporated on the bedpan 100, for example, via communications to their computers, including laptop computers, tablet computers, smart phones, and the like.

The components of the system 300 can communicate via the network 306, and one or more of communication links, which include a communication link 302 between the bedpan 100 and a mobile platform 302 (e.g., a smart phone), a communication link 41 between the mobile platform 302 and the network 306, a communication link 312 between the computer 304 and the network 306, and a communication link 316 between the server 308 and the network 306. In some examples, the bedpan 100 can communicate directly to the network 306 via a communication link 317 (e.g., a wireless communication link). One or more portions of the network 306 and communication links 311-317 can include a wired or wireless communication link, and can include Wi-Fi, Bluetooth, cellular, or any suitable communication link. The network 306 can be, for example the Internet, or another large area network (LAN), or a wide area network (WAN).

In this example, the server 308 is configured with a program which collects and stores patient data. The information received by the sever 308 can also be used to provide reports to practitioners 310, or to the mobile platform 302 or the computer 304. The mobile platform 302 includes a display, and provides certain information on various graphical user displays (GUI's) based on the received information, for example, sensor information. The bedpan 100 can include one or more sensors as described above, and illustrated in FIG. 1B.

FIG. 22 illustrates a block diagram of an embodiment of a sensor, or sensor assembly ("sensor"), 400 arranged on a bedpan. The sensor 400 is configured to sense information relating to the patient and/or matter in the bedpan and communicate the information to a smartphone, a computer, and/or through a network to a server, a medical practitioner, and/or a medical practitioner (e.g., i.e., to a computer operated by the medical practitioner). In some embodiments, the sensor 400 can be sensor 115, 117, and/or sensor 119 described above and illustrated in the figures. In various embodiments, a bedpan can include one sensor 400 or a plurality of sensors 400. A sensor 400 may be configured to sense more than one characteristic of a patient or of material from a patient that is in the bedpan. For example, a sensor 400 can sense a single characteristic by generating a signal related to a measurement of the characteristic, and communicate information relating to the signal for further processing/analysis. In another example, at least some of the processing of the sensed characteristic can be done in the sensor 100. In the example illustrated in FIG. 22, sensor 400 includes a bus 402 or other communication mechanism for communicating information to its components, and a hardware processor or multiple processors ("processor(s)") 404 coupled to bus 402 for processing sensed information. Hardware processor(s) 404 may be, for example, one or more general purpose microprocessors.

Sensor system 400 also includes one or more memory components ("memory") 406, such as a random access memory (RAM), read only memory (ROM), cache and/or other electronic memory, coupled to bus 402 for storing information, including sensed information, and instructions to be executed by processor 404. Memory 406 also may be used for storing temporary variables or other intermediate information during execution of instructions to be executed by processor 404. The sensor system 402 can implement the techniques described herein using customized hard-wired logic, one or more ASICs or FPGAs, firmware and/or program logic which causes sensor 400 to be a special-purpose machine. According to one embodiment, the techniques herein are performed by sensor 400 in response to processor(s) 404 executing one or more sequences of one or more computer readable program instructions. Such instructions, when stored in storage media accessible to processor 404, render sensor 400 into a special-purpose machine that is customized to perform the operations specified in the instructions. The sensor 400 also includes a battery 420 that provides power to the components of the sensor 400.

Sensor 400 further includes a sensing element, or multiple sensing elements, 410. In various embodiments, sensing element 410 can sense information using optical, electrical, chemical or other technology to determine information relating to a characteristic of a patient or of material in the bedpan. Sensing element 410 may be coupled, for example via bus 402, to a display 412 for displaying information relating to, for example, the activation of the sensor 400, whether the sensor 400 is in communication with another computer via a communication link, a sensed characteristic, battery life, etc. The sensor 400 can include an input device 414 coupled to bus 402 for communicating information and command selections to processor 404. The input device 414 can include one or more buttons or keys for controlling the sensor 400, for example, turning the sensor on/off, activating a communication link, inputting control data, etc. In some embodiments, the sensor 400 is controlled using another device in communication with the sensor (e.g., an app on mobile device 302, FIG. 21).

Sensor system 400 also includes a communication interface 418 coupled to bus 402. In various embodiments, communication interface 418 provides one-way or two-way data communication to another computer. For example, to a mobile device 302 via communication link 311, to a network 306 via communication link 317, and/or to a computer via communication link 312, as illustrated in FIG. 21. The links can be preferably wireless but can wired links may also be implemented.

In various embodiments certain functionality of the sensor 400 be accessible by a user through a web-based viewer (such as a web browser), or other suitable software program). In such implementations, a user interface may be generated by a server computing system 308 and transmitted to another computer, for example, mobile device 302 or computer 304. Alternatively, data (e.g., user interface data) necessary for generating the user interface may be provided by the server computing system to a browser, where the user interface may be generated (e.g., the user interface data may be executed by a browser accessing a web service and may be configured to render the user interfaces based on the user interface data). The user may then interact with the user interface through a web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets), for example as illustrated in FIG. 21.

Figure 23:
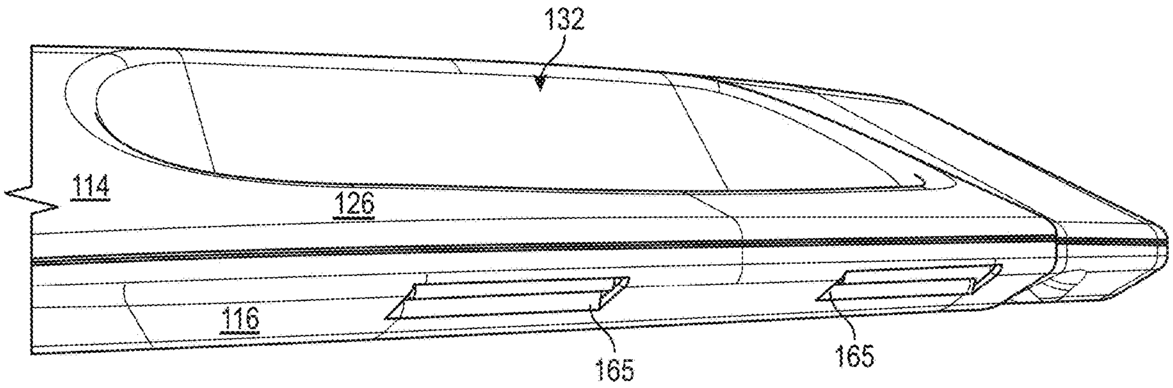
FIG. 23 illustrates an example of a portion of a bedpan having an embodiment of a hinge that couples together an upper portion of a bedpan and a bottom portion of a bedpan to hold the top portion and the bottom portion together, the hinge shown with the bedpan in closed or assembled configuration.
Figure 24:
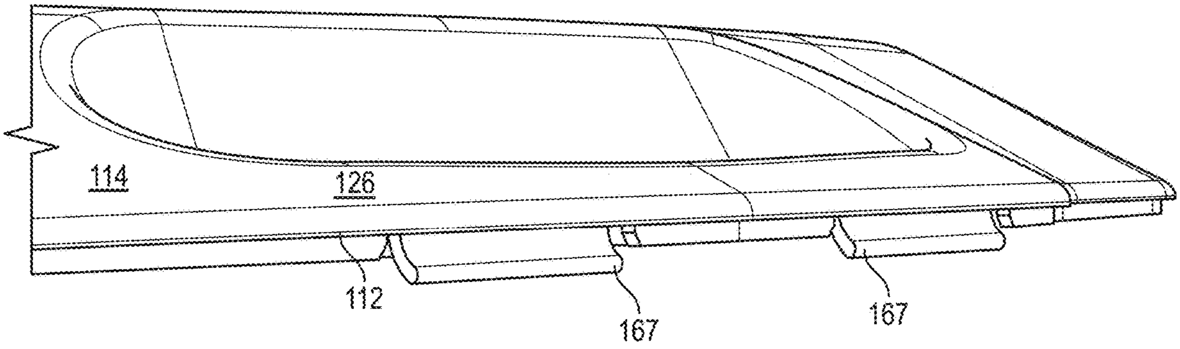
FIG. 24 illustrates an example of a first portion of the hinge mechanism ("hinge") illustrated in FIG. 23 that includes extended structures, the first portion of the hinge attached to a top portion of the bedpan adjacent to a handle formed in the bedpan housing.

FIGS. 23-29 illustrate an example of a portion of a bedpan having another embodiment of a hinge mechanism 165 that couples together a top portion 114 of a bedpan and a bottom portion 116 of a bedpan. The hinge mechanism 165 in FIGS. 23-29 can be used, for example, to couple together the top portion 114 illustrated in FIGS. 17A-G and the bottom portion 116 illustrated in FIGS. 18A-G. The hinge assembly 165 is located in a first handle 126. In this embodiment, similar to other embodiments illustrated herein (e.g., in FIGS. 17-20) the top portion 114 and the bottom portion 116 include a portion of the first handle 126. In this embodiment, both the top portion 114 and the bottom portion 116 include a portion of the hinge mechanism 165. As shown in FIG. 24, in this embodiment the top portion 114 includes a portion of the hinge mechanism 165 having two extended structures 167 that extend from the distal edge 112 of the top portion 114. In other embodiments, the hinge mechanism 165 can include one extended structure 167, or more than two extended structures 167.

Figure 25:
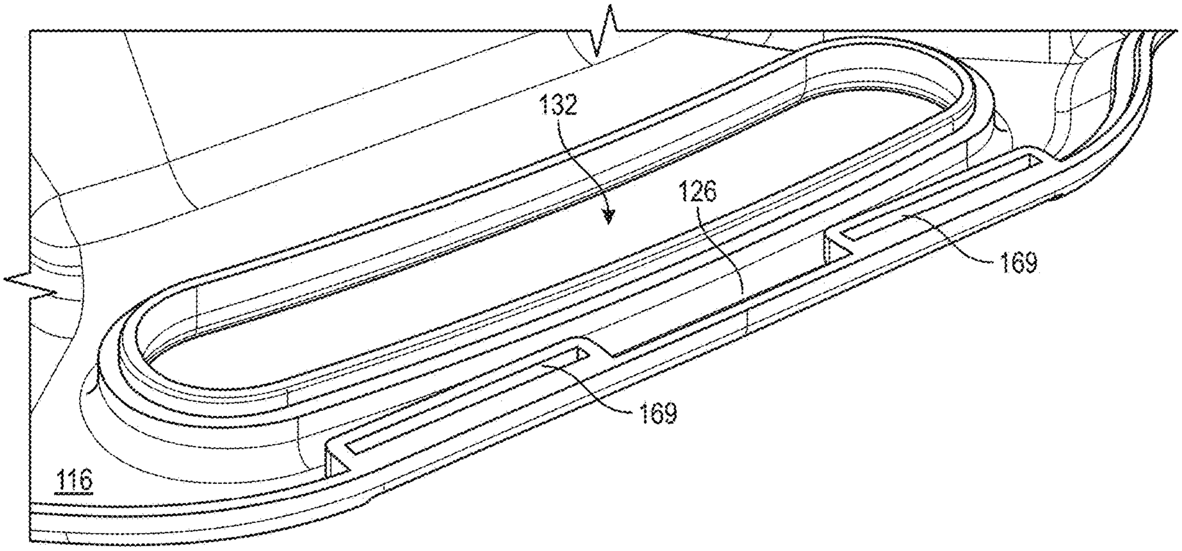
FIG. 25 illustrates an example of a second portion of the hinge illustrated in FIG. 23 that includes slots, the second portion of the hinge attached to a bottom portion of the bedpan adjacent to the handle formed in the bedpan housing.
Figure 26:
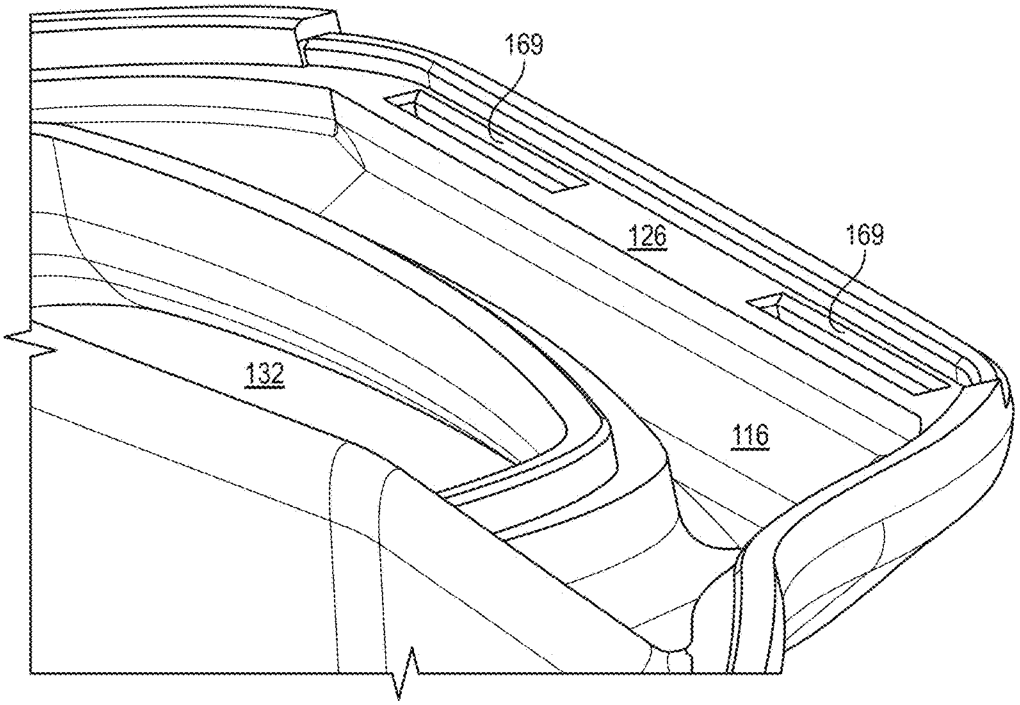
FIG. 26 illustrates a perspective view of an embodiment of the hinge illustrated in FIG. 23, illustrating slots of the hinge.
Figure 27:
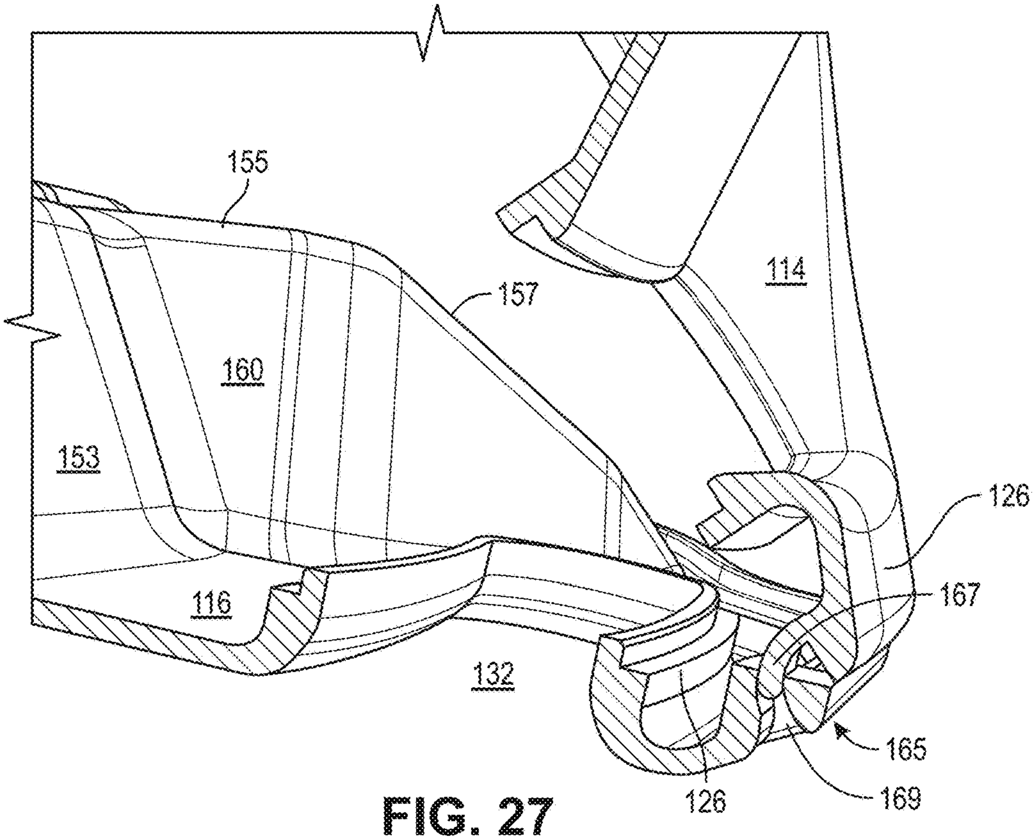
FIGS. 27 and 28 illustrate a cross-sectional view of the hinge illustrated in FIGS. 23-26 in an open configuration.
Figure 28:
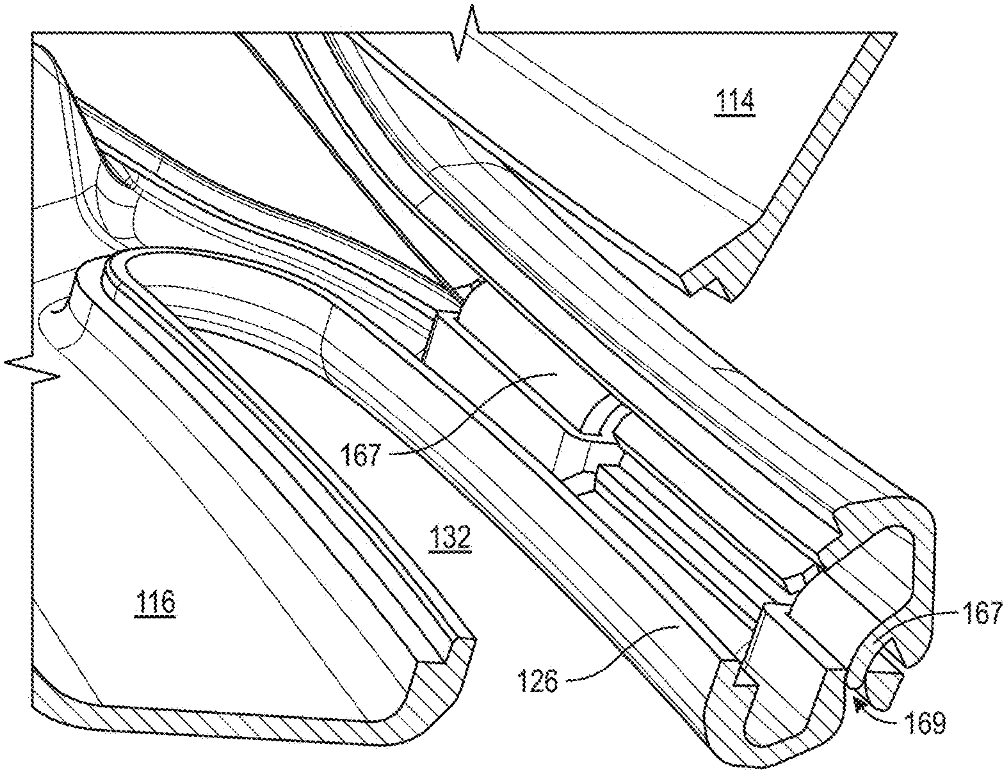
Figure 29:
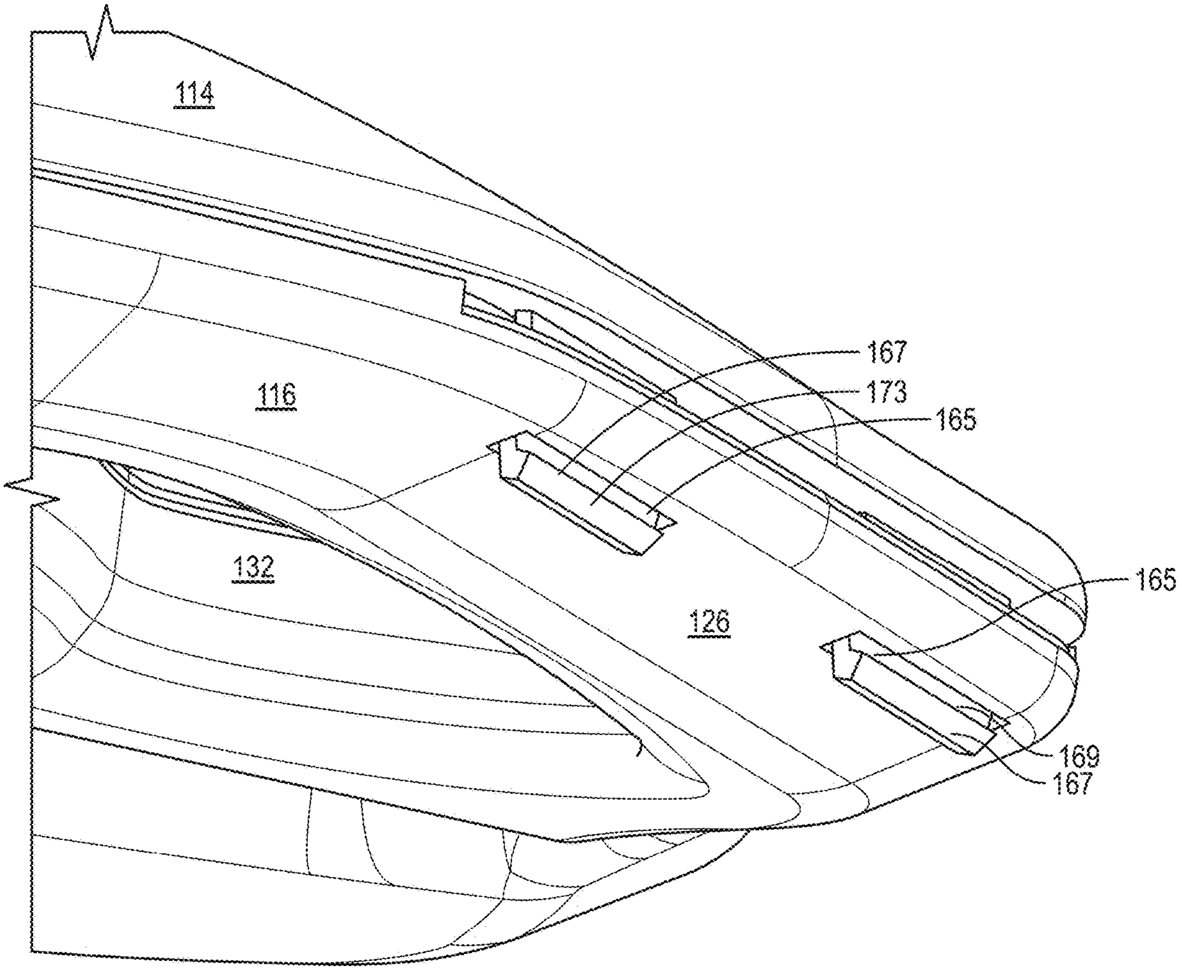
FIG. 29 illustrates a view of the hinge illustrated in FIGS. 23-28 in a closed configuration.

FIGS. 25 and 26 illustrate an example of a second portion of the hinge mechanism 165 illustrated in FIG. 23, the second portion formed in the bottom portion 116 of the bedpan and including slots 169. The number of slots corresponds to the number of extended structures 127 such that in this embodiment the bottom portion 116 includes two slots 169 positioned on the first handle 126 in corresponding locations to the extended structures to receive the extended structures 167. FIGS. 27 and 28 illustrate cross-sectional views of the hinge mechanism 165 of FIGS. 23-26 in a part open configuration where a slot 169 is receiving the extended structure 167. FIG. 29 illustrates a view of the hinge mechanism 165 in a closed configuration with the extended structures 167 protruding through the slots 169. In this embodiment, the extended structure includes a locking feature 173 having a protrusion that can extend through a slot 169 and catch on structure around the slot 169 to keep the top portion 114 coupled to the bottom portion 116.

Implementation Consideration

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Some examples of embodiments include: Embodiment 1: A bedpan comprising: a housing including a chamber for holding urine and feces, the chamber having walls and a bottom surface, a top portion including an opening to the chamber, the opening having a circumferential edge, a proximal surface including an apron surrounding the opening, the apron extending from a circumferential edge of the proximal surface to the circumferential edge of the opening, and an angled side wall surrounding the apron; a bottom portion including a distal surface opposite the proximal surface, and a distal edge of the distal surface, the chamber positioned between the proximal surface and the distal surface, the side walls of the chamber being interior to the side wall, the side wall angled outward as it extends from the circumferential edge of the proximal surface towards the distal edge of the distal surface; and a first handle formed on a first portion of the housing. Embodiment 2: The bedpan of embodiment 1, wherein the first handle is formed integral to the housing. Embodiment 3: The bedpan of embodiments 1 or 2, further comprising a second handle on a second portion of the housing, the second handle formed integral to the housing. Embodiment 4: The bedpan of any one of embodiments 1-3, wherein the first handle includes an aperture having a first longitudinal axis, wherein the second handle includes an aperture having a second longitudinal axis, wherein the first and second axis are aligned, with respect to each other, at an angle A that is 90° plus or minus 30°. Embodiment 5: The bedpan of any one of embodiments 1-4, wherein the first handle is on a first side of the housing and the second handle is on a second side of the housing, and the first side of the housing is adjacent to the second side of the housing. Embodiment 6: The bedpan of any one of embodiments 1-5, wherein the apron is sloped downward towards the distal surface as it extends from the circumferential edge of the proximal surface to the circumferential edge of the opening. Embodiment 7: The bedpan of any one of embodiments 1-6 wherein the height of the bedpan, as measured along a longitudinal axis, is between 2 inches and 5 inches. Embodiment 8: The bedpan of any one of embodiments 1-7, wherein an angle defined by the side wall and a plane aligned with the circumferential edge of the proximal surface, of between 10° and 60° around the housing. Embodiment 9: The bedpan of any one of embodiments 1-7, wherein an angle defined by the side wall and a plane aligned with the circumferential edge of the proximal surface, of between 10° and 60° on at least half of the housing. Embodiment 10: The bedpan of any one of embodiments 1-9, wherein the opening is generally rectangular in shape. Embodiment 11: The bedpan of any one of embodiments 1-10, wherein the opening has a length dimension between about 5" and 11.5" and a width dimension between about 4" and 10". Embodiment 12: The bedpan of any one of embodiments 1-11, wherein the housing further comprises at least one support between an interior surface of the top portion and an interior surface of the bottom portion. Embodiment 13: The bedpan of embodiment 12, wherein the housing further comprises a plurality of supports arranged around the chamber. Embodiment 14: The bedpan of embodiment 1, further comprising a second handle on a second portion of the housing, the second handle formed integral to the housing, wherein the first handle has a first length dimension that is between 3" and 8", and the second handle has a second length dimension that is between 3" and 8". Embodiment 15: The bedpan of any one of embodiments 1-14, wherein the housing has a length dimension and a width dimension, and wherein the length dimension is between 14" and 24" and the width dimension is between 14" and 23". Embodiment 16: The bedpan of any one of embodiments 1-15, further comprising a sensor assembly positioned on the top portion of the housing, the sensor configured to sense, through direct contact with a patient, a characteristic of the patient and wirelessly communicate information relating to the sensed characteristic. Embodiment 17: The bedpan of any one of embodiments 1-15, further comprising a sensor assembly positioned in the chamber, the sensor configured to sense a characteristic of material in the chamber and wirelessly communicate information relating to the sensed characteristic. Embodiment 18: A bedpan comprising: a housing including a chamber for holding urine and feces, the chamber having walls around the chamber, a bottom surface and a top opening, the housing further including: a top portion including a proximal surface having an apron surrounding the opening to the chamber, the apron extending from a circumferential edge of the proximal surface to a circumferential edge of the opening; a bottom portion including a distal surface opposite the proximal surface, the chamber positioned between the proximal surface and the distal surface; and a side wall surrounding the apron, the side wall angled outward on all sides of the housing as it extends from a circumferential edge of the proximal surface towards a distal edge of the distal surface; and a first handle formed integral to the housing.

Embodiment 19: The bedpan of embodiment 18, further comprising a second handle formed integral to the housing.

Embodiment 20: The bedpan of embodiment 18, wherein the top portion and the bottom portion are coupled together with a hinge.

The disclosed subject matter has been provided here with reference to one or more features or embodiments. Those skilled in the art will recognize and appreciate that, despite the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A bedpan comprising:

a housing including:

- a chamber for holding urine and feces, the chamber having a side wall and a bottom surface,
- a top portion including
  - an opening to the chamber,
  - a proximal surface having a circumferential edge;
  - an angled side wall surrounding the opening, the side wall of the chamber positioned interior to the angled side wall;
- a bottom portion including
  - a distal surface opposite the proximal surface and having a distal edge, the angled side wall angled outward and extending from the circumferential edge of the proximal surface towards the distal edge of the distal surface; and
- a first handle formed integral in the housing and including a first aperture extending through the proximal surface and the distal surface.

2. The bedpan of claim 1, further comprising a second handle, the second handle formed integral to a second portion of the housing, wherein the second handle includes a second aperture extending through the proximal surface and the distal surface.

3. The bedpan of claim 2, wherein the first aperture has a first longitudinal axis, wherein the second aperture has a second longitudinal axis, wherein the first and second axis are aligned, with respect to each other, at an angle A that is 90° plus or minus 30°.

4. The bedpan of claim 1, wherein the first aperture is curved.

5. The bedpan of claim 2, wherein the second aperture is curved.

6. The bedpan of claim 1, wherein the opening has a circumferential edge, and the apron is sloped downward towards the distal surface as it extends from the circumferential edge of the proximal surface to the circumferential edge of the opening.

7. The bedpan of claim 2, wherein the opening is rectangular.

8. The bedpan of claim 7, wherein the first handle is formed integral to a first curved portion of the angled side wall.

9. The bedpan of claim 8, wherein the second handle is formed integral to a second curved portion of the angled side wall.

10. The bedpan of claim 1, wherein the housing further comprises at least one support between an interior surface of the top portion and an interior surface of the bottom portion.

11. The bedpan of claim 10, wherein the housing further comprises a plurality of supports arranged around the chamber.

12. The bedpan of claim 1, further comprising a second handle on a second portion of the housing, the second handle formed integral to the housing, wherein the first handle has a first length dimension that is between 3" and 8", and the second handle has a second length dimension that is between 3" and 8".

13. The bedpan of claim 1, wherein the housing has a length dimension and a width dimension, and wherein the length dimension is between 14" and 24" and the width dimension is between 14" and 23".

14. The bedpan of claim 1, further comprising a sensor assembly positioned on the top portion of the housing, the sensor configured to sense, through direct contact with a patient, a characteristic of the patient and wirelessly communicate information relating to the sensed characteristic.

15. The bedpan of claim 14, wherein the characteristic of the patient is a dermatological integrity of the patient's skin.

16. The bedpan of claim 1, further comprising a sensor assembly positioned in the chamber, the sensor configured to sense a characteristic of material in the chamber and wirelessly communicate information relating to the sensed characteristic.

17. A bedpan comprising:

- a housing including a chamber having walls around the chamber, a bottom surface and a top opening, the housing further including:
  - a top portion including the opening and a proximal surface having an apron surrounding the opening to the chamber, the apron extending from a circumferential edge of the proximal surface to a circumferential edge of the opening;
  - a bottom portion including a distal surface opposite the proximal surface, the chamber positioned between the proximal surface and the distal surface;
  - an angled side wall surrounding the apron angled outward on all sides of the housing;
- one or more sensor assemblies located on a wall of the chamber, the sensor assembly configured to sense a characteristic of material in the chamber and wirelessly communicate information related to the sensed characteristic; and
- a first handle formed integral to a first portion of the angled side wall of the housing, and wherein the first handle includes an aperture extending through the housing.

18. The bedpan of claim 17, wherein the sensor assembly is configured to sense an amount of material in the chamber.

19. The bedpan of claim 17, wherein the sensor assembly is configured to sense abnormalities in the material in the chamber.

20. The bedpan of claim 17, wherein the sensor assembly is configured to sense metabolic byproducts in the material in the chamber.

* * * * *